US007027904B2

(12) United States Patent
Ishizu et al.

(10) Patent No.: US 7,027,904 B2
(45) Date of Patent: Apr. 11, 2006

(54) VEHICLE DRIVING FORCE CONTROL

(75) Inventors: Takeshi Ishizu, Tokyo (JP); Keisei Chou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 145 days.

(21) Appl. No.: 10/244,560

(22) Filed: Sep. 17, 2002

(65) Prior Publication Data

US 2003/0060961 A1 Mar. 27, 2003

(30) Foreign Application Priority Data

Sep. 26, 2001 (JP) ............................ 2001-294040
Nov. 20, 2001 (JP) ............................ 2001-354866

(51) Int. Cl.
*B60T 8/32* (2006.01)
*B60T 8/58* (2006.01)
*G06F 7/00* (2006.01)

(52) U.S. Cl. ........................... 701/93; 701/70; 701/79; 180/170; 340/441

(58) Field of Classification Search .................. 701/93, 701/68, 70, 79, 1, 53, 96; 180/170; 340/438, 340/441
See application file for complete search history.

(56) References Cited

U.S. PATENT DOCUMENTS 5,038,288 A * 8/1991 Moride et al. ................ 701/85
5,835,878 A * 11/1998 Saito et al. ................... 701/94
6,401,024 B1 * 6/2002 Tange et al. .................. 701/96

FOREIGN PATENT DOCUMENTS

JP 60-111029 6/1985
JP 7-102786 11/1995
JP 2000-205015 7/2000

* cited by examiner

*Primary Examiner*—Yonel Beaulieu
(74) *Attorney, Agent, or Firm*—Foley & Lardner LLP

(57) ABSTRACT

A vehicle driving force control apparatus for a vehicle includes an actuating section to control a driving force of the vehicle so as to cause an actual vehicle speed of the vehicle to follow a target vehicle speed. A target acceleration calculating section calculates a target acceleration in accordance with an accelerator input. A target vehicle speed calculating section calculates a target vehicle speed from the target acceleration.

20 Claims, 54 Drawing Sheets

VEHICLE DRIVING FORCE CONTROL

BACKGROUND OF THE INVENTION

The present invention relates to technique for controlling a vehicle driving force to achieve a desired vehicle acceleration or a desired vehicle speed responsive to a driver's accelerator input or accelerator pedal operation.

Published Japanese Patent Application Publication No. 2000-205015 shows a driving force control system arranged to calculate a target acceleration/deceleration from an accelerator pedal depression quantity, and to control an engine throttle opening to achieve the target. Published Japanese Patent Application Publication No. S60(1985)-111029 and Japanese Patent No. H7(1995)-102786 show driving force control systems arranged to determine a target vehicle speed in accordance with an accelerator pedal depression quantity.

SUMMARY OF THE INVENTION

When, however, the vehicle enters an upward slope with the accelerator pedal depression quantity being held constant, the actual acceleration and actual vehicle speed decrease, and the control system using the target acceleration/deceleration is unable to restore the once decreased actual vehicle speed to the target value properly though the actual acceleration can be restored to the target. In the control system using the target vehicle speed determined from the accelerator pedal depression quantity, on the other hand, it is required to continue depressing the accelerator pedal deeply in order to hold the vehicle speed in a high speed region.

It is therefore an object of the present invention to provide vehicle driving force control apparatus and/or process for controlling the vehicle speed adequately despite change in the road gradient, and in the case of holding the vehicle speed in the high speed region.

According to the present invention, a vehicle driving force control apparatus for a vehicle, comprises: an actuating section to control a driving force of the vehicle so as to cause an actual vehicle speed of the vehicle to follow a target vehicle speed; a target acceleration calculating section to calculate a target acceleration in accordance with an accelerator input; and a target vehicle speed calculating section to calculate a target vehicle speed from the target acceleration.

According to another aspect of the present invention, a vehicle driving force control process for controlling a driving force of a vehicle so as to cause an actual vehicle speed of the vehicle to follow a target vehicle speed, comprises: calculating a target acceleration in accordance with an accelerator input; and calculating a target vehicle speed from the target acceleration. According to still another aspect of the invention, a vehicle driving force control apparatus comprises: means for calculating a target acceleration in accordance with an accelerator pedal depression quantity; means for calculating a target vehicle speed from the target acceleration; and means for controlling a driving force of the vehicle so as to reduce a deviation of an actual vehicle speed from the target vehicle speed.

The other objects and features of this invention will become understood from the following description with reference to the accompanying drawings.

DETAILED DESCRIPTION OF THE INVENTION

Figure 1:
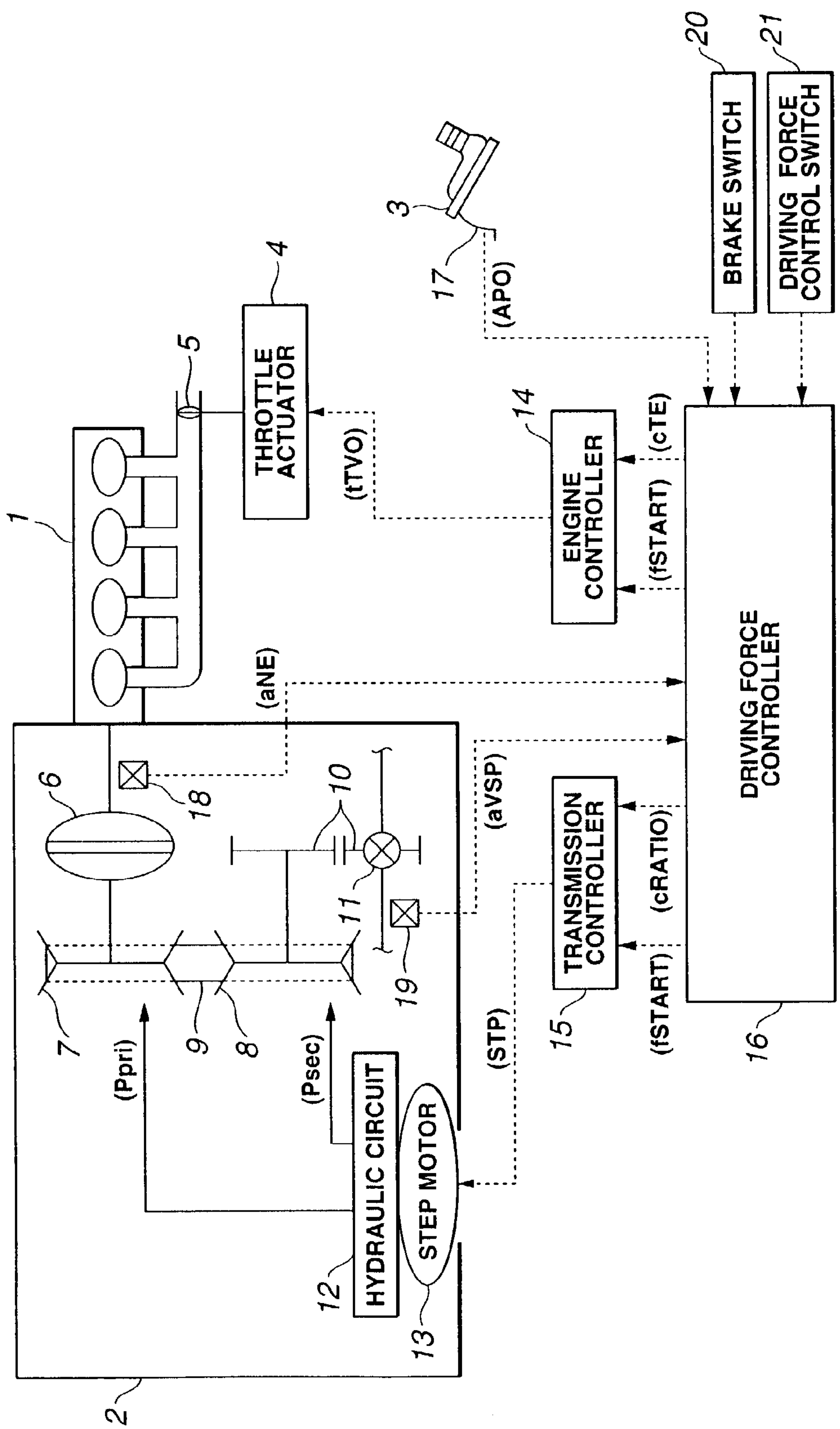
FIG. 1 is a schematic view showing a vehicle equipped with a driving force control apparatus according to a first embodiment of the present invention.

FIG. 1 shows a vehicle driving force control apparatus according to a first embodiment of the present invention. The vehicle of the example shown in FIG. 1 has a power train of an engine 1 and a continuously-variable transmission 2.

A throttle actuator 4 is provided in connection with engine 1. Engine 1 of this example is an gasoline engine. In this example, however, a throttle valve 5 of engine 1 is not linked mechanically with an accelerator pedal 3 operated by the driver. Instead, the throttle actuator 4 is arranged to control the opening (degree) of throttle valve 5 electronically.

An engine controller 14 produces a signal representing a target throttle opening (tTVO) in accordance with a command engine torque cTE as explained later. In response to the target throttle opening (tTVO), throttle actuator 4 varies the throttle opening of throttle valve 5 so as to bring the actual throttle opening equal to the target throttle opening. Thus, engine controller 14 can control the output of engine 1 basically in accordance with the driver's accelerator input. Moreover, command engine torque cTE can be determined so as to control the engine output in accordance with a factor or factors other than the driver's input on accelerator pedal.

Transmission 2 of this example is a V-belt continuously-variable transmission (CVT) including a primary pulley 7 drivingly connected through a torque converter 6 with the output shaft of engine 1, a secondary pulley 8, and a V belt 9 connecting primary and secondary pulleys 7 and 8. Secondary pulley 8 is drivingly connected through a final drive gear set 10 to a differential gear unit 11 for driving wheels of the vehicle.

In order to vary the speed ratio, each pulley 7 or 8 is arranged to increase and decrease the groove width of a V groove formed between a movable flange and a fixed flange. A shift control hydraulic circuit 12 produces a primary pulley fluid pressure Ppri and a secondary pulley fluid pressure Psec, and thereby determines the stroke positions of the movable flanges of primary and secondary pulleys 7 and 8 to determine the speed ratio or transmission ratio.

A transmission actuator (or shift actuator) 13 of this example is a step (or stepper) motor. A transmission controller 15 drives step motor 13 to a step position STP corresponding to a command transmission (gear) ratio (cRATIO) as explained later, and thereby controls the actual transmission (gear) ratio of continuously-variable transmission 2 continuously so as to make the actual transmission ratio equal to command transmission ratio (cRATIO).

A driving force controller 16 determines command engine torque cTE for engine controller 14, and command transmission ratio cRATIO for transmission controller 15, according to a calculation process as explained below, by using input information on vehicle operating conditions supplied from the following input devices.

An accelerator opening (or position) sensor 17 senses the position of an accelerator pedal 3 (known as accelerator pedal depression quantity or degree, or accelerator opening degree) APO. An engine speed sensor 18 senses an engine speed (or rpm) aNE. In this example, engine speed sensor 18 senses engine speed aNE from an ignition signal of engine 1. A vehicle speed sensor 19 senses a vehicle speed aVSP from the rotational speed of a wheel or wheels of the vehicle. A brake switch 20 turns on to signal a braking operation when a brake pedal is depressed. A driving force control switch 21 is a switch which the driver can turn on when the driver desires the driving force control according to this embodiment. The signals from these sensors and switches are supplied to driving force controller 16.

Figure 2:
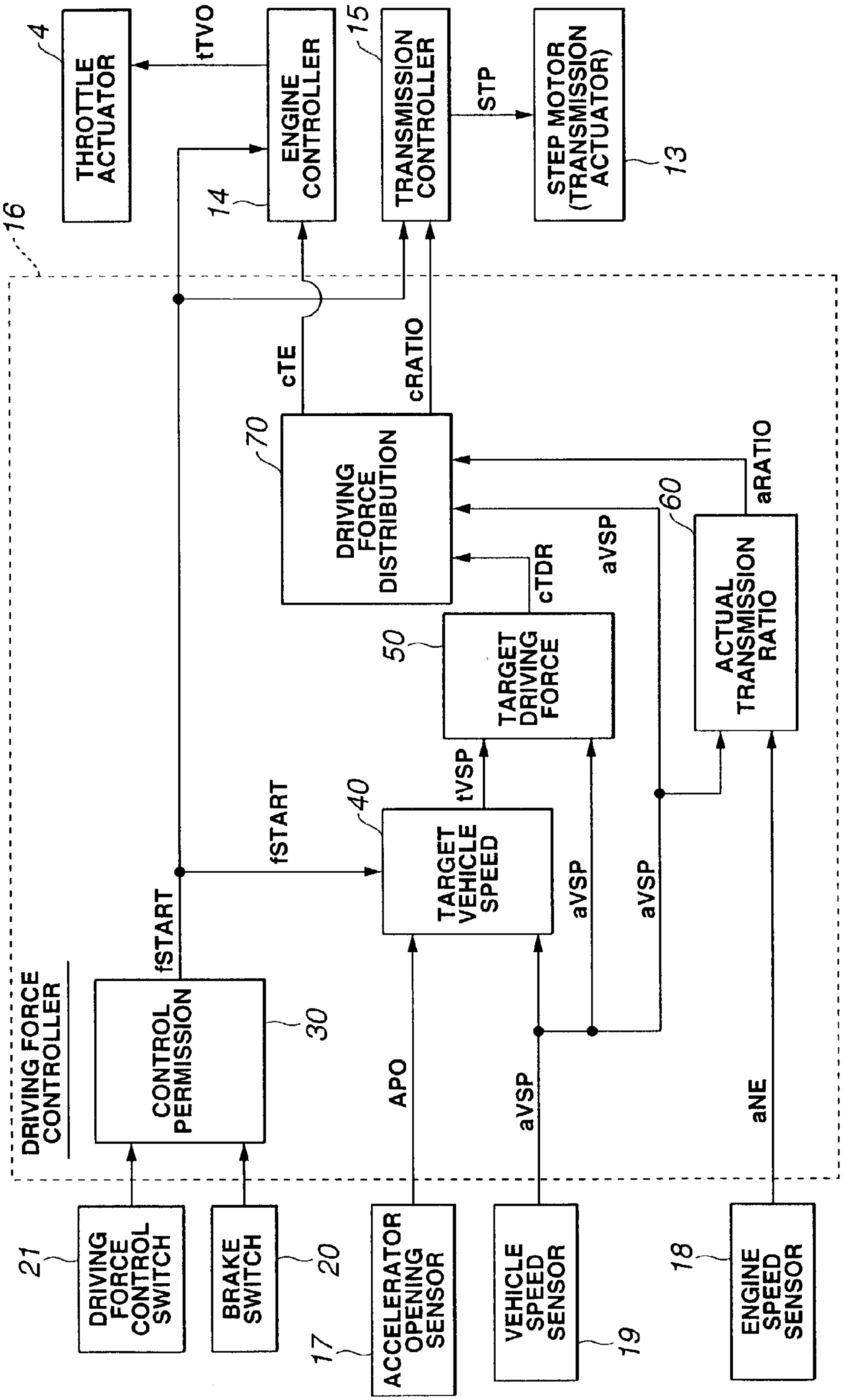
FIG. 2 is a block diagrams showing an arrangement of functional blocks in a driving force controller shown in FIG. 1 for transmission control for a continuously-variable transmission and engine throttle control.

Driving force controller 16 reads the input information at regular time intervals of a control cycle by timer interrupt, and performs operations shown in FIG. 2 in the form of functional blocks, to calculate command engine torque cTE for engine controller 14 and command transmission ratio cRATIO for transmission controller 15. In response to these command signals cTE and cRATIO, engine controller 14 and transmission controller 15 control the throttle opening of engine 1 and transmission ratio of continuously-variable transmission 2, respectively, and thereby control the driving force of the vehicle as intended in this embodiment of the invention.

As shown in FIG. 2, driving force controller 16 includes a driving force control permitting section 30, a target vehicle speed setting section 40, a target driving force calculating section 50, an actual transmission ratio calculating section 60 and a driving force distributing section 70. These sections are explained below one by one.

Figure 3:
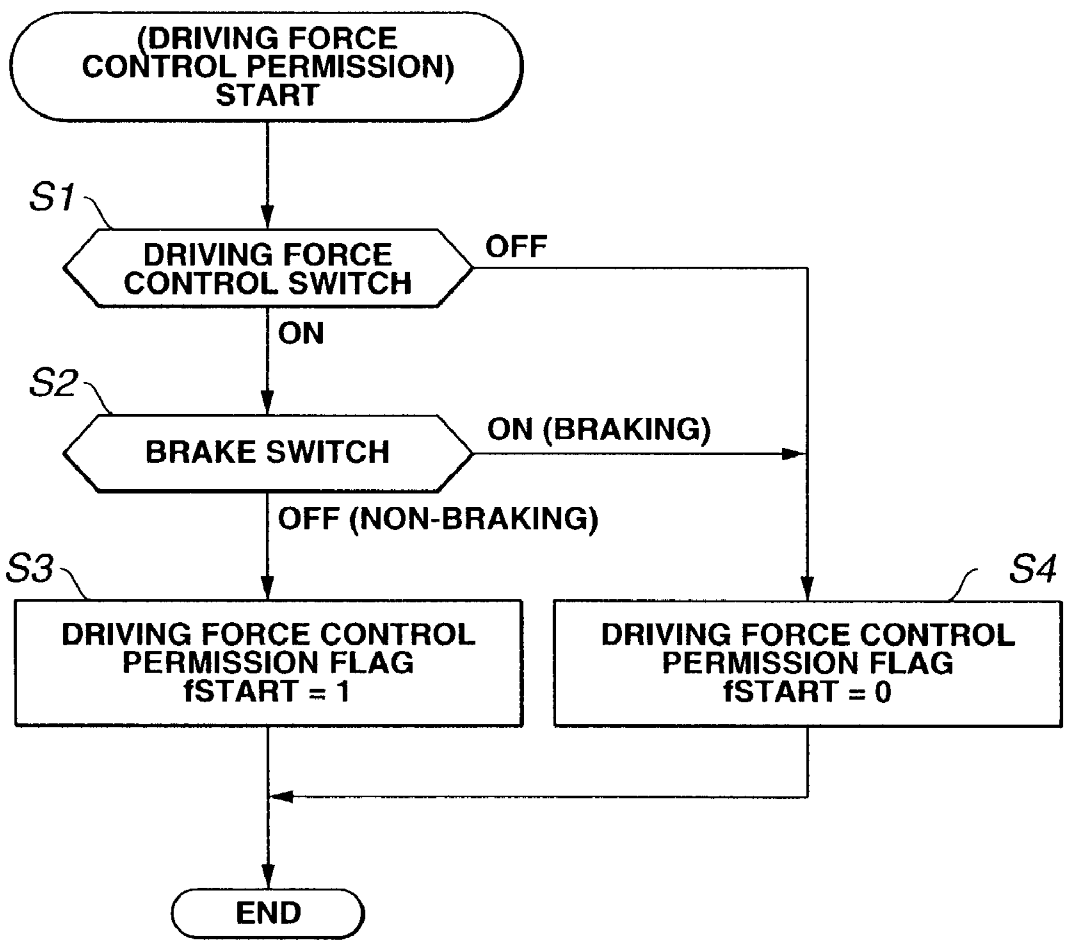
FIG. 3 is a flowchart showing a control program performed by a driving force control permitting section shown in FIG. 2, to determine whether to perform the driving force control.

Driving force control permitting section 30 performs a control program shown in FIG. 3, and thereby determines whether to perform the driving force control. In dependence on the result, permitting section 30 sets a driving force control permission flag fSTART to one or zero.

Step S1 in FIG. 3 checks whether driving force control switch 21 is ON or OFF. Next step S2 checks whether brake switch 20 is ON or OFF. When driving force control switch 21 is ON (indicating that the driver desires the driving force control) and at the same time brake switch is OFF (the brake is out of operation), then permitting section 30 proceeds from step S2 to step S3, and sets driving force control permission flag fSTART to one to permit a start of the driving force control on the assumption that the driver's intention is confirmed and the brake is in the inoperative state allowing the driving force control.

If, however, driving force control switch 21 is OFF (when the driver does not desire the driving force control) or brake switch 20 is ON (the brake system in the operative state), then permitting section 30 proceeds from step S1 or S2, to step S4, and resets driving force control permission flag fSTART to zero on the assumption that the driver's intension is against the driving force control or the brake system is in the operative state to brake the vehicle in which it is difficult to perform the driving force control properly.

During a brake operation during which brake switch 20 is ON, the driving force control system cannot achieve the intended purpose of the vehicle speed control even with the engine output control and transmission control.

It is optional to omit the driving force control switch 21. In this case, the driving force control is performed without regard to the intention of the driver. In this case, permitting section 30 sets or resets driving force control permission flag fSTART in dependence only on the ON/OFF condition of brake switch 20.

Driving force control permission flag fSTART is supplied to target vehicle speed setting section 40, and further supplied to engine controller 14 and transmission controller 15 as shown in FIGS. 1 and 2. When driving force control permission flag fSTART is set to one, engine controller 14 and transmission controller 15 determine the target throttle opening tTVO for throttle actuator 4 and command step position STP for transmission actuator 13 in accordance with command engine torque cTE and command transmission ratio cRATIO, and control the throttle actuator 4 and transmission actuator 13 to achieve the commands from driving force controller 16. When, on the other hand, driving force control permission flag fSTART is reset to zero, this control system controls the throttle opening of engine 1 and the transmission ratio of continuously-variable transmission 2 in normal modes, instead of the driving force control according to this embodiment.

Figure 4:
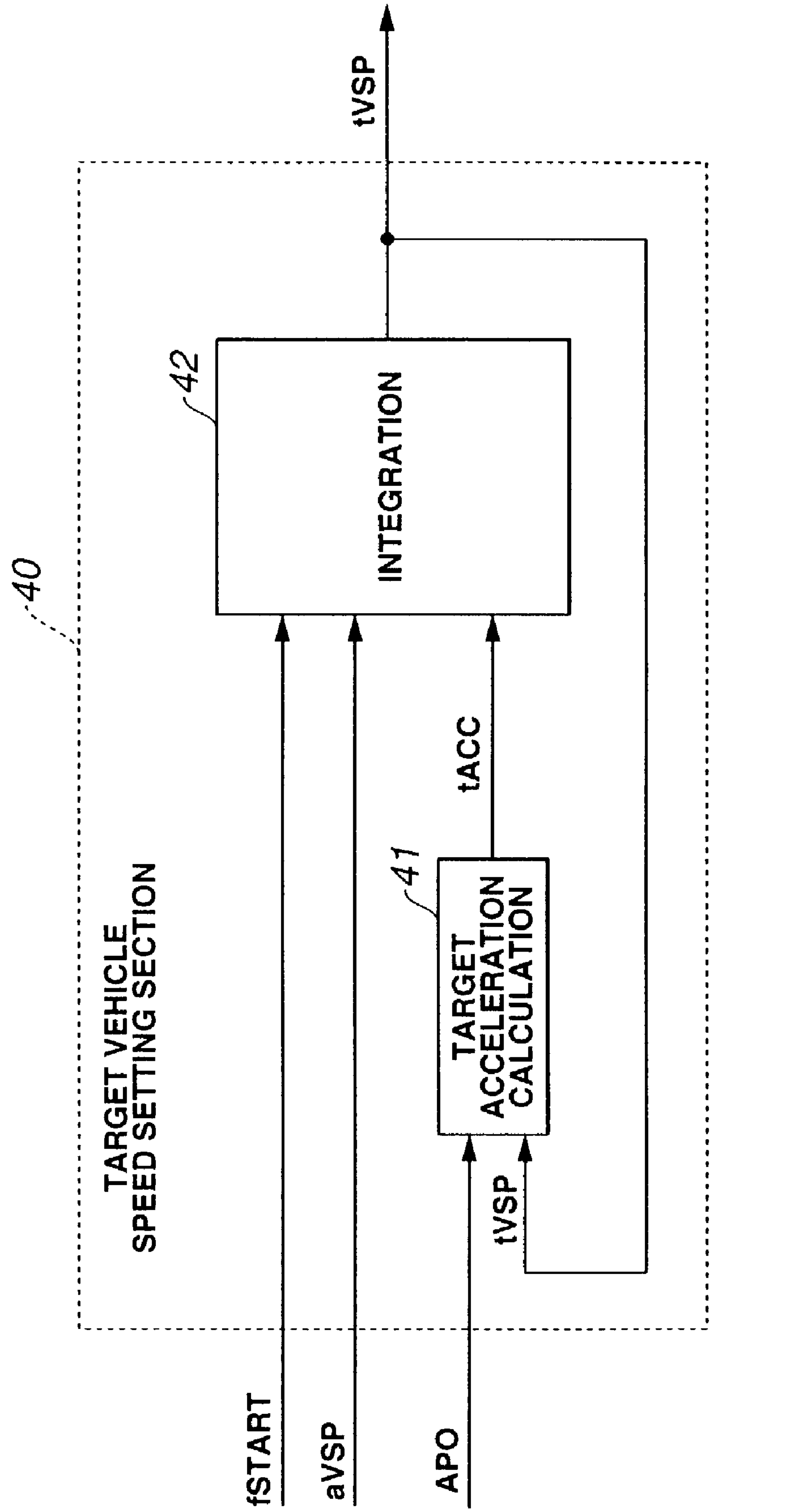
FIG. 4 is a functional block diagram showing a target vehicle speed setting section shown in FIG. 2.

Target vehicle speed setting section 40 shown in FIG. 2 includes a target acceleration calculating section 41 and an integrating section 42, as shown more in detail in FIG. 4, and functions to determine target vehicle speed tVSP in accordance with driving force control permission flag fSTART, actual vehicle speed aVSP and accelerator pedal depression quantity (or accelerator opening) APO. Target vehicle speed setting section 40 of this example is arranged to store, in a memory section, a value of target vehicle speed tVSP obtained in each control cycle until the next control cycle, for use for calculation of target vehicle speed tVSP in the next cycle.

Figure 5:
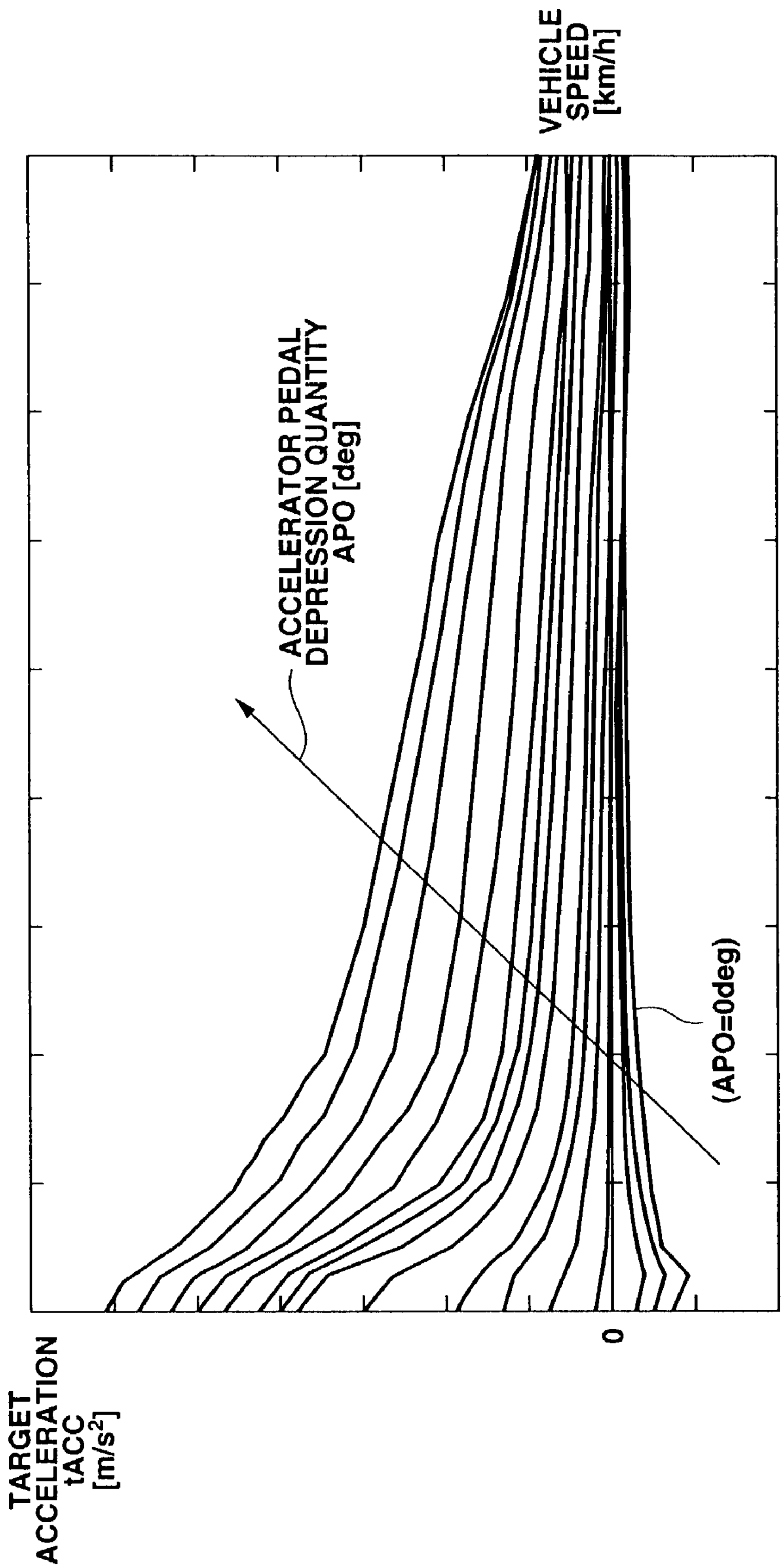
FIG. 5 is a graph showing a characteristic of acceleration which a target acceleration determining section in the target vehicle speed calculating section uses for determining a target acceleration.

Target acceleration calculating section 41 receives accelerator pedal depression quantity APO, further receives, as a feedback input, target vehicle speed tVSP calculated by integrating section 42, and determines target acceleration tACC in accordance with these inputs by using a map shown in FIG. 5.

FIG. 5 shows a relation of target acceleration tACC with respect to vehicle speed for each of values of accelerator pedal depression quantity APO. The characteristic is so set that target acceleration tACC becomes greater as accelerator depression quantity APO becomes greater. As the vehicle speed increases, the running resistance increases and hence the feasible acceleration becomes smaller. Accordingly, as shown in FIG. 5, the characteristic is so set that target acceleration tACC becomes smaller as the vehicle speed increases, if acceleration depression quantity APO remains unchanged. In the example of FIG. 5, target acceleration tACC is negative when accelerator depression quantity APO is smaller than a predetermined value.

Figure 6:
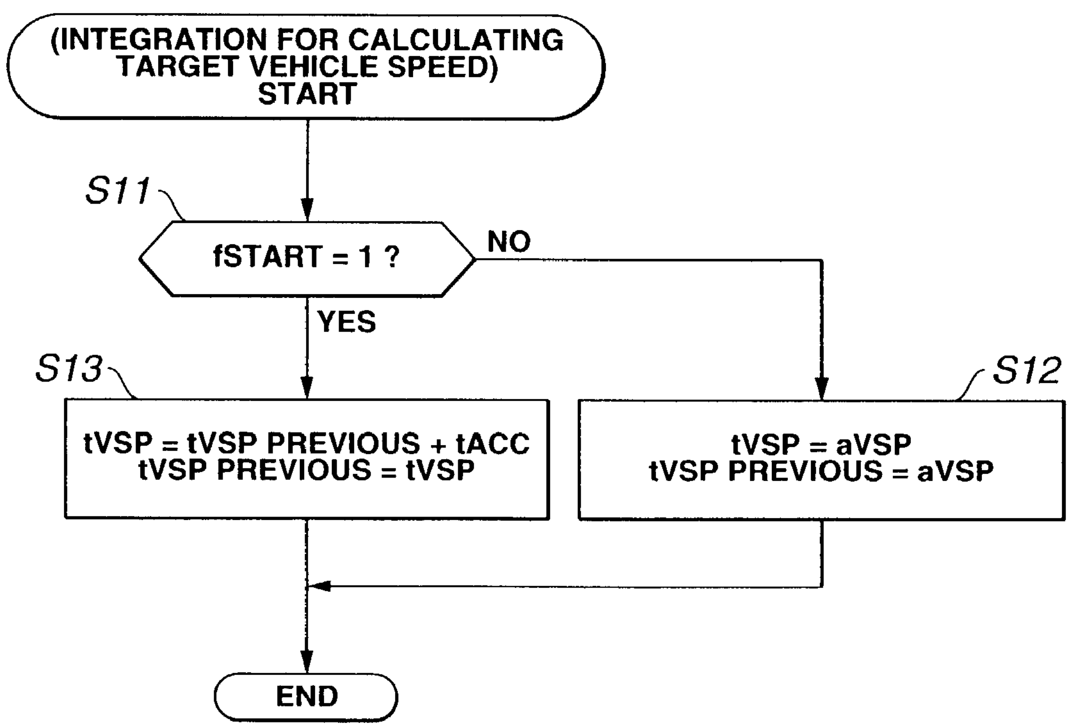
FIG. 6 is a flowchart showing a target vehicle speed calculating process in an integrating section in the target vehicle speed calculating section of FIG. 2.

Integrating section 42 (section for calculating a target vehicle speed) calculates target vehicle speed tVSP in accordance with control permission flag fSTART, actual vehicle speed aVSP and target acceleration tACC. The calculation is carried out by integrating section 42, as shown in FIG. 6.

Step S11 determines whether control permission flag fSTART is 1 or 0. When control permission flag fSTART is equal to zero, that is when driving force control switch 21 is OFF or brake switch 20 is ON (during braking), then control is transferred from step S11 to step S12 for initialization. Step S12 substitutes a current value of actual vehicle speed aVSP for current target vehicle speed tVSP (tVSP=aVSP) and a previous target vehicle speed tVSPprevious (that is, a target vehicle speed value calculated in a previous control cycle; tVSPprevious=aVSP).

When driving force control switch 21 is ON and brake switch 20 is OFF (the brake is inoperative), and hence control permission flag fSTART is one, then integrating section 42 proceeds from step S11 to step S13. At step S13, integrating section sets target vehicle speed equal to a sum of previous target vehicle speed tVSPprevious and target acceleration tACC (tVSP=tVSPprevious+tACC), and updates previous target vehicle speed tVSPprevious to a current value of target vehicle speed obtained by this control cycle (tVSPprevious=tVSP). The target vehicle speed tVSP newly calculated in this way is delivered to the before-mentioned target driving force calculating section 50 (shown in FIG. 2), and fed back to the target acceleration calculating section 41 (as shown in FIG. 4) for use in calculation of target acceleration tACC.

Figure 7A:
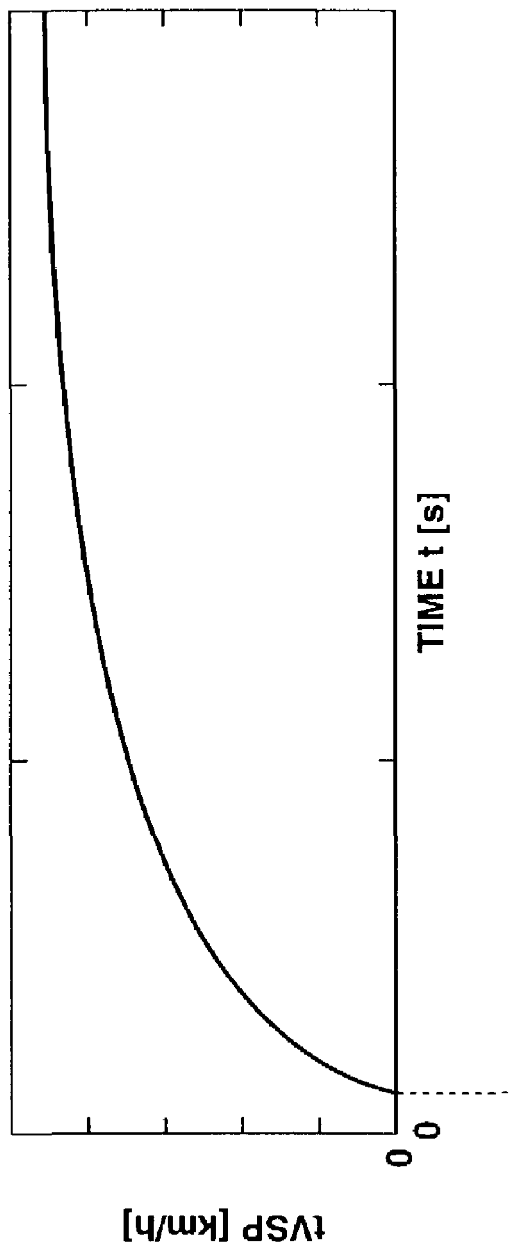
FIGS. 7A and 7B are time charts showing a time series variation of the target vehicle speed determined by the driving force control apparatus according to the first embodiment.
Figure 7B:
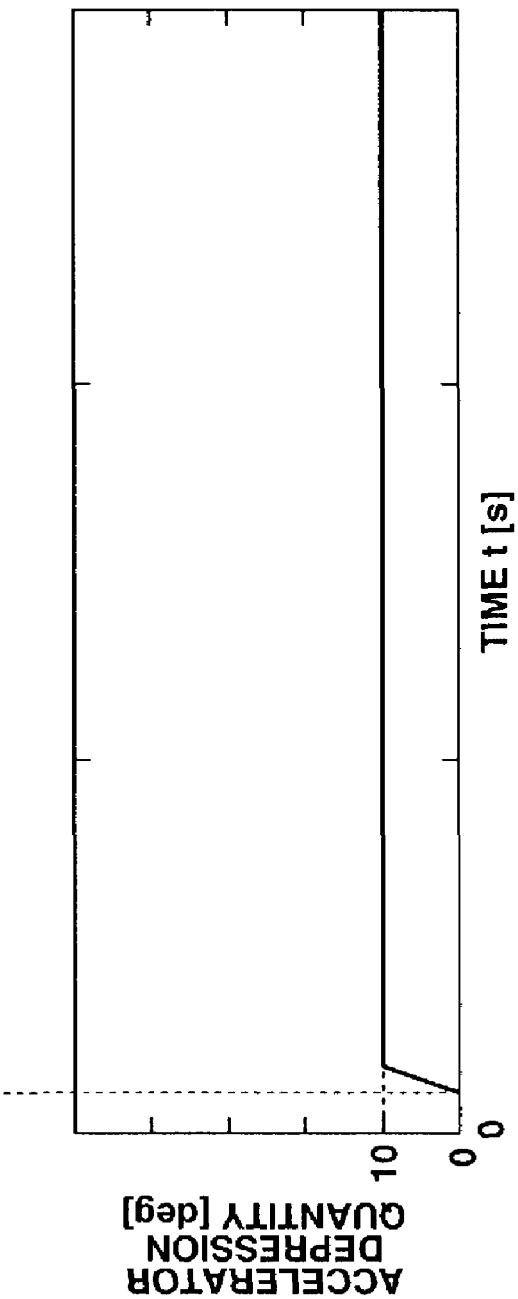
Figure 8A:
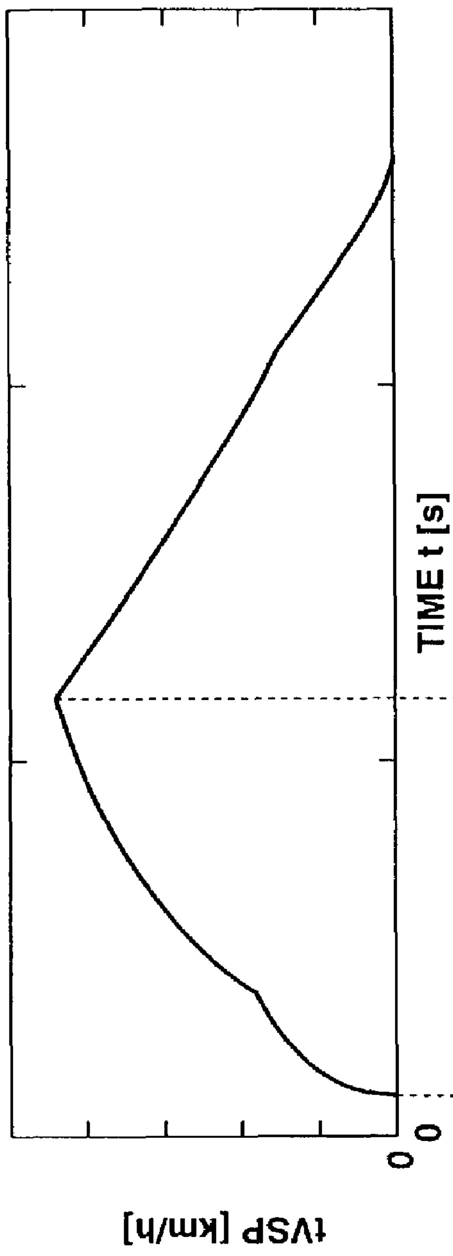
FIGS. 8A and 8B are time charts showing a time series variation of the target vehicle speed determined by the driving force control apparatus according to the first embodiment, in response to another accelerator pedal operation.
Figure 8B:
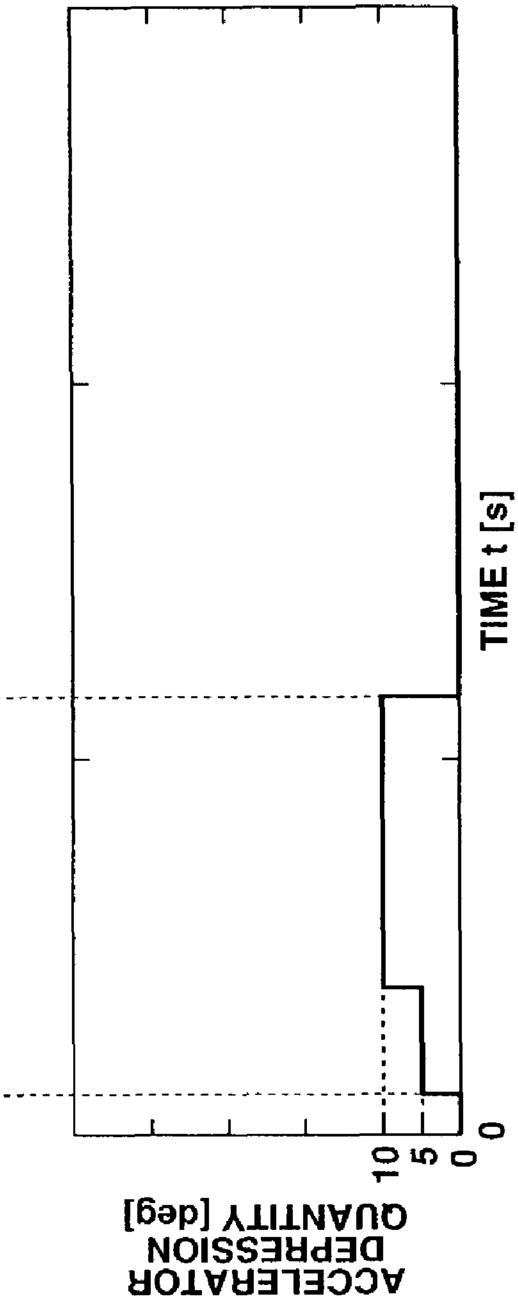

FIGS. 7A, 7B, 8A and 8B show examples of calculation of target vehicle speed tVSP by target vehicle speed setting section 40. In the example of FIGS. 7A and 7B, the control was started from a stop state of a vehicle, and the accelerator depression quantity was held at a constant value (10 deg). In this case, target vehicle speed tVSP varies with time as shown in a time chart of FIG. 7A. In the example of FIGS. 8A and 8B, the control was started from the stop state of the vehicle, and the accelerator depression quantity is varied from zero to 5 deg, from 5 deg to 10 deg and from 10 deg to zero, as shown in FIG. 8B. Target vehicle speed tVSP varies with time as shown in a time chart of FIG. 8A. As evident from these figures, the system according to this embodiment of the invention can calculate target vehicle speed tVSP adequately in accordance with the accelerator pedal depression quantity.

Figure 9:
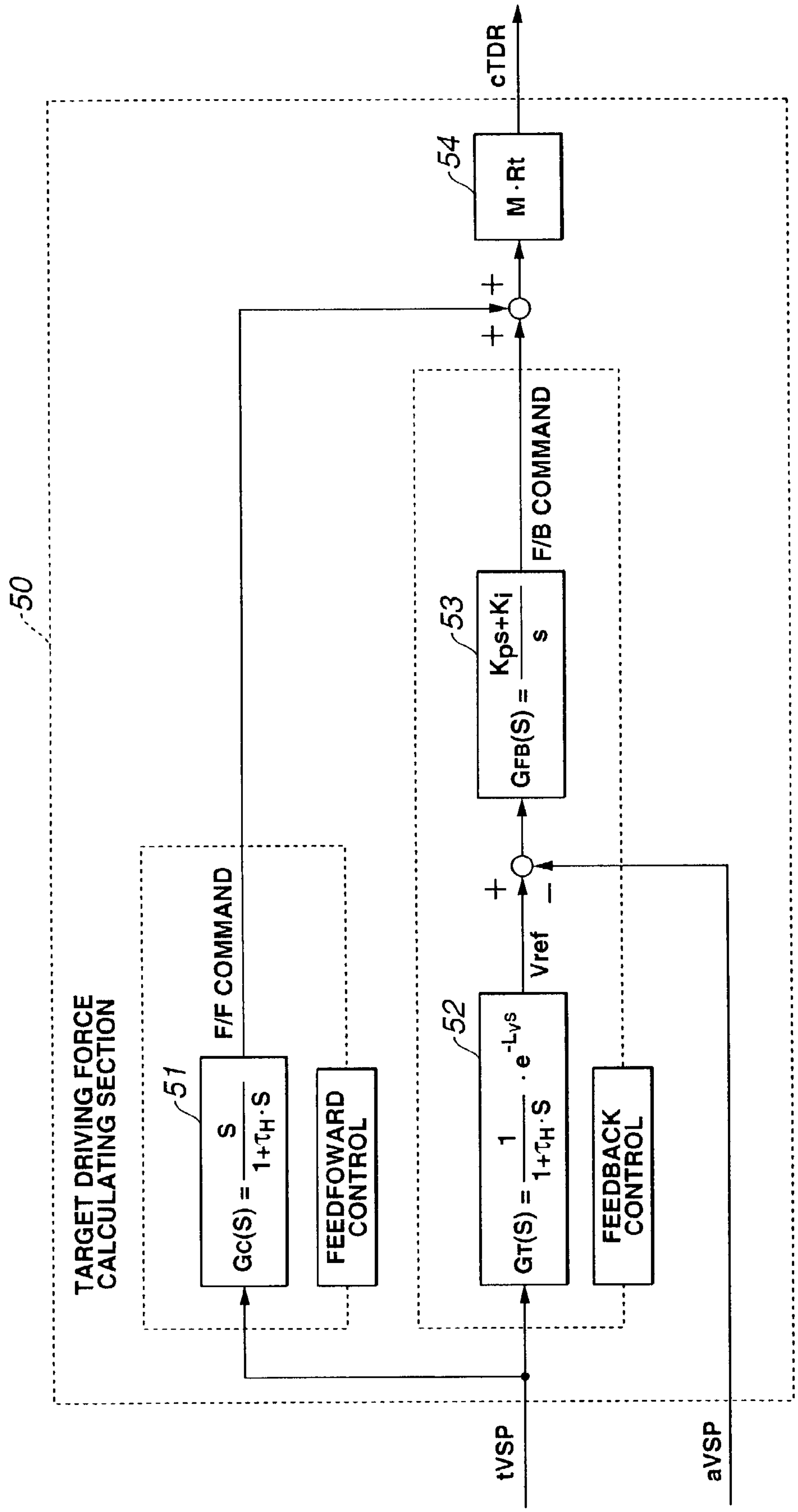
FIG. 9 is a functional block diagram showing a target driving force calculating section shown in FIG. 2.

FIG. 9 shows the target driving force calculating section 50 in the form of a control block diagram. Target driving force calculating section 50 of this example is composed of a two-degree-of-freedom control system including a feedforward control section and a feedback control section, and a driving torque converting section 54. The feedforward control section is composed of a phase compensator 51, and the feedback control section is composed of a reference model 52 and a feedback compensator 53.

Target driving force calculating section 50 performs a control operation by using the feedforward control section and feed back control section so as to achieve a transfer characteristic of reference model 52 as illustrated, including target vehicle speed tVSP as an input and actual vehicle speed aVSP as an output. The transfer function GT(S) of reference model 52 is given by:

$$G_T(s) = \frac{1}{1+\tau_H s} e^{-L_v s} \qquad \text{MATH 1}$$

The transfer function is composed of a first order low-pass filter having a time constant of τH, and a dead time Lv. In this equation, s is a Laplace operator.

Figure 10:
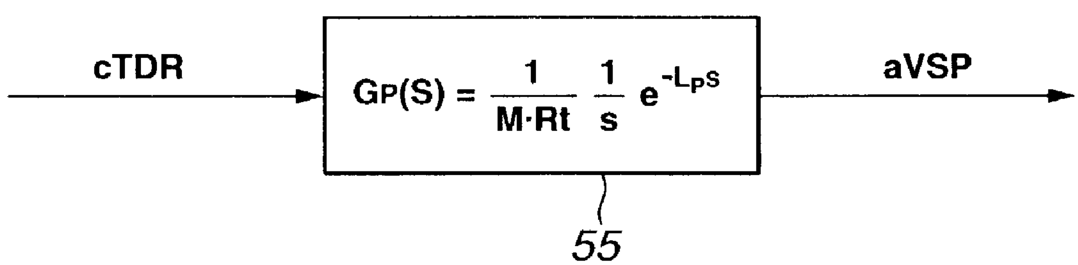
FIG. 10 is a block diagram showing a control model of a controlled vehicle used in the driving force control apparatus according to this embodiment.

By modeling the controlled vehicle to be controlled with the command driving torque cTDR as a manipulated variable and the actual vehicle speed aVSP as a controlled variable, it is possible to represent the behavior of the power train of the vehicle by a simplified nonlinear model 55 as shown in FIG. 10.

$$G_P(s) = \frac{1}{M \cdot R_t} \frac{1}{s} e^{-L_p s} \qquad \text{MATH 2}$$

In this equation, M is a vehicle mass, Rt is a dynamic tire radius, and Lp is a dead time. The vehicle model having command driving force cTDR as input and actual vehicle speed aVSP as output is a model of integral characteristic.

However, a lag in the power train causes a dead time, and the dead time Lp varies in dependence on the type of actuators and engine.

In phase compensator 51 forming feedforward (F/F) control section, a F/F command is determined so as to match the response characteristic of the controlled system with target vehicle speed tVSP as input and the actual vehicle speed aVSP as output, to a characteristic of a predetermined transfer function GT(s) including a predetermined first order lag and a dead time element. Assuming that the dead time of the controlled system is not taken into consideration, and the transfer function GT(S) of reference model 52 is in the form of a first order low-pass filter having a time constant of τH, the transfer function Gc(s) of phase compensator 51 is expressed as:

$$G_C(s) = \left[\frac{1}{1+\tau_H s}\frac{1}{M\cdot R_t}\right]\cdot[M\cdot R_t\cdot s] = \frac{s}{1+\tau_H s} \quad \text{MATH 3}$$

In the feedback control section including reference model 52 and feedback compensator 53, the input to feedback compensator 53 is a difference between a reference response Vref outputted from reference model 52 and actual vehicle speed aVSP, and the output is an F/B command. With the F/B command, this control system can restrain disturbance and influence due to errors in modeling. In this example, feedback compensator 53 is a PI compensator determined by a proportional gain Kp and an integral gain Ki. The transfer function GFB(S) of feedback compensator 53 is given by:

$$G_{FB}(s) = \frac{K_p s + K_i}{s} \quad \text{MATH 4}$$

The command (F/F command) of the feedforward control section and the command (F/B command) are added together and the sum is supplied to driving torque converting section 54, which determines a final command driving torque cTDR by multiplying the sum by the vehicle mass M and dynamic tire radius Rt. The thus-produced command driving torque cTDR is supplied to the driving force distributing section 70 (shown in FIG. 2).

Figure 11A:
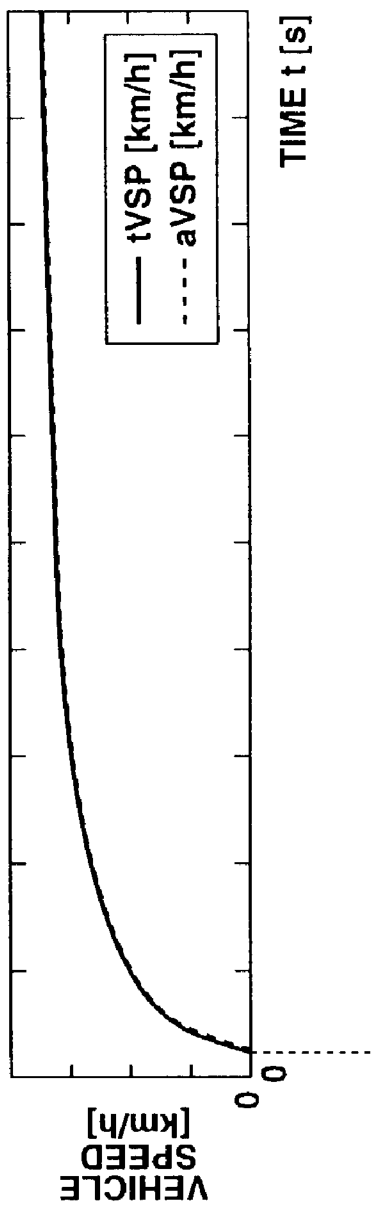
FIGS. 11A, 11B and 11C are time charts for illustrating operations of the driving force control apparatus according to the first embodiment, on a level road.
Figure 11B:
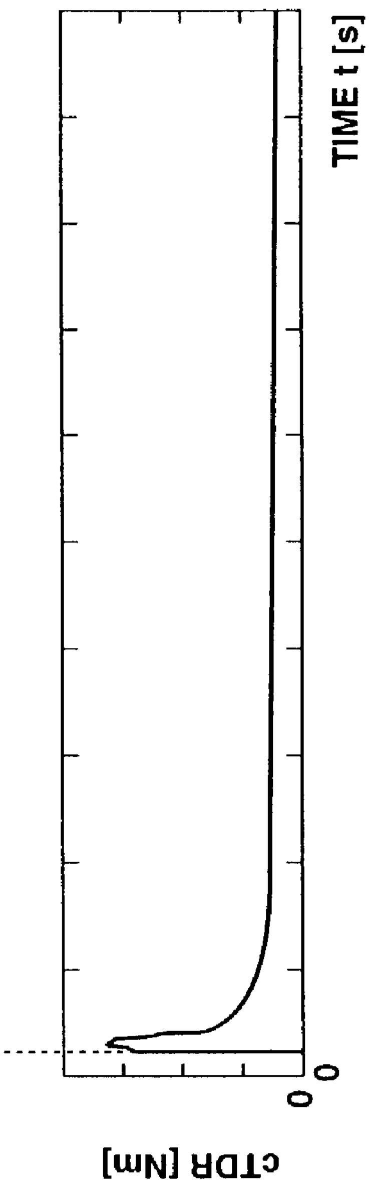
Figure 11C:
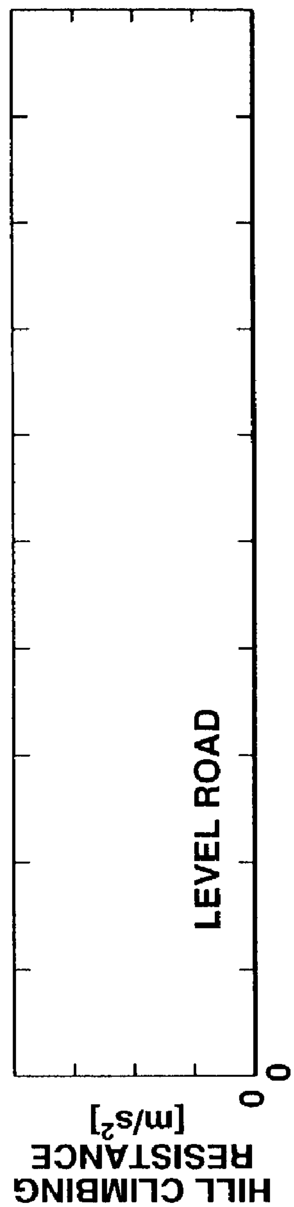
Figures 12A, 12B, 12C:
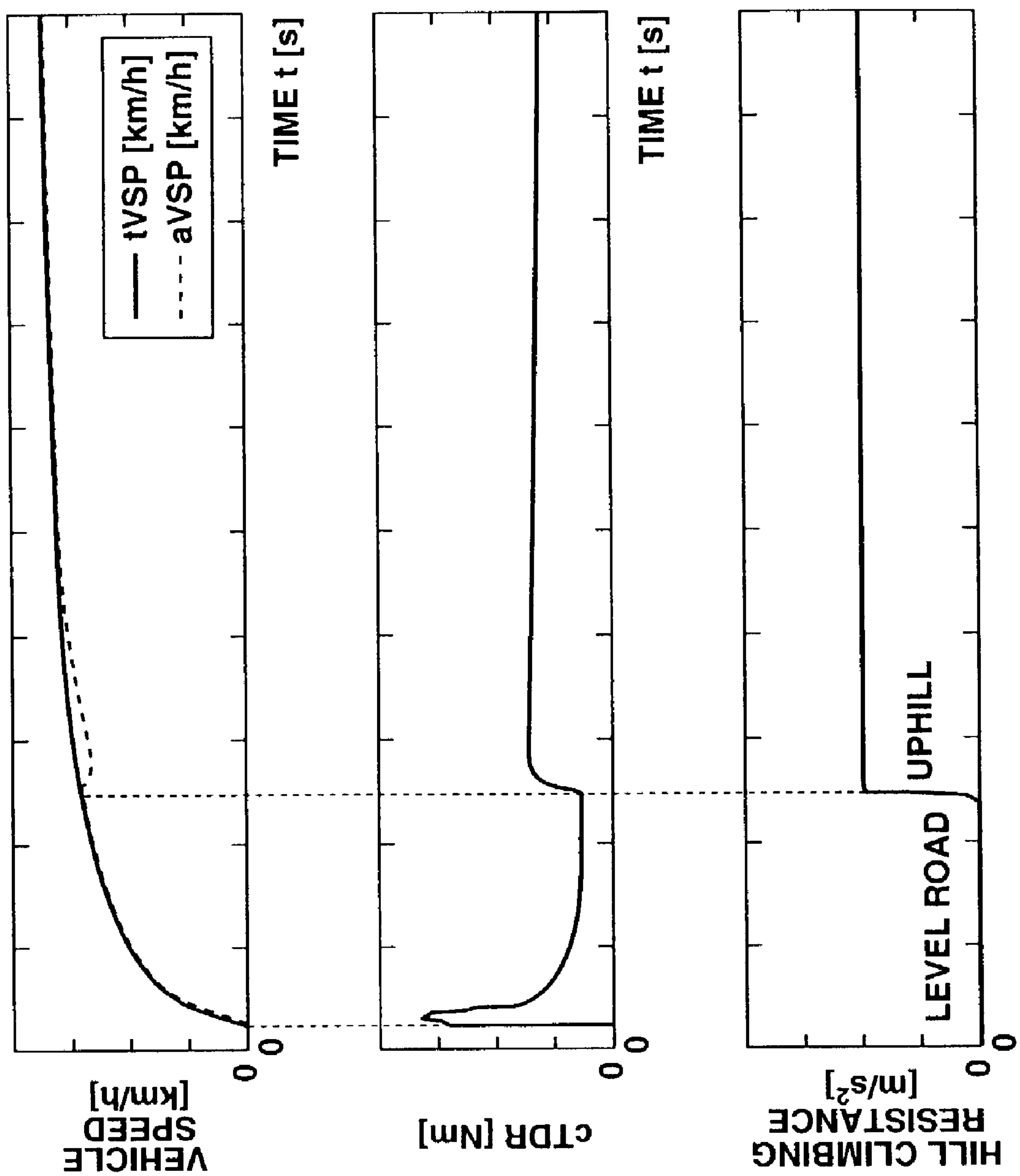
FIGS. 12A, 12B and 12C are time charts for illustrating operations of the driving force control apparatus according to the first embodiment, in the case of transition from a level road condition to a hill climbing condition.

FIGS. 11A, 11B, 11C, 12A, 12B and 12C are time charts showing a response of actual vehicle speed aVSP with respect to target vheicle speed tVSP, and a time series variation of command driving force cTDR determined by target driving force calculating section 50. In the example of FIGS. 11A~11C, the vehicle is started from a stop state, and driven on a level road. In the example of FIGS. 12A~12C, the vehicle is started from a stop state on a level road, and driven to climb an upward slope. The actual vehicle speed aVSP faithfully follows the target vehicle speed tVSP, as shown in FIG. 11A~11C. As evident from FIGS. 12A~12C, when the vehicle enters an uphill condition, the control system increases command driving torque cTDR and thereafter holds the command driving torque cTDR constant. By so doing, this control system restores the temporarily decreased actual vehicle speed to the level of target vehicle speed smoothly, and maintains the good following characteristic.

Actual transmission ratio calculating section 60(shown in FIG. 2) calculates actual transmission ratio aRATIO from actual vehicle speed aVSP, and actual engine speed aNE sensed by engine speed sensor 18, by using the following equation.

$$aRATIO = \frac{aNE\cdot 2\pi R_t}{aVSP\cdot Gf} \quad \text{MATH 5}$$

In this equation, Gf is a final gear ratio. The calculated actual transmission ratio aRATIO is supplied to driving force distributing section 70 (shown in FIG. 2).

Figure 13:
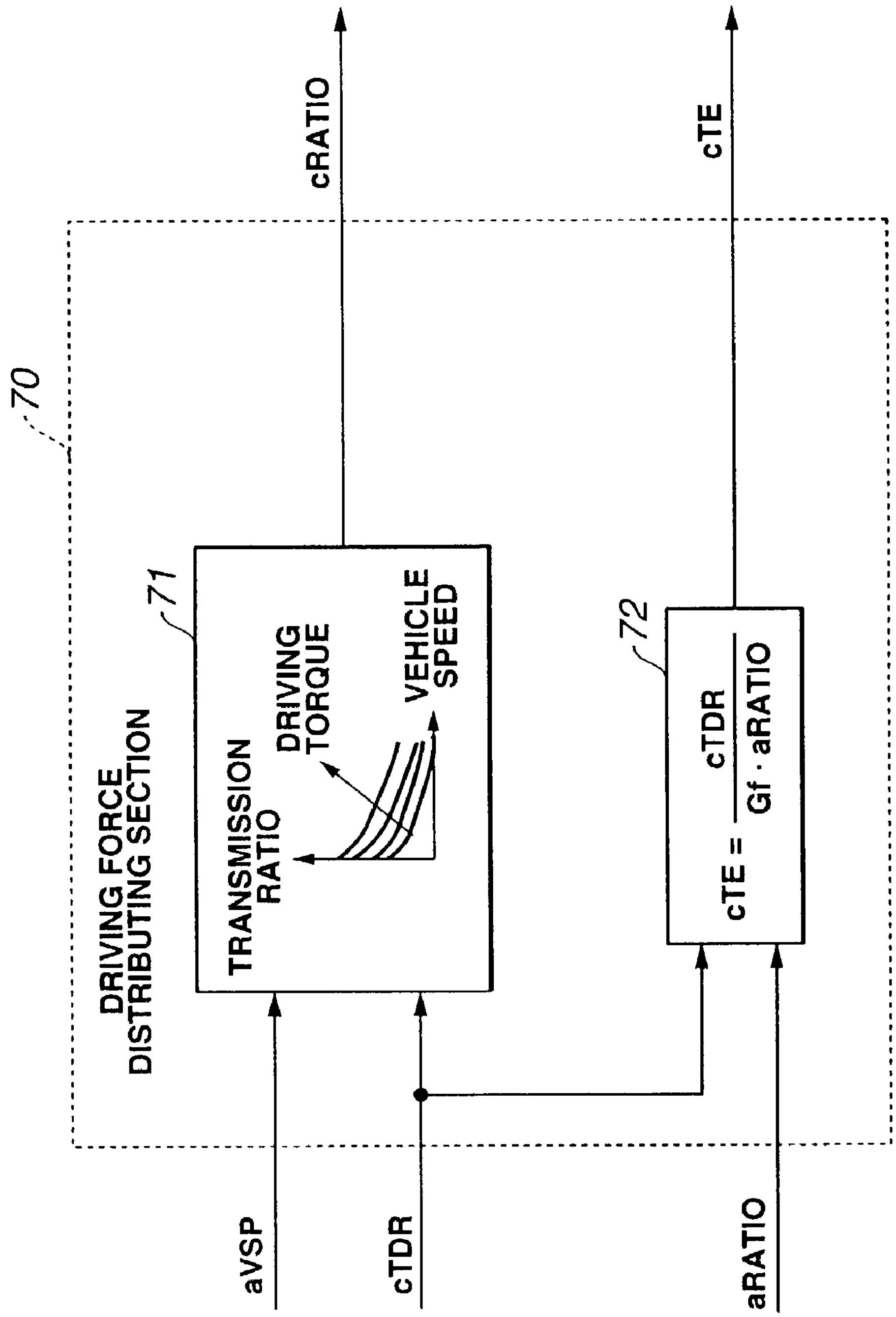
FIG. 13 is a functional block diagram showing a driving force distributing section shown in FIG. 2.

FIG. 13 shows driving force distributing section 70 (FIG. 2). Driving force distributing section 70 includes a command transmission ratio setting section 71 and a command engine torque calculating section 72. Driving force distributing section 70 receives actual vehicle speed aVSP, command driving torque cTDR, and actual transmission ratio aRATIO, and determines, from these inputs, a command transmission ratio cRATIO and a command engine torque cTE.

Figure 14:
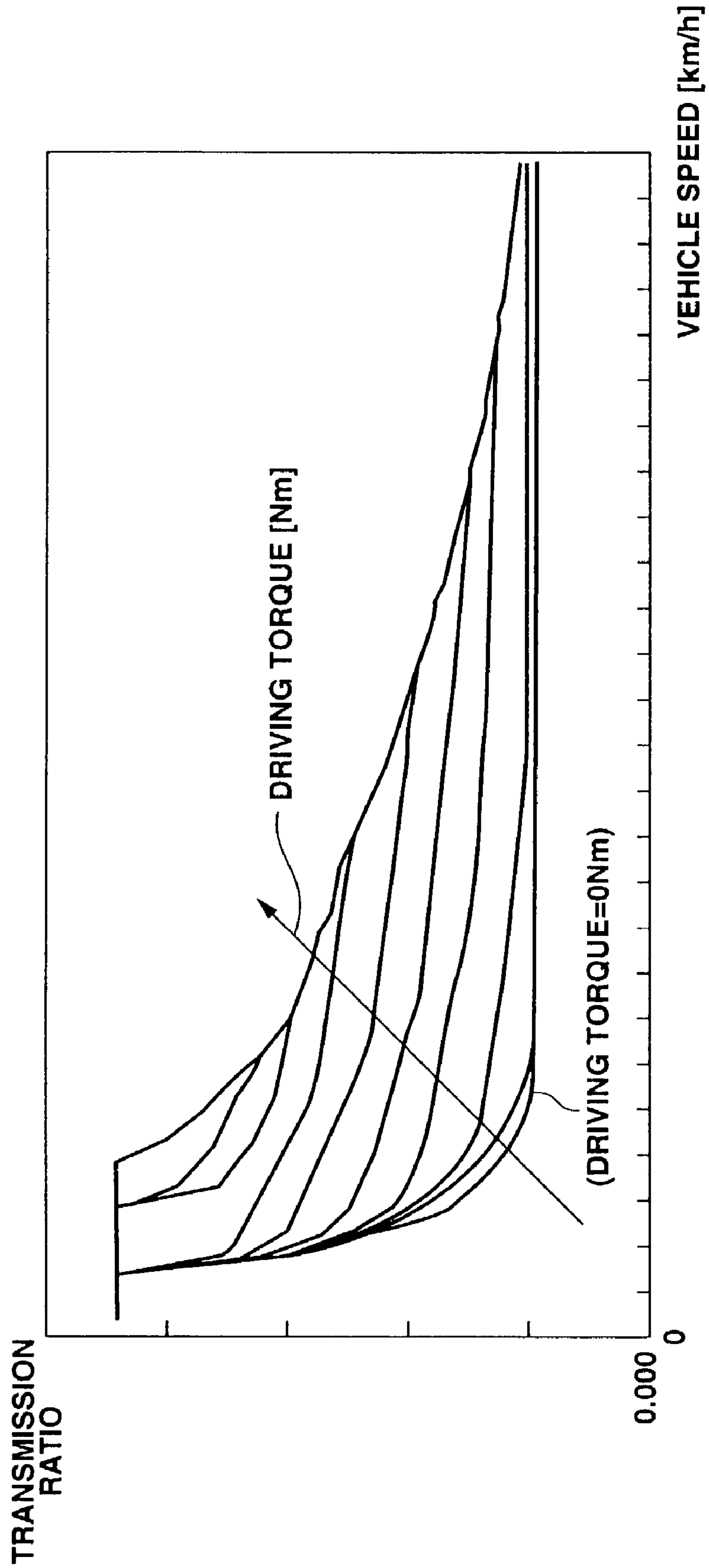
FIG. 14 is a graph showing a characteristic of a transmission ratio used by a command transmission ratio setting section in the driving force distributing section of FIG. 13, for determining a target transmission ratio.

Command transmission ratio setting section 71 sets command transmission ratio cRATIO in accordance with actual vehicle speed aVSP of the controlled vehicle, and command driving torque cTDR by using a map representing a relation of the tranasmission ratio with respect to the vehicle speed and driving torque which FIG. 14 shows as an example in the case of continuously-variable transmission. As shown in FIG. 14, command transmission ratio cRATIO increases as command driving torque cTDR increases. Command transmission ratio cRATIO decreases as the vehicle speed increases if command driving torque cTDR remains unchanged.

Command engine torque calculating section 72 of FIG. 13 calculates command engine torque cTE from command driving torque cTDR and actual transmission ratio aRATIO, by using the following equation.

$$cTE = \frac{cTDR}{Gf\cdot aRATIO} \quad \text{MATH 6}$$

In this equation, Gf is a final gear ratio.

The thus-obtained command engine torque cTE is inputted to engine controller 14 (shown in FIG. 2), which determines target throttle opening tTVO corresponding to command engine torque cTE and delivers the target throttle opening tTVO to throttle actuator 4. On the other hand, command transmission ratio cRATIO is inputted to transmission controller 15 (FIG. 2). Transmission controller 15 determines command step position STP corresponding to command transmission ratio cRATIO and delivers the command step position STP to transmission actuator 13.

Figures 22A, 22B, 22C:
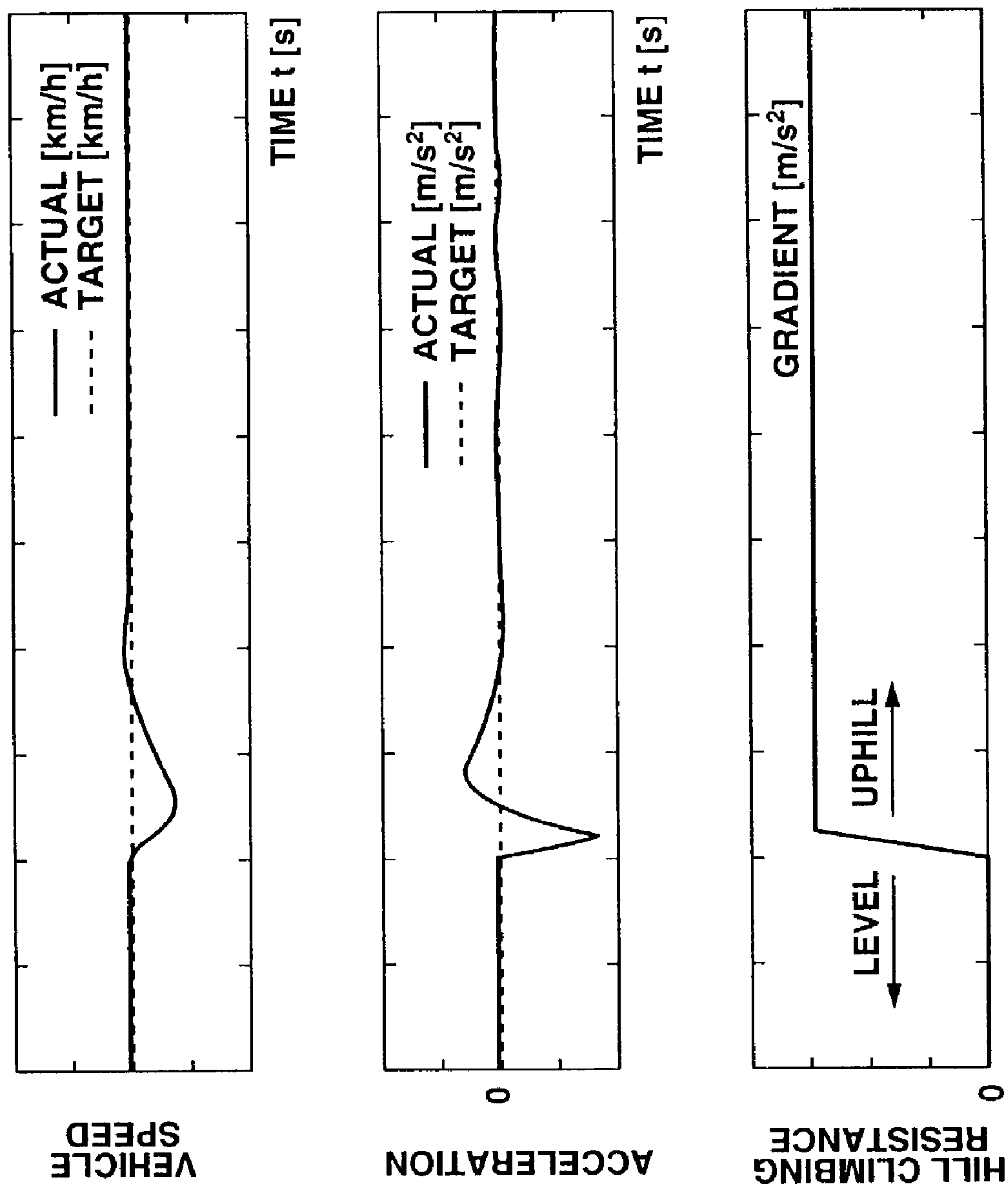
FIGS. 22A, 22B and 22C are time charts illustrating operations of the driving force control apparatus with the target vehicle speed setting section of FIG. 15, in transition from a level road condition to a hill climbing condition.
Figure 23A:
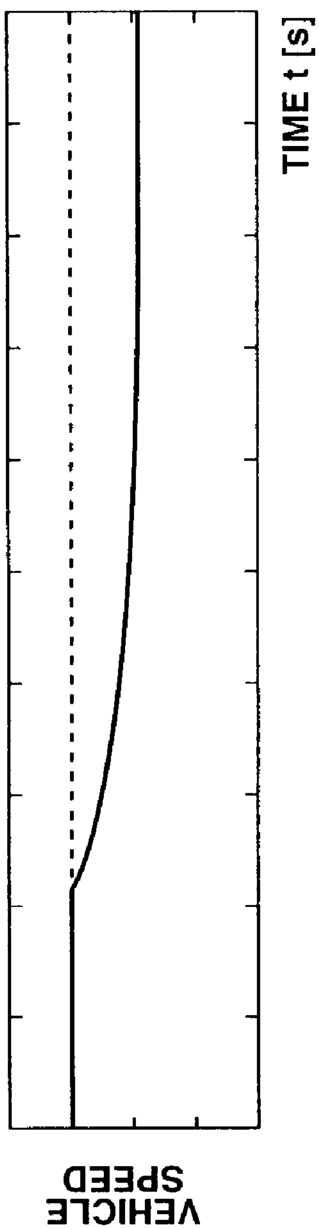
FIGS. 23A, 23B and 23C are time charts illustrating driving force control operations of a driving force control apparatus in a comparative example, in transition from a level road condition to a hill climbing condition.
Figure 23B:
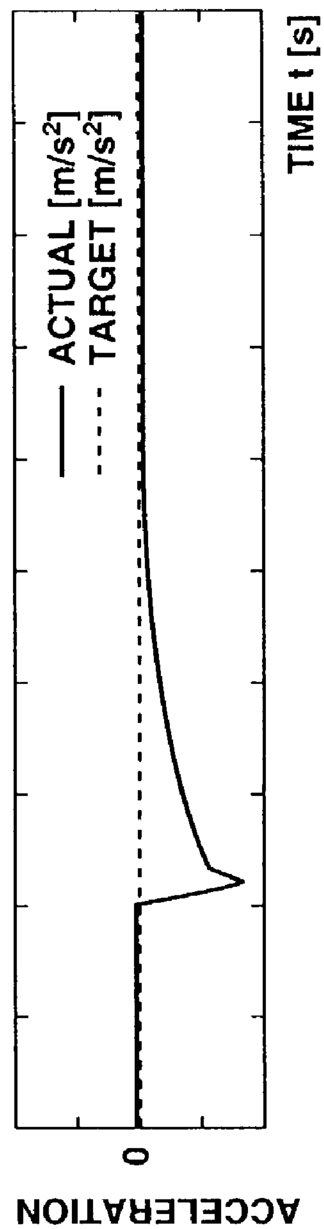
Figure 23C:
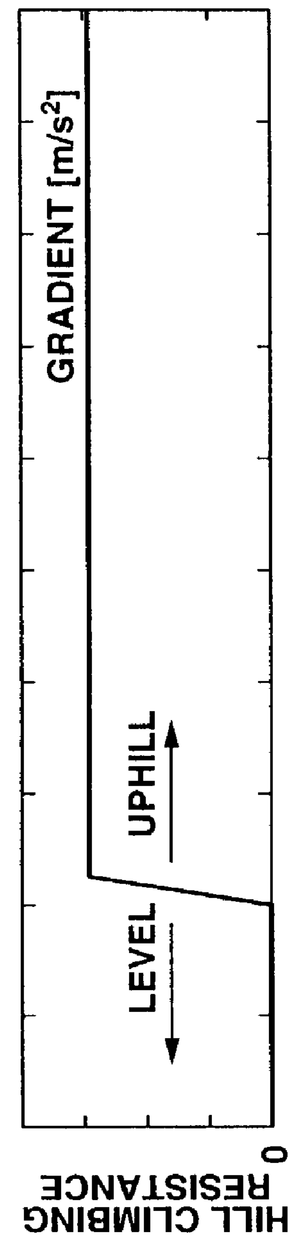

The thus-constructed driving force control apparatus can provide the following effects as shown in time charts of FIGS. 22A, 22B and 22C, which show time series variations of acceleration and vehicle speed, as in an example shown in FIGS. 23A, 23B and 23C, when the vehicle enters an uphill climbing condition with the accelerator depression quantity held constant. As evident from FIGS. 22A, 22B and 22C, the control apparatus according to this embodiment can cause the actual acceleration to immediately increase after a decrease due to the entry to the hill climbing condition, and bring the actual acceleration to the target acceleration. With this restoration of the actual acceleration, the vehicle speed increases from a temporary decrease, follows the target vehicle speed and finally reaches the target vehicle speed. Thus, the control apparatus can prevent the problem of the comparative example shown in FIGS. 23A, 23B and 23C in which the actual vehicle speed is not restored to a higher level notwithstanding restoration of the acceleration.

Figure 15:
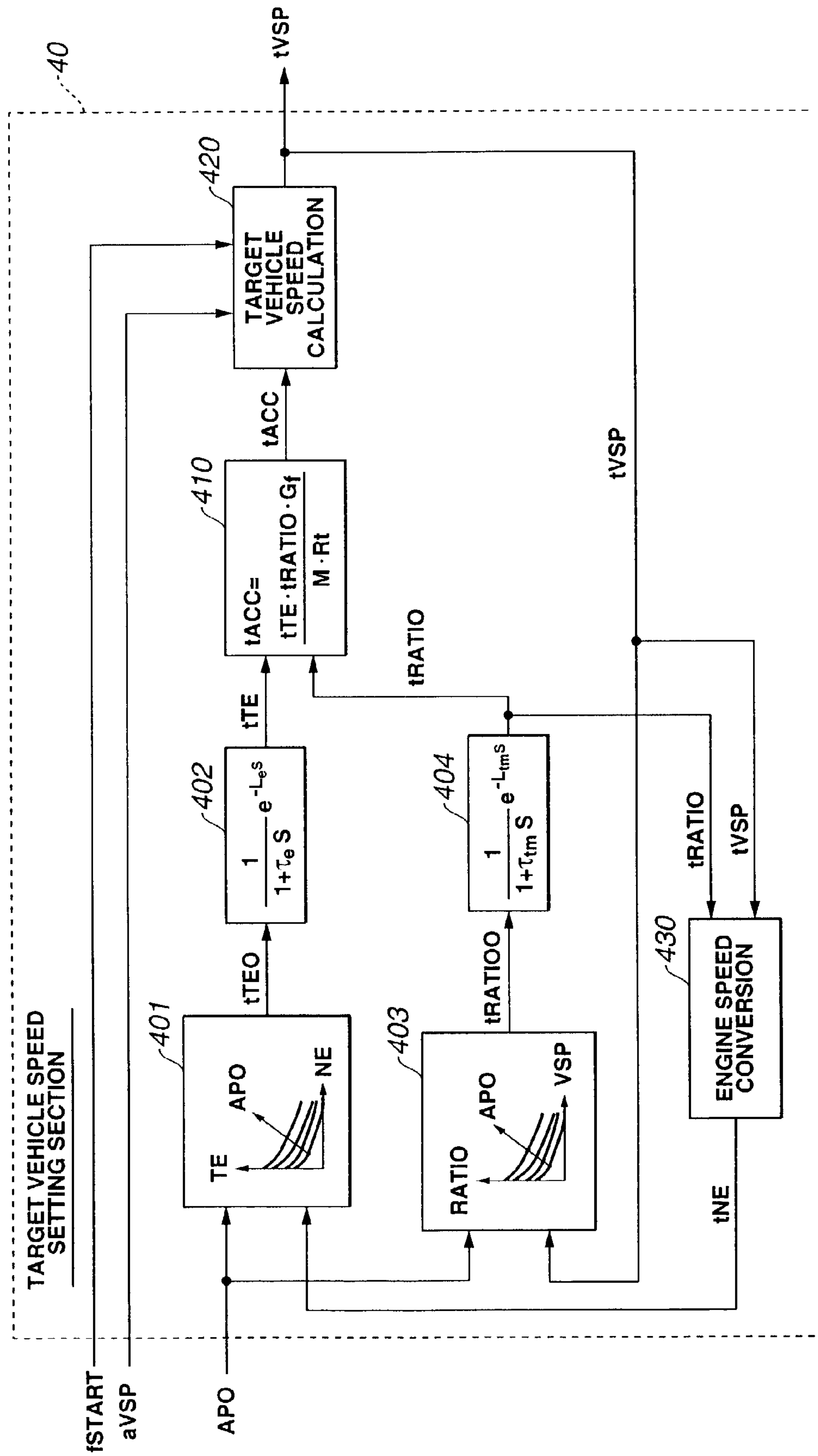
FIG. 15 is a functional block diagram showing a target vehicle speed setting section of FIG. 2, employed in a driving force control apparatus according to a second embodiment of the present invention.

FIG. 15 shows a target vehicle speed setting section 40 in a driving force control apparatus according to a second embodiment of the present invention. Target vehicle speed setting section 40 shown in FIG. 15 is a component of driving force controller 16 as shown in FIG. 2. Target vehicle speed setting section 40 shown in FIG. 15 includes a target engine torque setting section 401, an engine model 402, a target transmission ratio setting section 403, a transmission model 404, a target acceleration determining section 410, a target vehicle speed calculating section 420 and an engine speed converting section 430.

Target engine torque setting section 401 and engine model 402 determine target engine torque tTE in accordance with accelerator depression quantity APO and target engine speed tNE. Target transmission ratio setting section 403 and transmission model 404 determine target transmission ratio tRATIO in accordance with accelerator pedal depression quantity APO and target vehicle speed tVSP. Target acceleration determining section 410 calculates target acceleration tACC in accordance with target engine torque tTE and target transmission ratio tRATIO. Target vehicle speed calculating section 420 calculates target vehicle speed tVSP to achieve target acceleration tACC. Engine speed converting section 430 calculates target engine speed tNE in accordance with target transmission ratio tRATIO and target vehicle speed tVSP.

Figure 16:
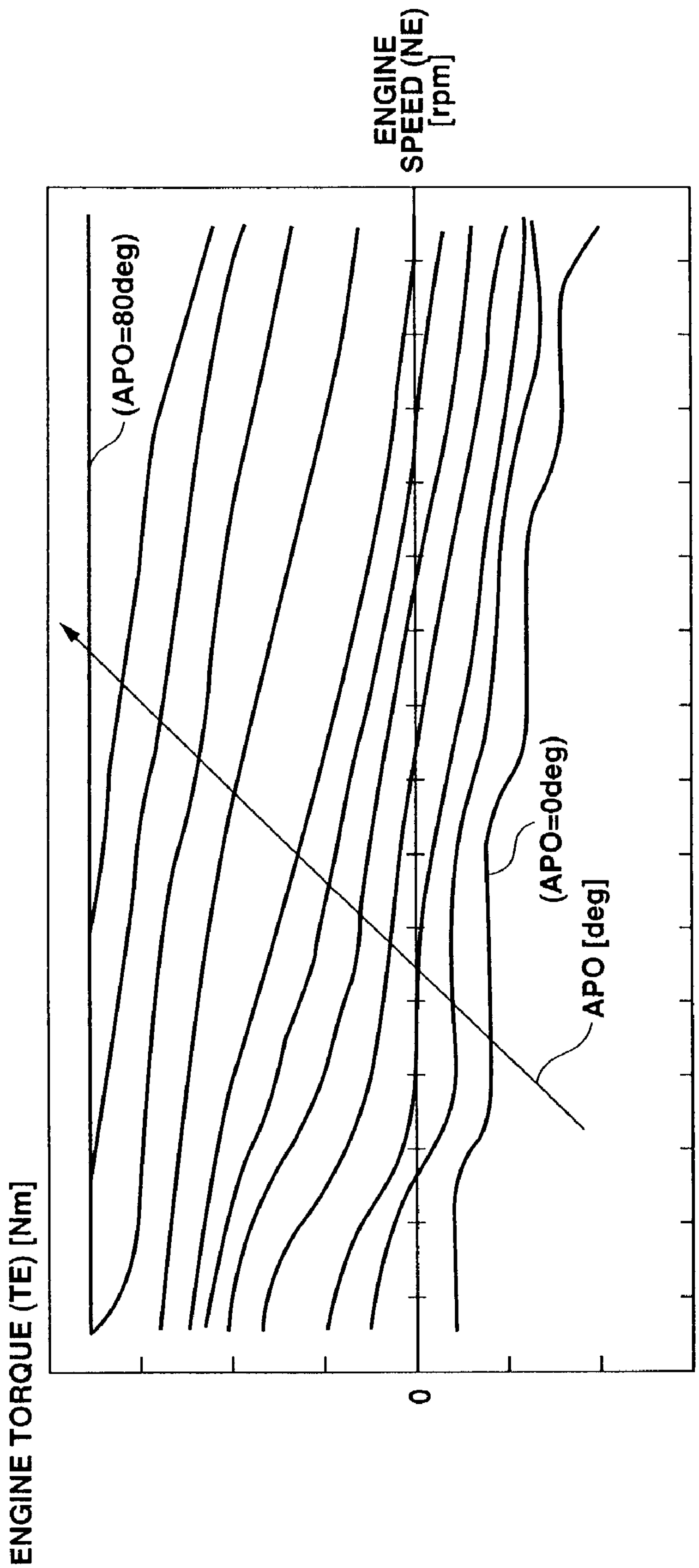
FIG. 16 is a graph showing a characteristic of an engine torque, used by a target engine torque setting section in the target vehicle speed calculating section of FIG. 15, for determining a target engine torque.

Target engine torque setting section 401 sets a before-filter target engine torque tTEO from accelerator depression quantity APO and target engine speed tNE, by lookup from a map representing a relation between engine speed and engine torque with acceleration depression quantity APO as a parameter, as shown in FIG. 16. Engine model 402 is a filter for compensating for a delay in engine 1 with a mathematical model of engine 1. In this example, engine model 402 is defined as:

$$Ge(s) = \frac{1}{1+\tau_e s} e^{-L_e s} \qquad \text{MATH 7}$$

In this equation τe is a time constant, and Le is a dead time. This system determines the target engine torque tTE by passing the before-filter target engine torque tTEO through this engine model 402. In this way, engine model 402 can provide target engine torque tTE more suitable to the actual vehicle with the compensation for delay, and facilitates setting of various parameters.

Figure 17:
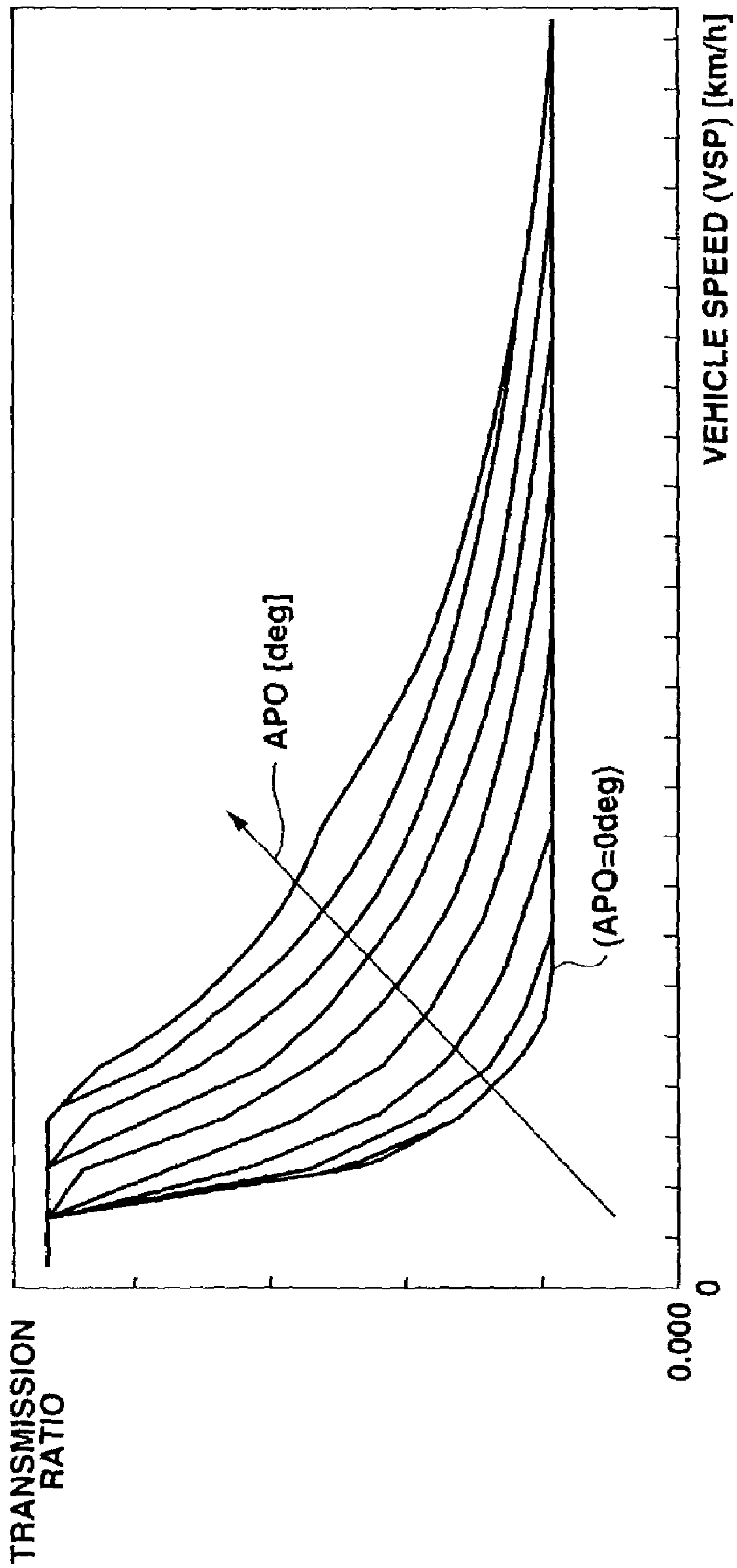
FIG. 17 is a graph showing a characteristic of a transmission ratio, used by a target transmission ratio setting section in the target vehicle speed calculating section of FIG. 15, for determining a target transmission ratio.

Target transmission ratio setting section 403 sets a before-filter target transmission ratio tRATIO0 from accelerator depression quantity APO and target vehicle speed tVSP, by lookup from a map representing a relation between vehicle speed and transmission ratio with acceleration depression quantity APO as a parameter, as shown in FIG. 17. Transmission model 404 is a filter for compensating for a delay in transmission 2 with a mathematical model of continuously-variable transmission 2 (shown in FIG. 1). In this example, transmission model 404 is defined as:

$$Gtm(s) = \frac{1}{1+\tau_{tm} s} e^{-L_{tm} s} \qquad \text{MATH 8}$$

In this equation τtm is a time constant, and Ltm is a dead time. This system determines the target transmission ratio tRATIO by passing the before-filter target transmission ratio tRATIO0 through this transmission model 404. In this way, transmission model 404 can provide target transmission ratio tRATIO more suitable to the actual vehicle with the compensation for delay, and facilitates setting of various parameters.

Target acceleration determining section 410 shown in FIG. 15 calculates target vehicle acceleration tACC in accordance with target engine torque tTE and target transmission ratio tRATIO, by using the following equation.

$$tACC = \frac{tTE \cdot tRATIO \cdot Gf}{M \cdot Rt} \qquad \text{MATH 9}$$

In this equation, M is a vehicle mass, Rt is a dynamic tire radius, and Gf is a final gear ratio.

Target vehicle speed calculating section 420 shown in FIG. 15 receives driving force control permission flag fSTART from control permitting section 30 of FIG. 2, actual vehicle speed aVSP, and target acceleration tACC from target acceleration determining section 410, and calculates target vehicle speed tVSP from these inputs according to a process explained below.

Figure 18:
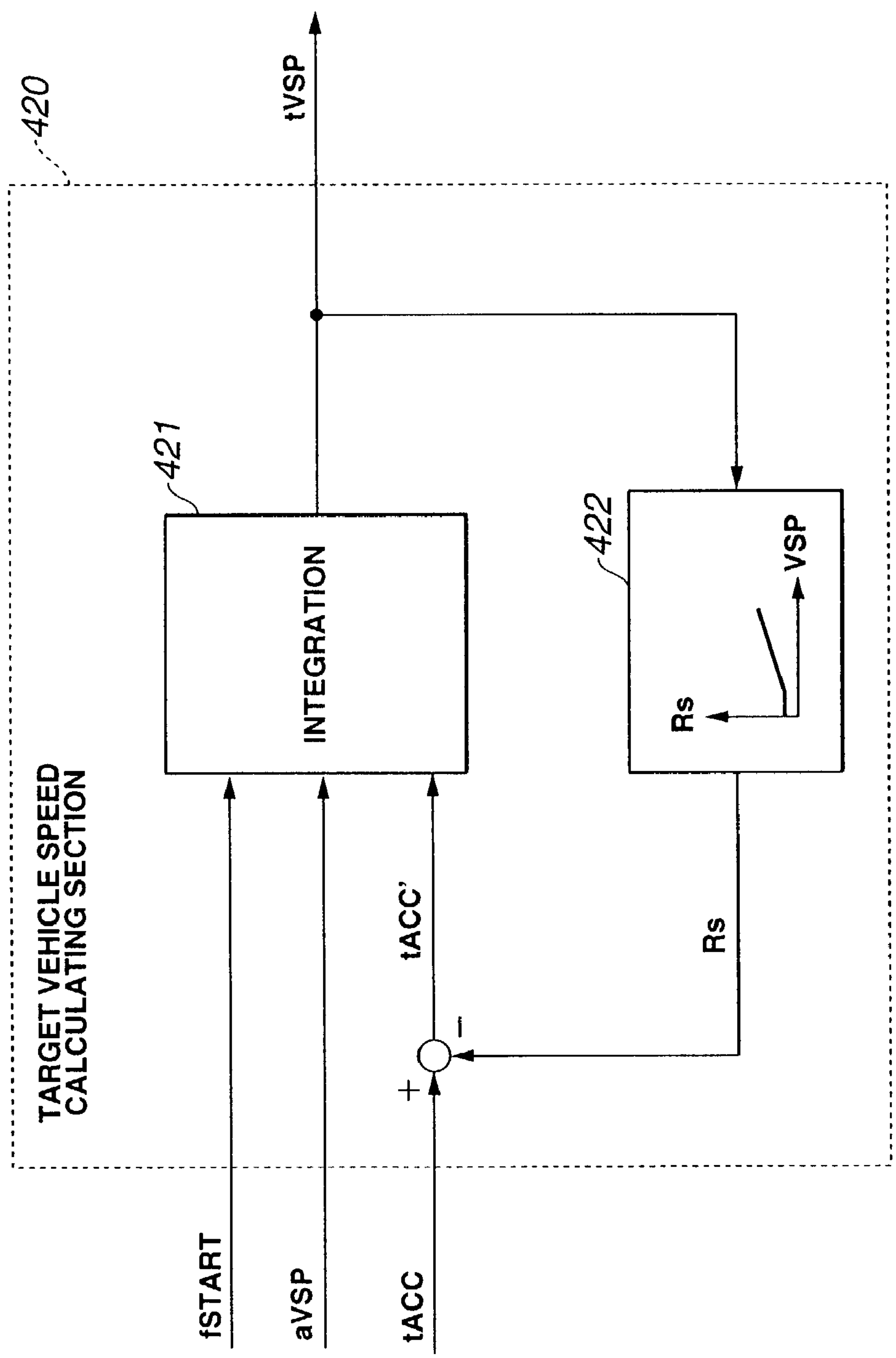
FIG. 18 is a functional block diagram showing a target vehicle speed calculating section shown in FIG. 15.

Target vehicle speed calculating section 420 of this example includes an integrating section 421 and a running resistance setting section 422, as shown in FIG. 18. Integrating section 421 receives the before-mentioned driving force control permission flag fSTART, actual vehicle speed aVSP, and target acceleration tACC determined by target acceleration determining section 410 of FIG. 15, and calculates target vehicle speed tVSP from modified target acceleration tACC' obtained by modification of target acceleration tACC with a running resistance Rs (road gradient). The calculation in integrating section 421 of FIG. 18 is substantially identical to the process in integrating section 42 shown in FIG. 4.

Figure 19:
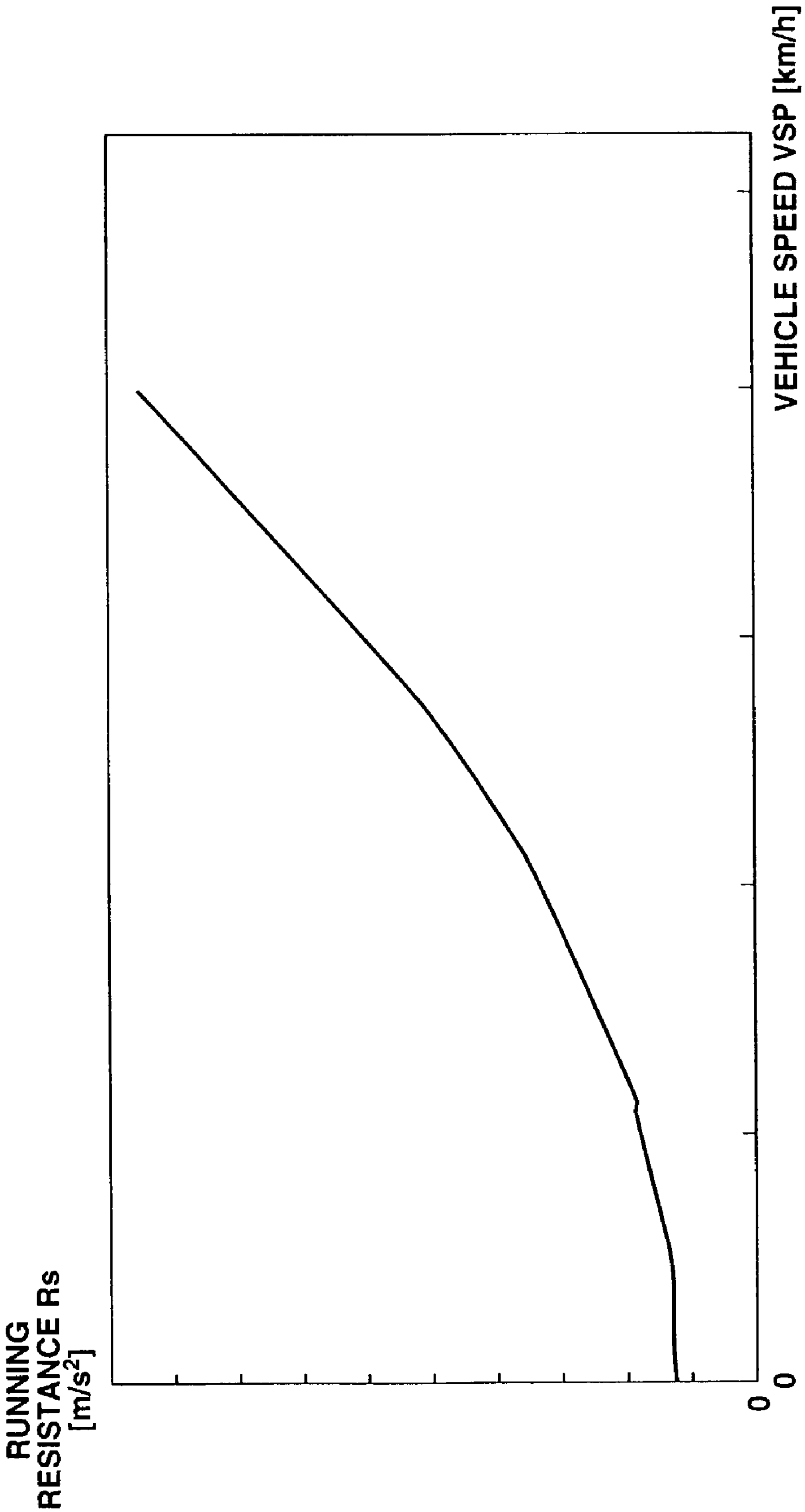
FIG. 19 is a graph showing a characteristic of a running resistance, used by a running resistance setting section in the target vehicle speed calculating section of FIG. 18.

Running resistance setting section 422 calculates running resistance Rs from target vehicle speed tVSP according to a predetermined map representing a relation between vehicle speed and running resistance, as shown, as an example, in FIG. 19. As shown in FIG. 19, running resistance Rs increases as the vehicle speed increases. Modified target acceleration tACC' is determined by subtracting running resistance Rs from target acceleration tACC of target acceleration determining section 410 shown in FIG. 15 (tACC'=tACC−Rs). The thus-determined modified target acceleration tACC' is supplied to integrating section 421, and used for calculation of target vehicle speed tVSP.

Figure 20A:
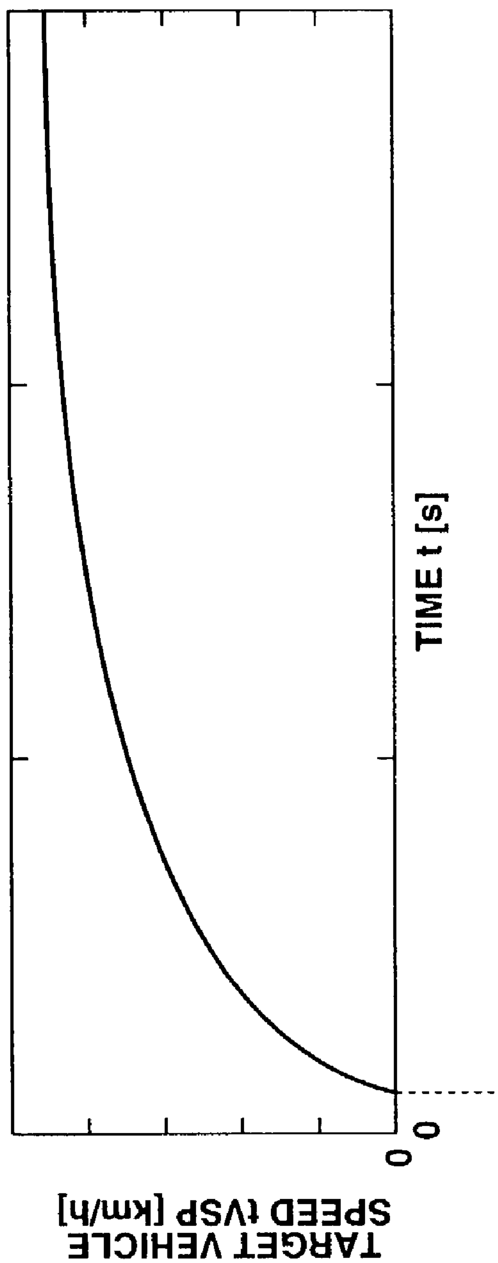
FIGS. 20A and 20B are time charts illustrating time series variation of the target vehicle speed obtained by the driving force control apparatus with the target vehicle speed setting section of FIG. 15.
Figure 20B:
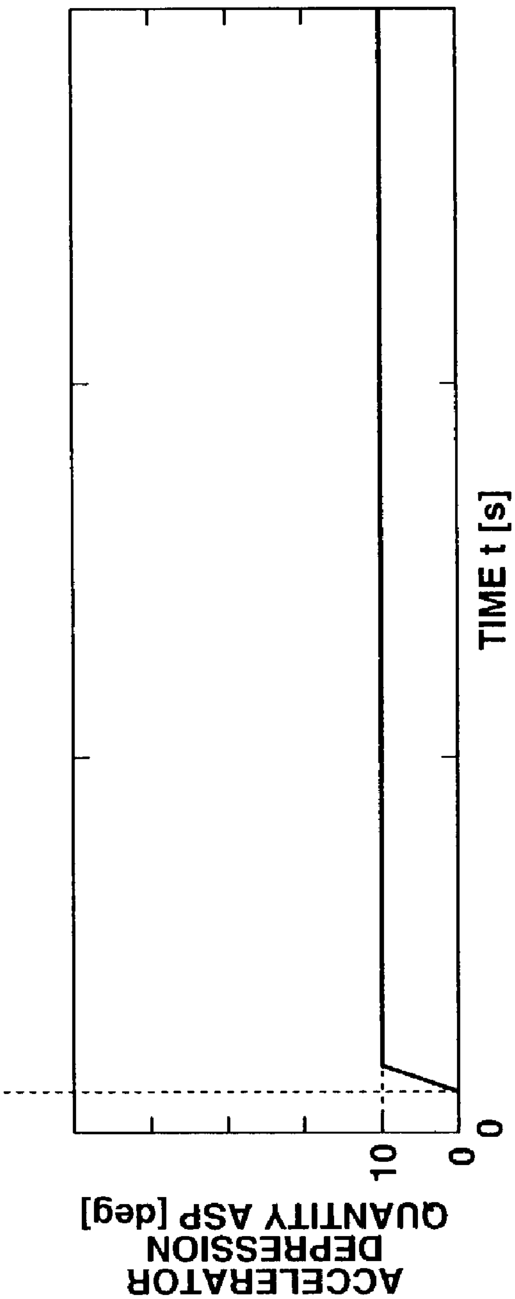
Figure 21A:
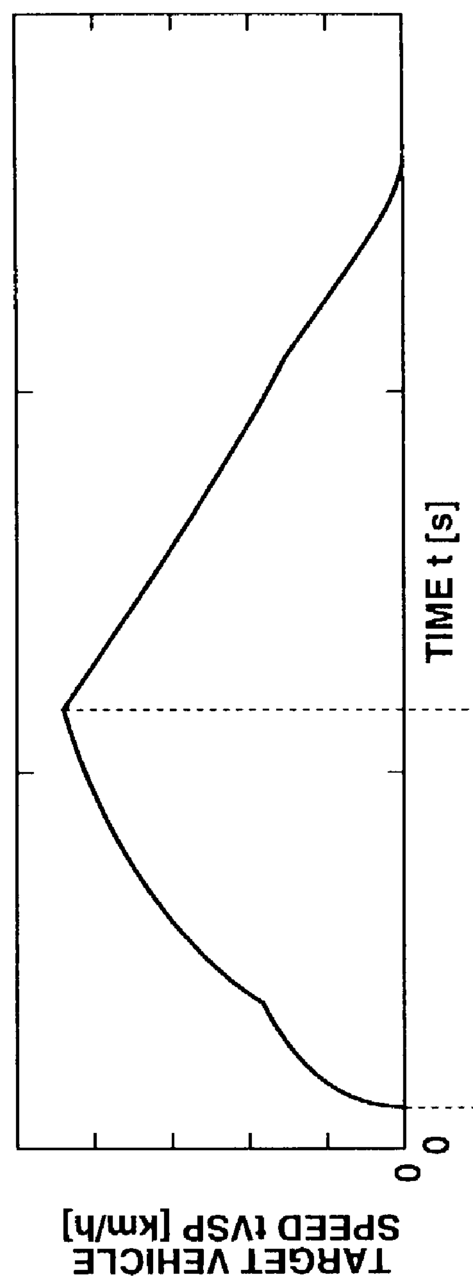
FIGS. 21A and 21B are time charts illustrating time series variation of the target vehicle speed obtained by the driving force control apparatus with the target vehicle speed setting section of FIG. 15, in response to an accelerator pedal operation different from the example of FIGS. 20A and 20B.
Figure 21B:
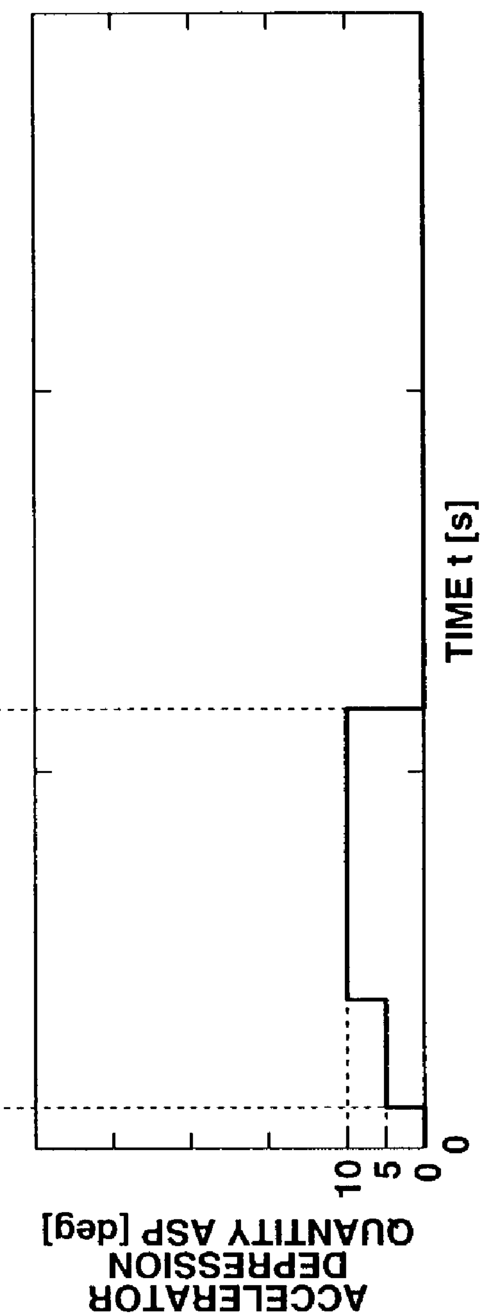

FIGS. 20A, 20B, 21A and 21B show examples of target vehicle speed tVSP calculated in the embodiment shown in FIGS. 15~19. FIGS. 20A and 20B are time charts showing time series variation of target vehicle speed tVSP obtained when the control is started from a stop state of the vehicle, and the accelerator depression quantity is held at a constant value (10 deg). FIGS. 21A and 21B are time charts showing time series variation of target vehicle speed tVSP when the control is started from a stop state, and the accelerator depression quantity is changed 5 deg→10 deg→0 deg. As evident from these figures, the system shown in FIGS. 15~19 can also calculate target vehicle speed tVSP adequately in accordance with the accelerator depression quantity.

With the target vehicle speed setting section 40 constructed as shown in FIG. 15, too, the control system can regain the vehicle acceleration to the level of target acceleration and regain the vehicle speed to the level of target vehicle smoothly when the vehicle enters a hill climbing condition with the accelerator pedal depression quantity being held at a constant value.

Figure 24:
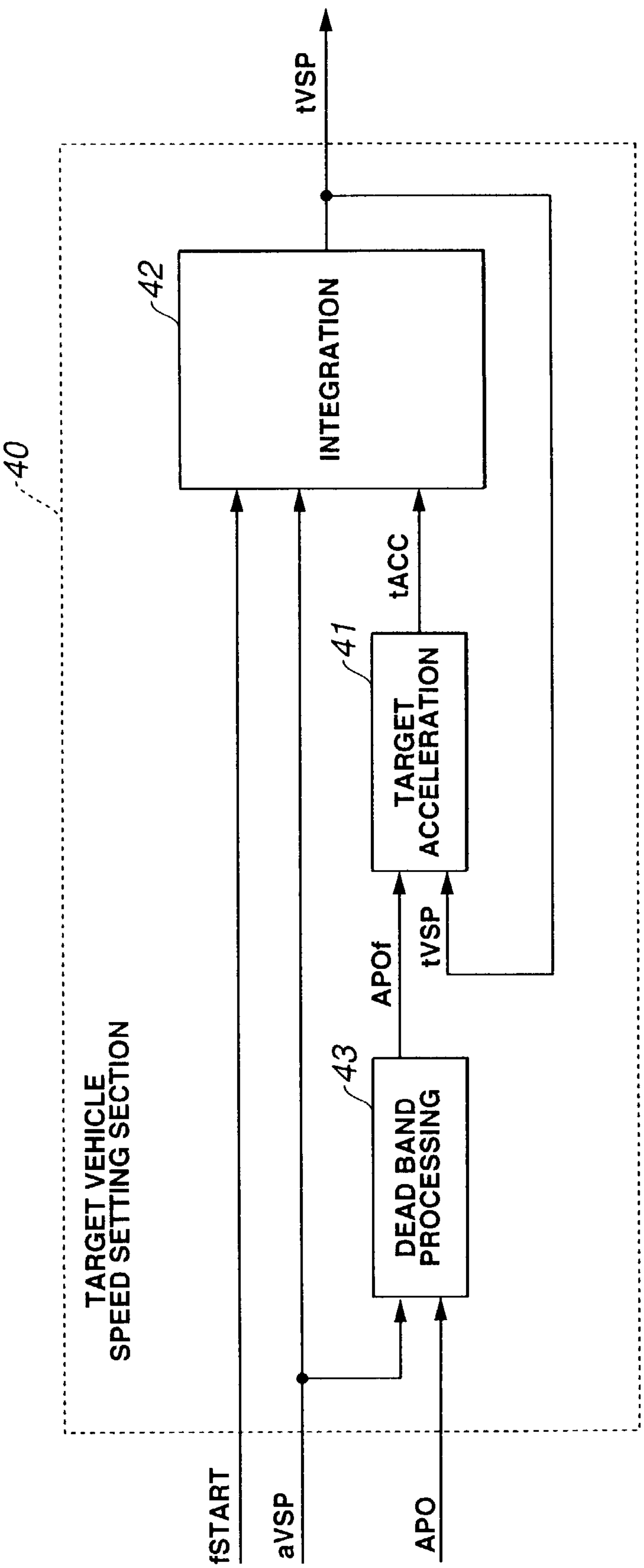
FIG. 24 is a functional block diagram showing a target vehicle speed setting section in a driving force control apparatus according to a third embodiment of the present invention.

FIGS. 24~27 show a third embodiment of the present invention, in which target vehicle speed setting section 40 is constructed as shown in FIG. 24.

A dead band processing section 43 is provided before target acceleration calculating section 41. In the example shown in FIG. 4, the accelerator depression quantity APO is directly supplied to target acceleration calculating section 41. In the example of FIG. 24, by contrast, dead band processing section 43 determines a dead band processed accelerator depression quantity APOf from accelerator depression quantity APO and supplies the dead band processed accelerator depression quantity APOf to target acceleration calculating section 41.

Figure 25:
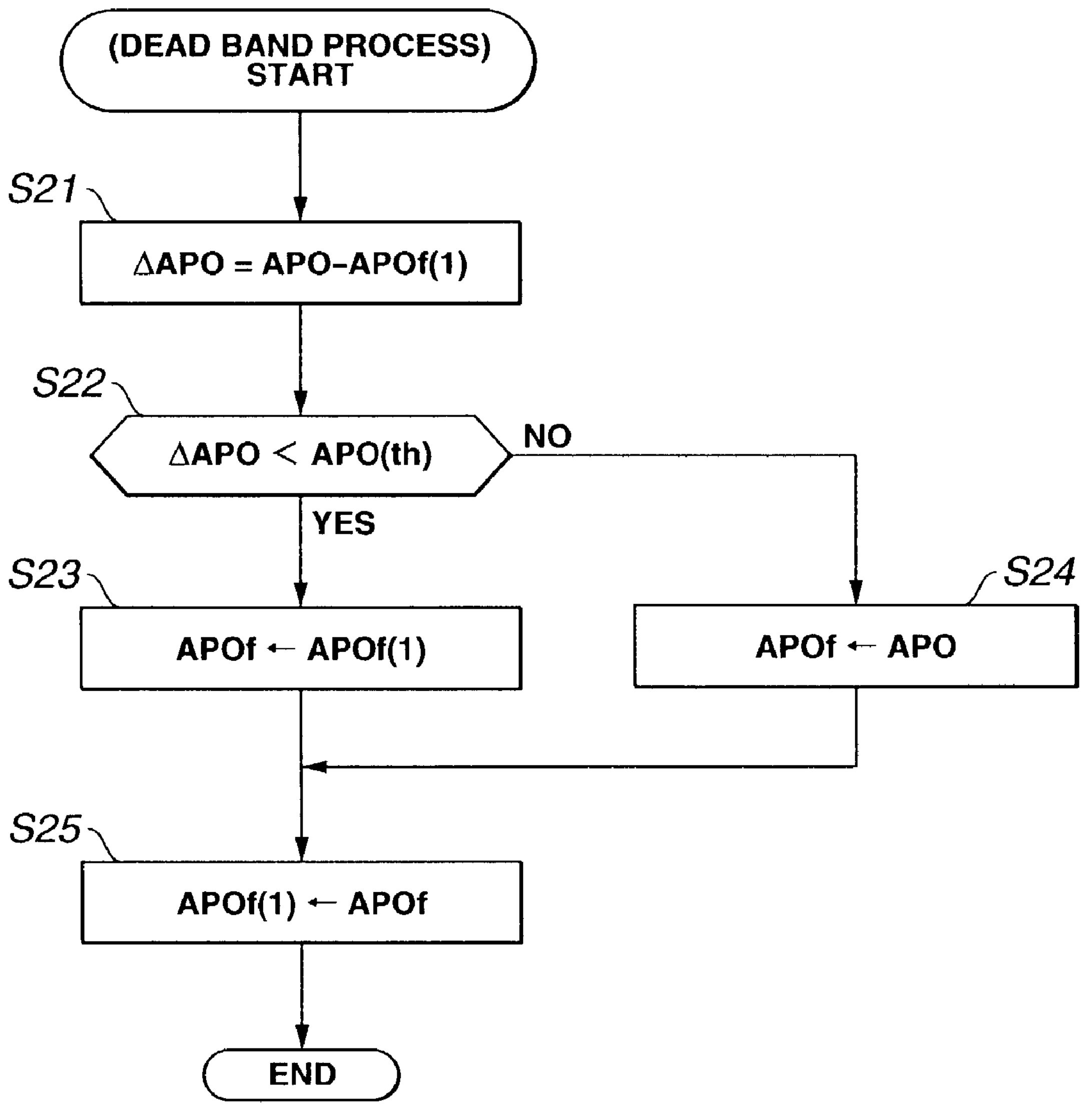
FIG. 25 is a flowchart showing a control program of a dead band processing section shown in FIG. 24.
Figure 26:
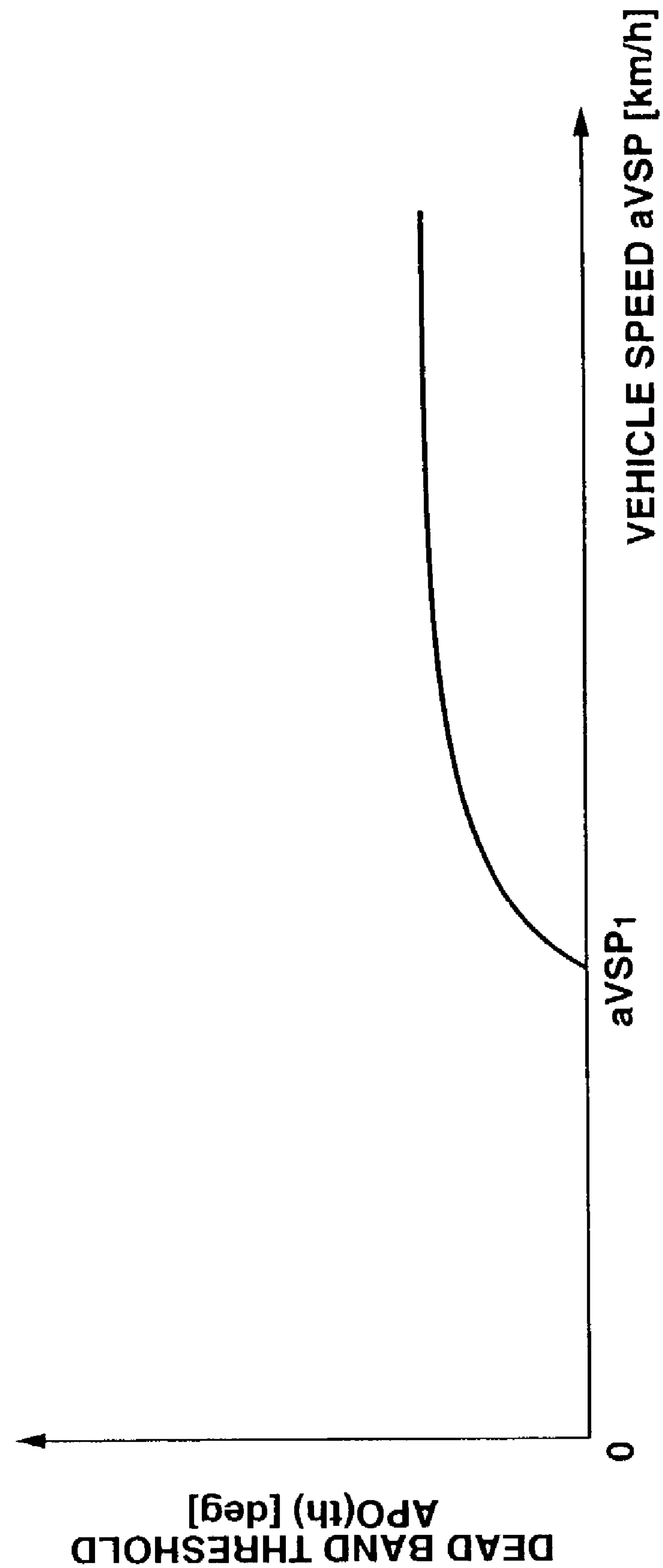
FIG. 26 is a graph showing a characteristic of a threshold of the dead band used by the dead band processing section of FIG. 24.

FIG. 25 shows a process performed in dead band processing section 43. At step S21, dead band processing section 43 calculates an accelerator pedal depression variation ΔAPO by subtracting a previous dead band processed accelerator depression quantity APOf(1), from accelerator pedal depression quantity APO (ΔAPO =APO−APOf(1)). Then, at step S22, section 43 examines whether accelerator depression variation ΔAPO is within a dead band by examining whether accelerator depression variation ΔAPO is smaller than a dead band threshold APO(th) (ΔAPO<APO (th)?). In this example, dead band threshold APO(th) is varied in accordance with actual vehicle speed aVSP, as shown in FIG. 26. Dead band threshold APO(th) is equal to zero in a low vehicle speed region in which the vehicle speed is lower than a predetermined vehicle speed aVSP1. In a higher speed region in which the vehicle speed is equal to or higher than predetermined vehicle speed aVSP1, dead band threshold APO(th) is increased as the vehicle speed increases.

When accelerator pedal depression variation ΔAPO is within the dead band, section 43 proceeds from step S22 to step S23, and holds the dead band processed accelerator depression quantity APOf invariably equal to the previous value by setting the previous value APOf(1) to dead value processed accelerator depression quantity APOf (APOf←APOf(1)). When, on the other hand, accelerator pedal depression variation ΔAPO is greater than or equal to dead band threshold APO(th), section 43 proceeds from step S22 to step S24, and updates the dead band processed accelerator depression quantity APOf to the current value of accelerator pedal depression quantity APO obtained in the current control cycle, by setting the current value of accelerator pedal depression quantity APO to the dead band processed accelerator pedal depression quantity APOf (APOf←APO). At step S25, section 43 saves the dead band processed accelerator pedal depression quantity APOf thus determined at step S23 or S24, as the previous dead band processed accelerator depression quantity APOf(1) for use at step S21 in the next control cycle.

Figure 27:
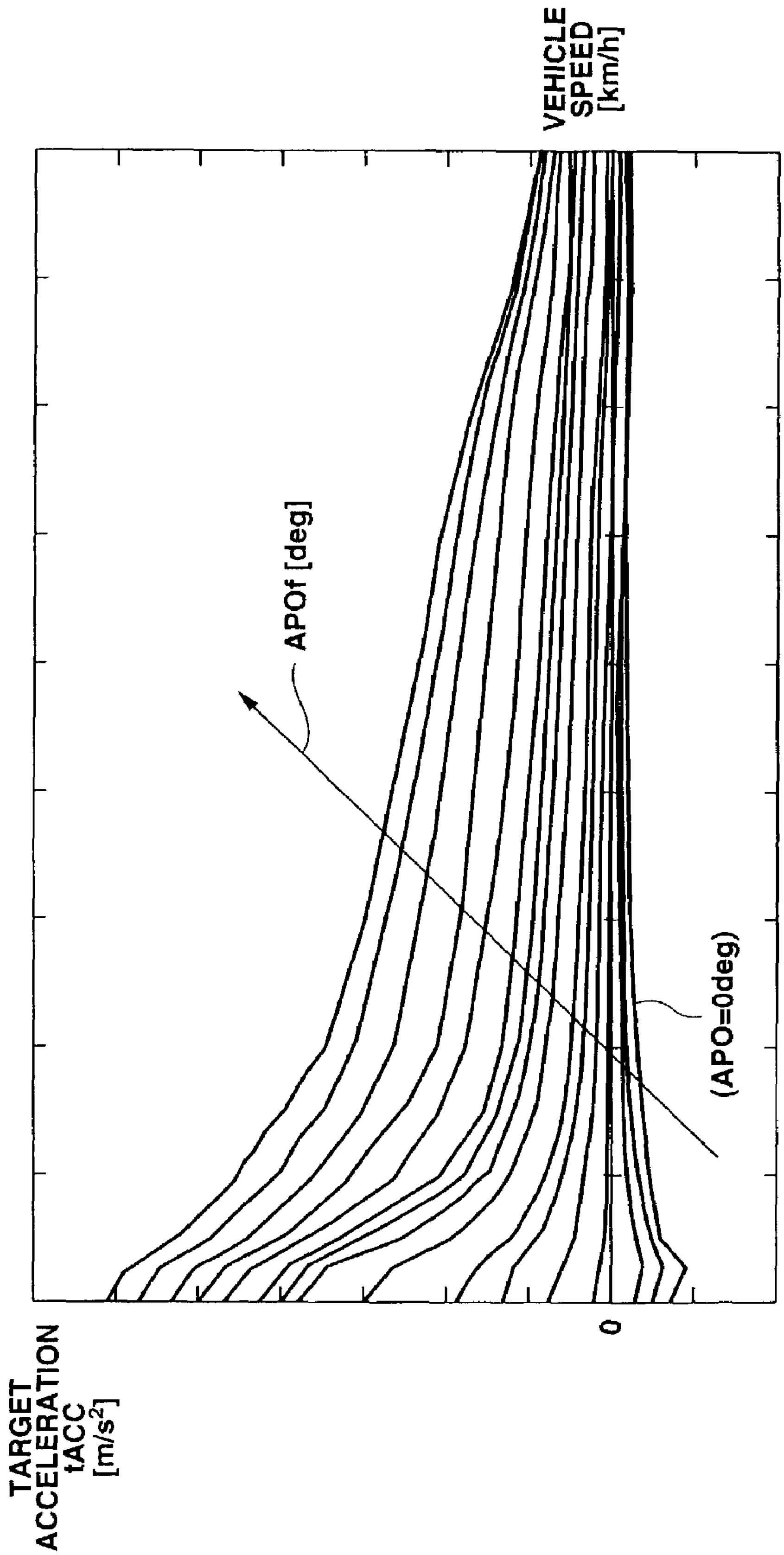
FIG. 27 is a graph showing a characteristic of acceleration, used by the target acceleration determining section according to the third embodiment.

Dead band processing section 43 of FIG. 24 supplies the dead band processed accelerator depression quantity APOf thus determined at step S23 or S24, to target acceleration calculating section 41. By using this dead band processed accelerator depression quantity APOf, instead of the sensed accelerator depression quantity APO, target acceleration calculating section 41 of this example determines target acceleration tACC in the same manner as in the preceding examples. Accordingly, for determining target acceleration tACC, the target acceleration calculating section 41 uses a target acceleration map as shown in FIG. 27 in which the sensed accelerator pedal depression quantity APO in FIG. 5 is replaced by the dead band processed accelerator depression quantity APOf.

Figure 28:
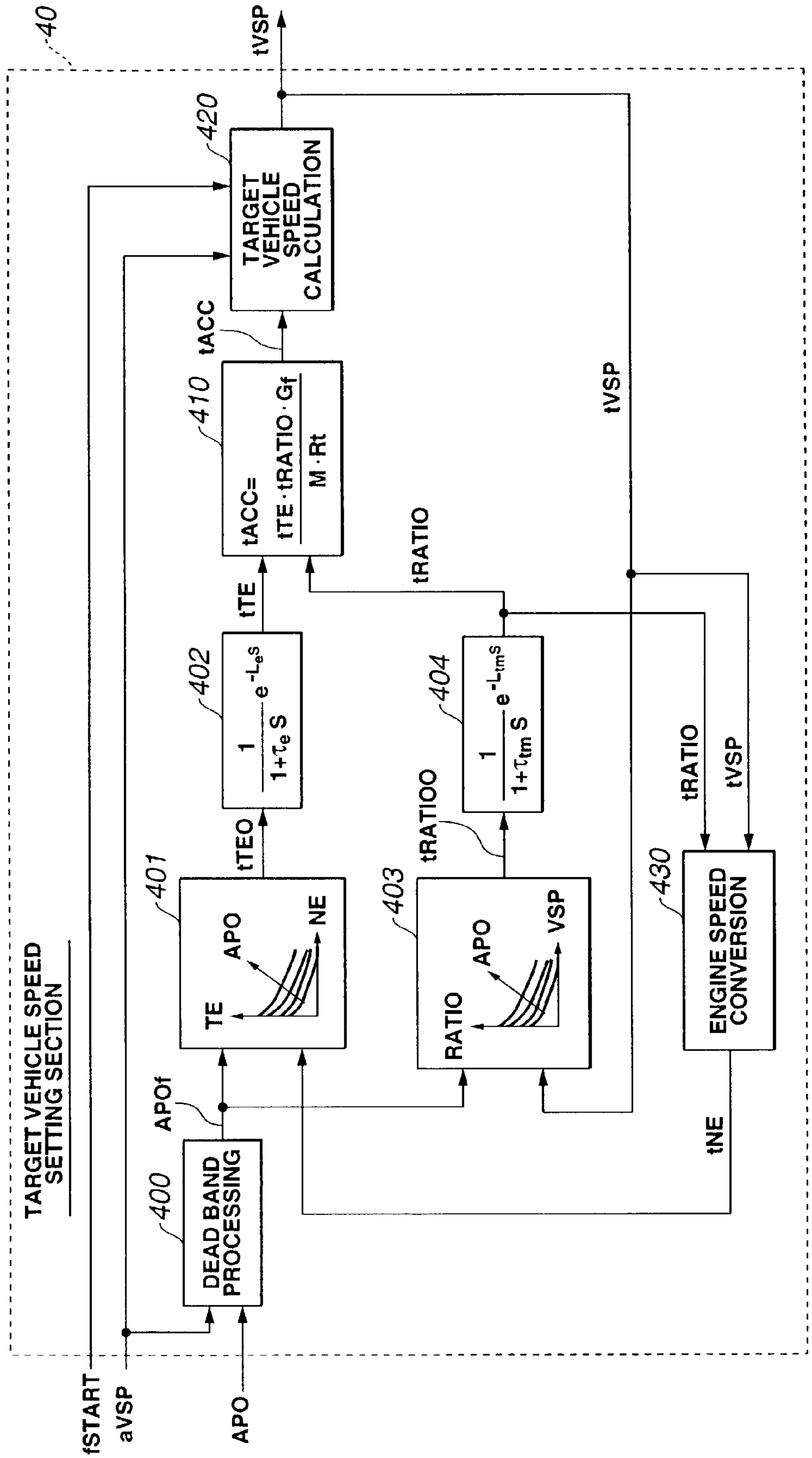
FIG. 28 is a functional block diagram showing a target vehicle speed setting section in a driving force control apparatus according to a fourth embodiment of the present invention.

FIG. 28 shows a fourth embodiment of the present invention. A target vehicle speed setting section 40 of FIG. 28 is similar to the system of FIG. 15, but the function of dead band is incorporated as in the example of FIG. 24. An accelerator pedal depression quantity dead band processing section 400 is provided before the target engine torque setting section 401 and target transmission ratio setting section 403. Accelerator pedal depression quantity dead band processing section 400 is arranged to determine the dead band processed accelerator depression quantity APOf in the same manner as the dead band processing section 43 in FIG. 25, and to supply the thus-determined value APOf to target engine torque setting section 401 and target transmission ratio setting section 403, instead of supplying the accelerator depression quantity APO directly.

Figure 29:
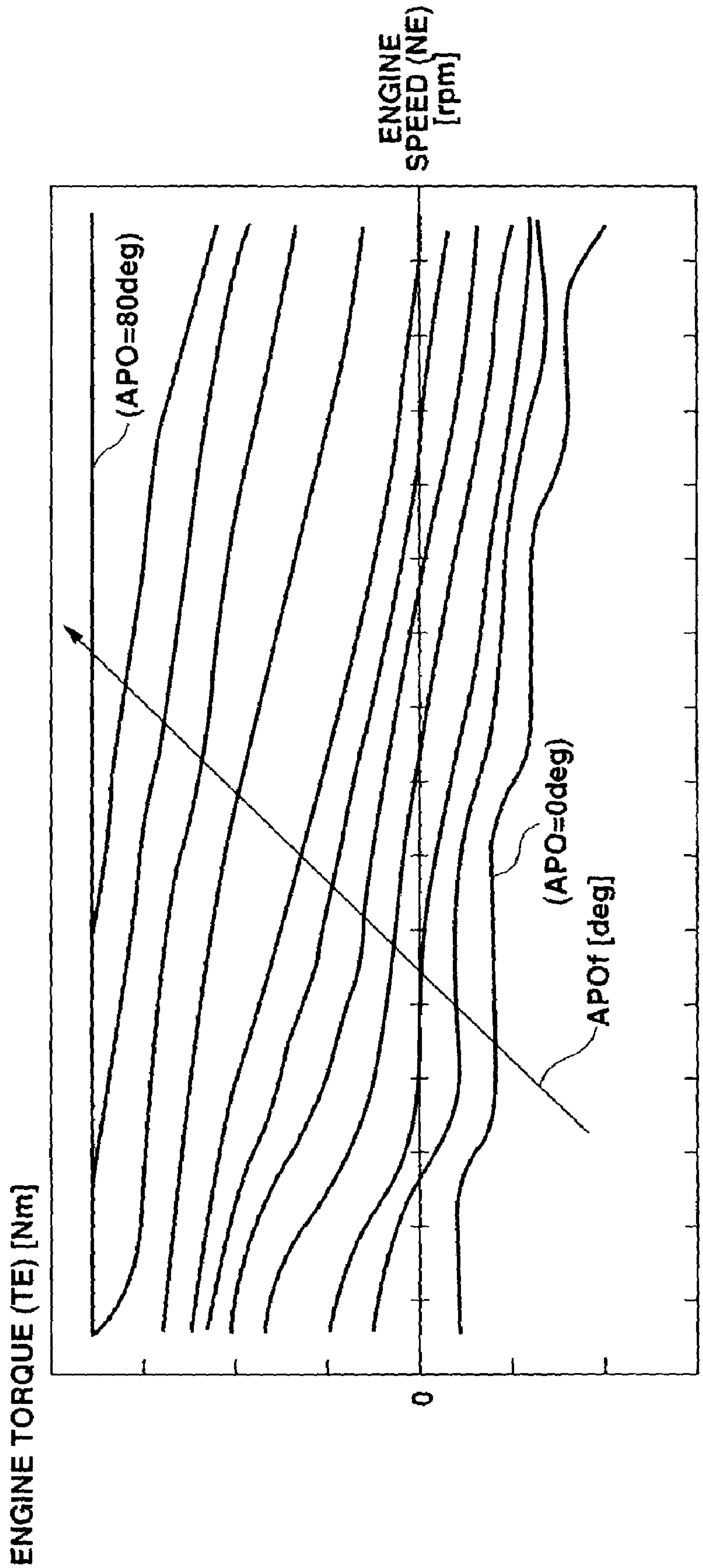
FIG. 29 is a graph showing a characteristic of an engine torque used by a target engine torque setting section in the target vehicle speed setting section of FIG. 28, for determining a target engine torque.
Figure 30:
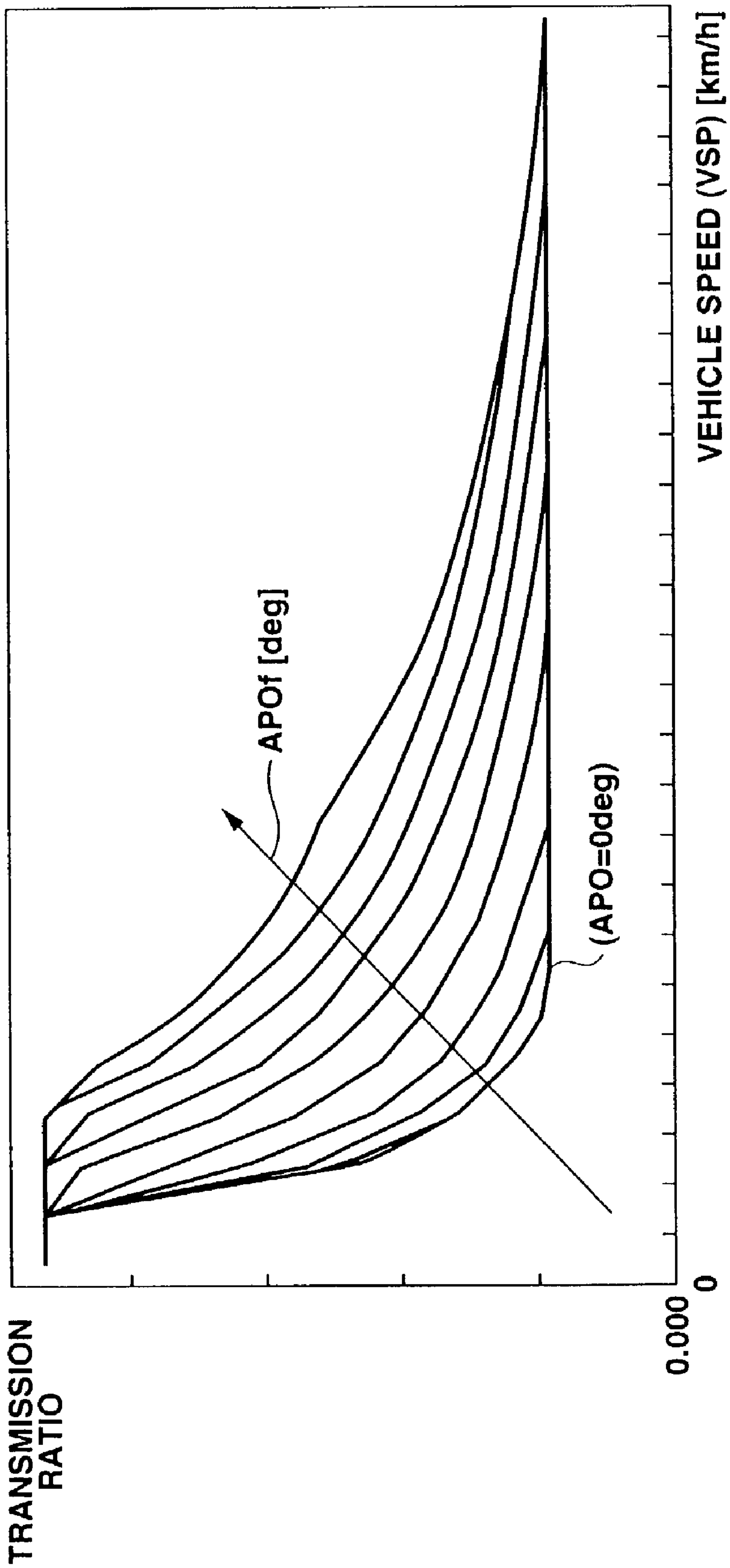
FIG. 30 is a graph showing a characteristic of a transmission ratio used by a target transmission ratio setting section in the target vehicle speed setting section of FIG. 28, for determining a target transmission ratio.

Target engine torque setting section 401 and target transmission ratio setting section 403 determine the before-filter target engine torque tTEO and before-filter target transmission ratio tRATIO0 by using the dead band processed accelerator depression quantity APOf instead of the accelerator pedal depression quantity APO. FIGS. 29 and 30 show target engine torque map and target transmission ratio map for target engine torque setting section 401 and target transmission ratio setting section 403. In these maps, the accelerator pedal depression quantity APO in FIGS. 16 and 17 is replaced by the dead band processed accelerator depression quantity APOf.

Figure 31:
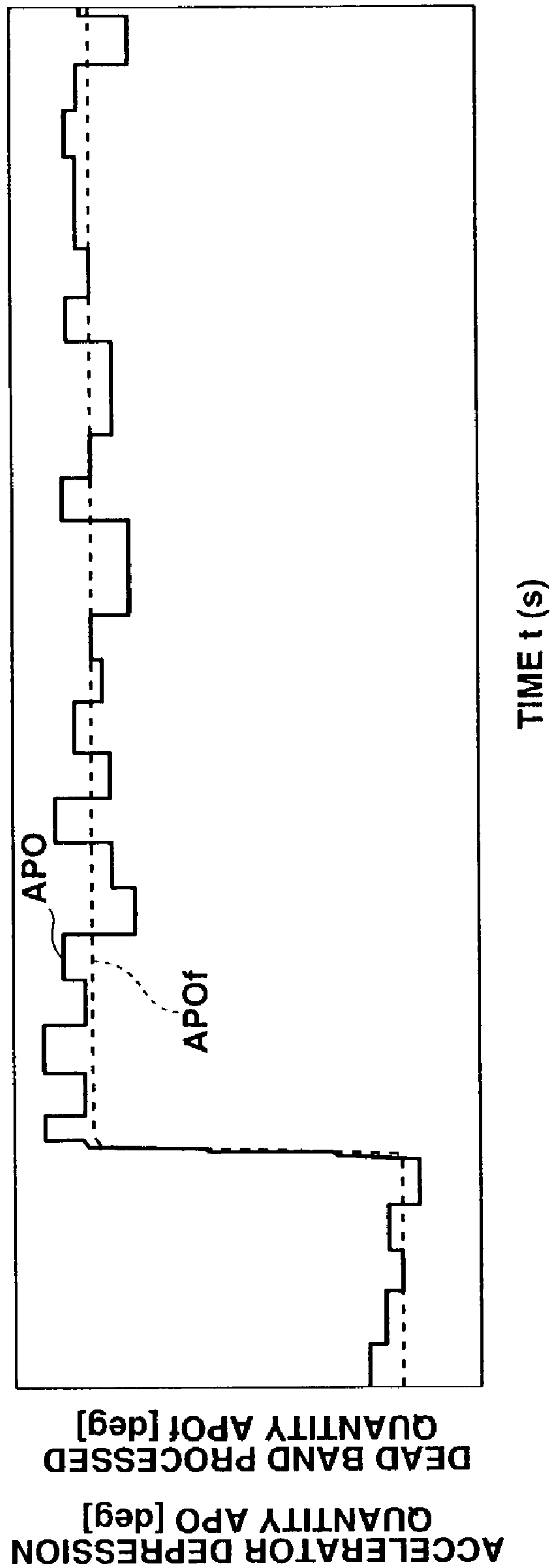
FIG. 31 is a time chart illustrating a time series variation of a dead band processed accelerator pedal depression quantity obtained by the apparatus of the third embodiment shown in FIGS. 24~27 or the apparatus of the fourth embodiment shown in FIGS. 28~30.
Figure 32A:
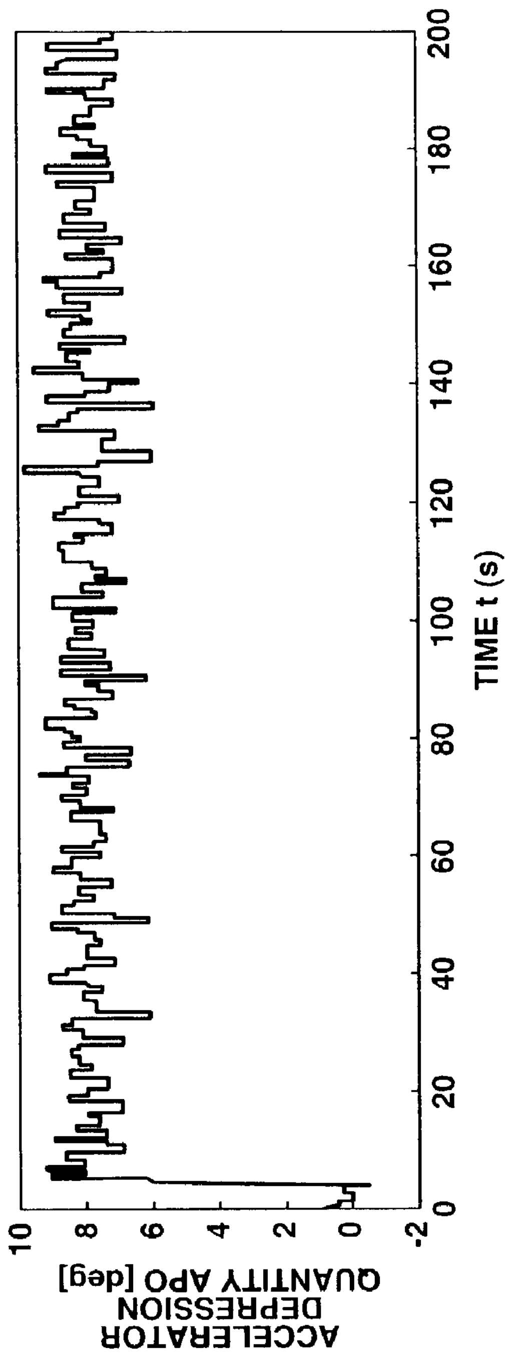
FIGS. 32A and 32B are time charts illustrating operations of the apparatus of the third embodiment shown in FIGS. 24~27 or the apparatus of the fourth embodiment shown in FIGS. 28~30, in terms of time series variation of the target acceleration.
Figure 32B:
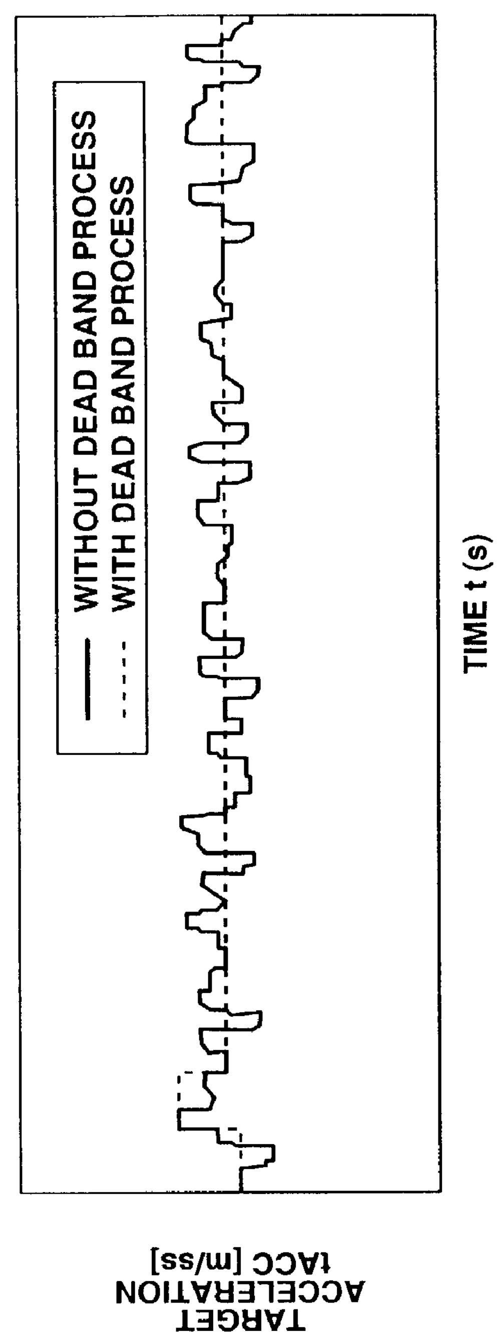

In the practical example of FIGS. 24~27 or the practical example of FIGS. 28~30, the sensed accelerator pedal depression quantity APO is replaced by the dead band processed accelerator depression quantity APOf determined by the process shown in FIG. 25. Therefore, the driving force control apparatus uses the previous accelerator pedal depression quantity when the change ΔAPO in the accelerator pedal depression quantity during one calculation cycle is smaller than the predetermined threshold value APO(th). Dead band processed accelerator pedal depression quantity APOf varies smoothly as shown by a broken line in FIG. 31 even when the accelerator pedal depression quantity is changed repeatedly by small steps. Consequently, even when the accelerator depression quantity APO is changed minutely and repeatedly as shown in FIG. 32A, the target acceleration tACC varies smoothly as shown by a broken line in FIG. 32B. Accordingly, the target vehicle speed tVSP too varies smoothly, as shown by a broken line of FIG. 33. Thus, the control system of these embodiments can prevent unwanted repetition of acceleration and deceleration, and provide smooth variation in the vehicle speed as shown by broken line in FIG. 33.

Figure 33:
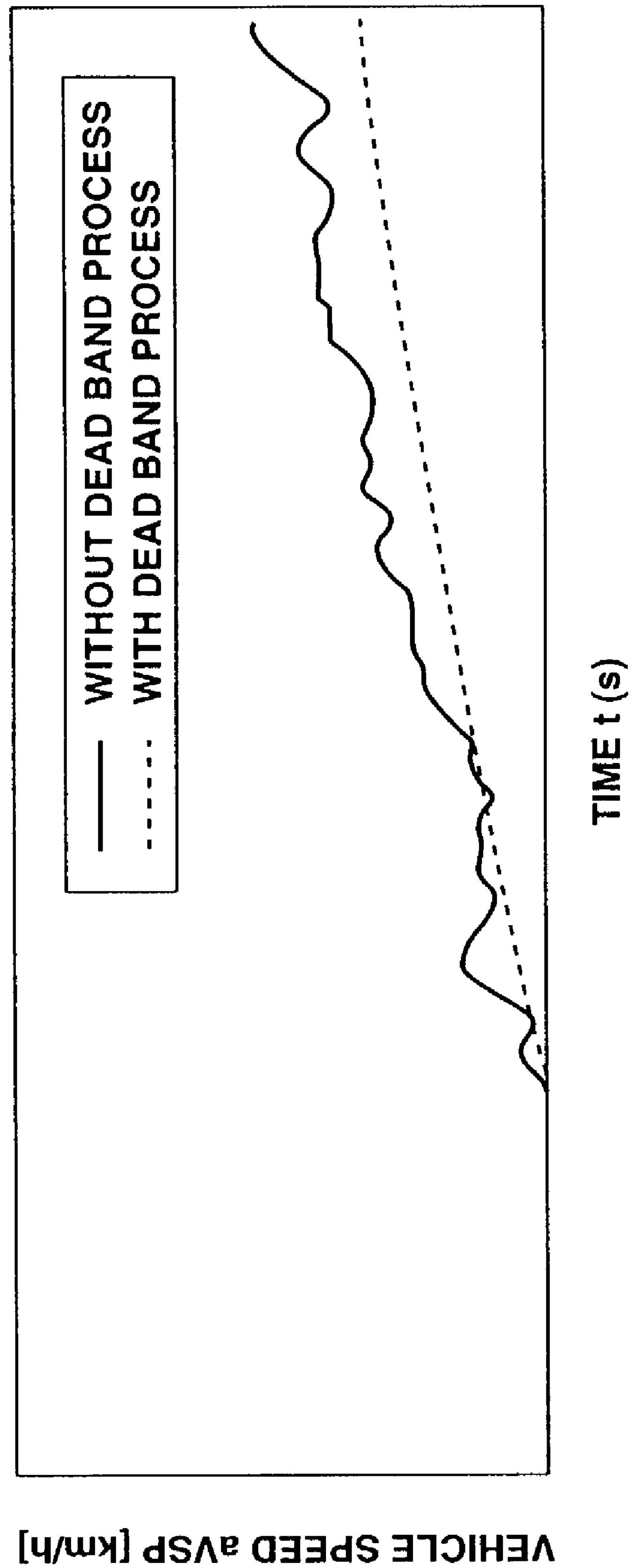
FIG. 33 is a time chart illustrating operations of the apparatus of the third embodiment shown in FIGS. 24~27 or the apparatus of the fourth embodiment shown in FIGS. 28~30, in terms of time series variation of the vehicle speed.

Dead band threshold APO(th) is set equal to zero as shown in FIG. 26 when actual vehicle speed aVSP is lower than predetermined speed aVSP1. Thus, in the low vehicle speed region, the control apparatus refrains from carrying out the dead band operation, and thereby facilitates fine adjustment of the vehicle speed with the accelerator pedal by making the sensitivity of the vehicle speed to the accelerator operation. As shown in FIG. 26, dead band threshold APO (TH) is increased with increase in vehicle speed beyond aVSP1. Therefore, the control apparatus can prevent too frequent changes in acceleration and deceleration reliably as shown in FIGS. 31~33, in the higher vehicle speed region.

Figure 34:
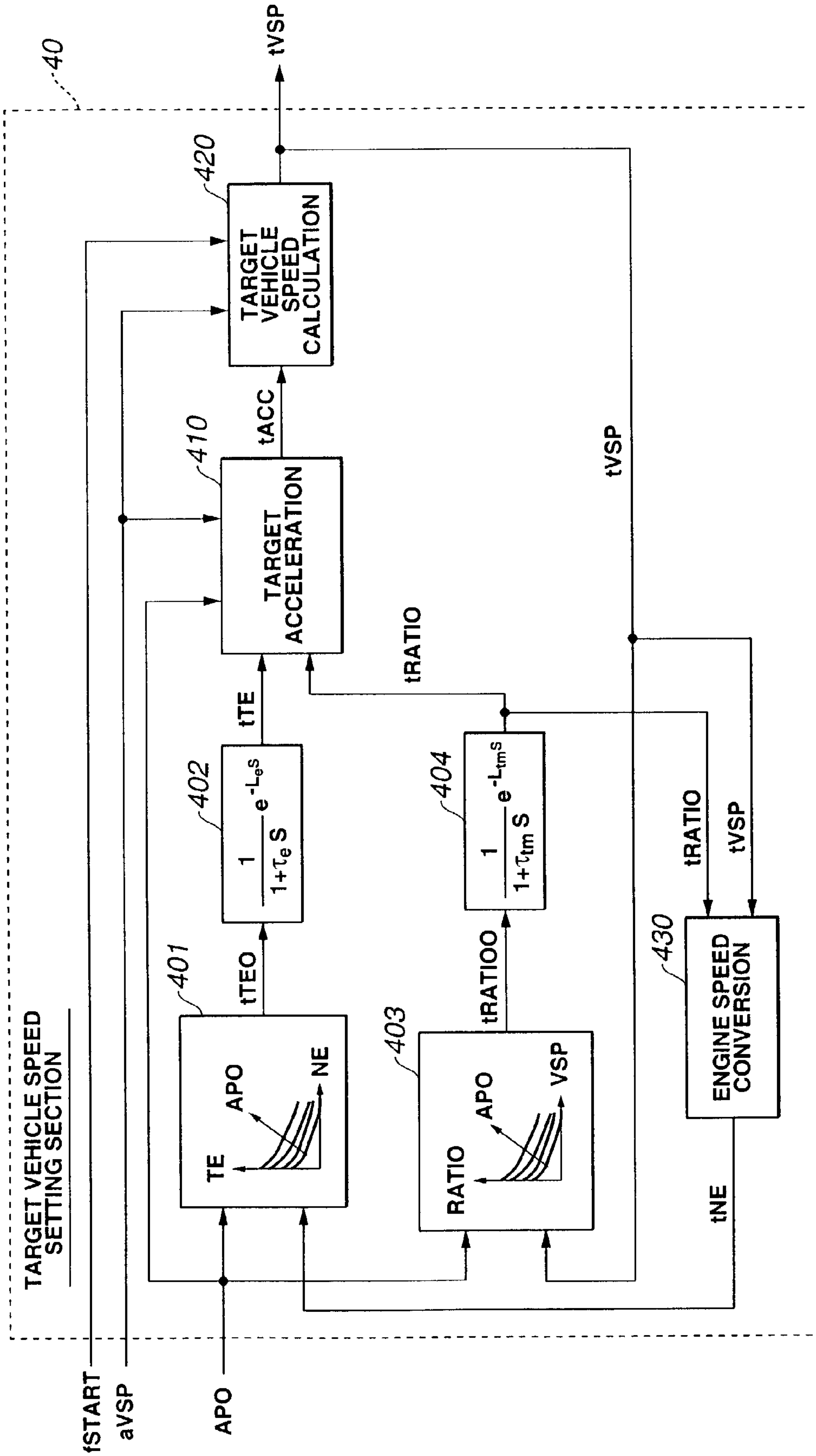
FIG. 34 is a functional block diagram showing a target vehicle speed setting section in a driving force control apparatus according to a fifth embodiment of the present invention.
Figure 35:
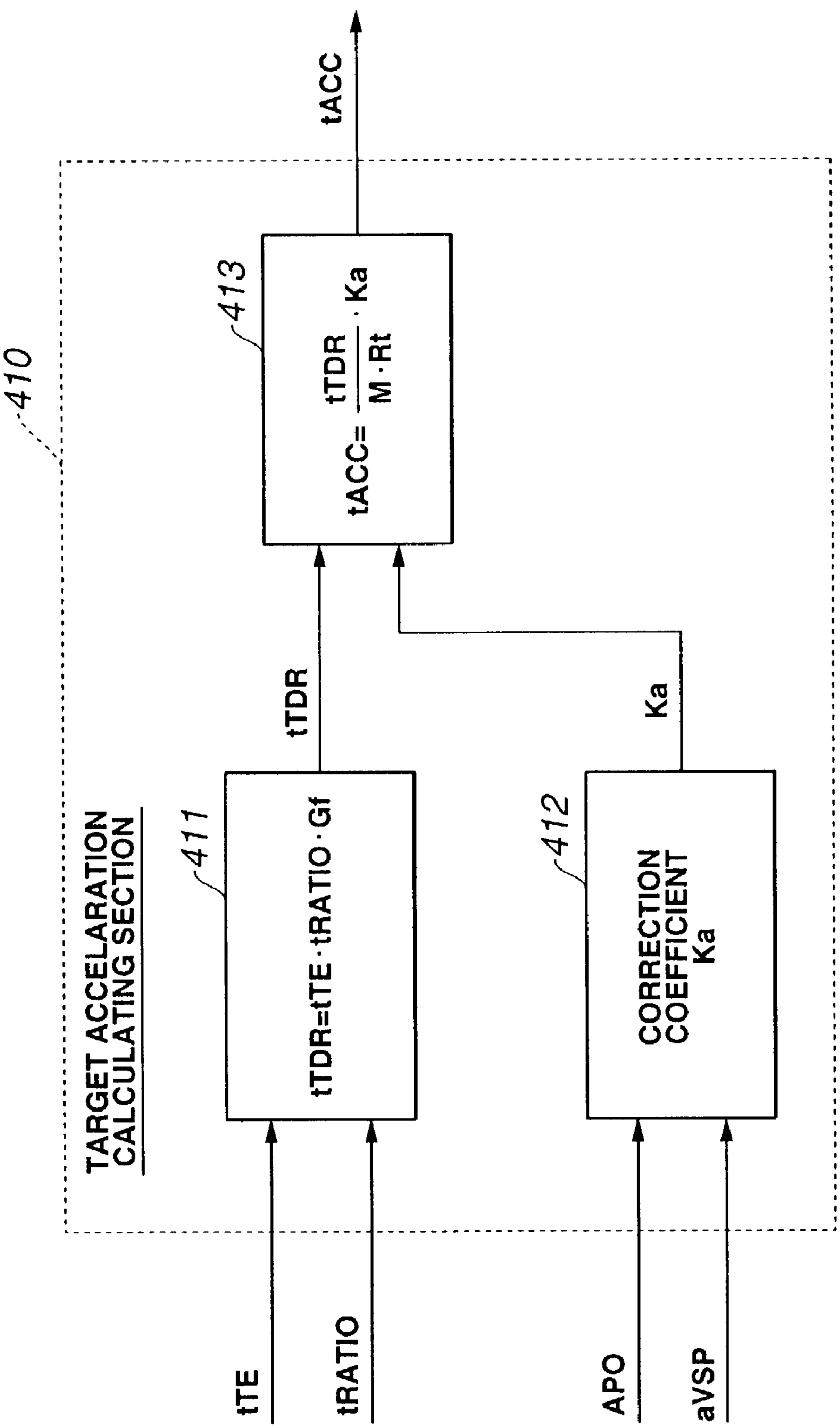
FIG. 35 is a functional block diagram showing a target acceleration calculating section in the target vehicle setting section of FIG. 34.

FIGS. 34~36 shows a fifth embodiment of the present invention in which target vehicle speed setting section 40 is changed from the form shown in FIG. 15 to the form shown in FIG. 34.

Target acceleration determining section 410 is arranged to receive actual vehicle speed aVSP and sensed accelerator pedal depression quantity APO as well as target engine torque tTE and target transmission ratio tRATIO, and to calculate target acceleration tACC from these inputs as shown in FIG. 35.

As shown in FIG. 35, target acceleration determining section 410 of this example is composed of a target driving torque calculating section 411, a target acceleration correction coefficient determining section 412 and an acceleration calculating section 413.

Target driving force calculating section 411 calculates a target driving torque tTDR from target engine torque tTE and target transmission ratio tRATIO, by using a final gear ratio Gf, according to the following equation.

$$tTDR = tTE \cdot tRATIO \cdot Gf$$

Figure 36A:
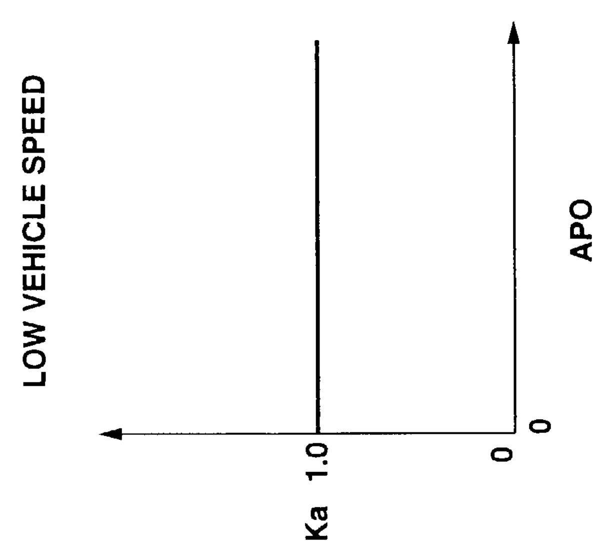
FIGS. 36A, 36B and 36C are graphs showing characteristics of a target acceleration correction coefficient used in three different vehicle speed regions.
Figure 36B:
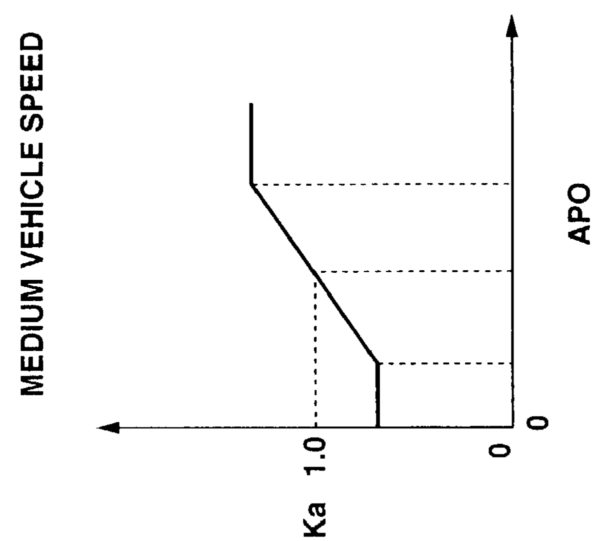
Figure 36C:
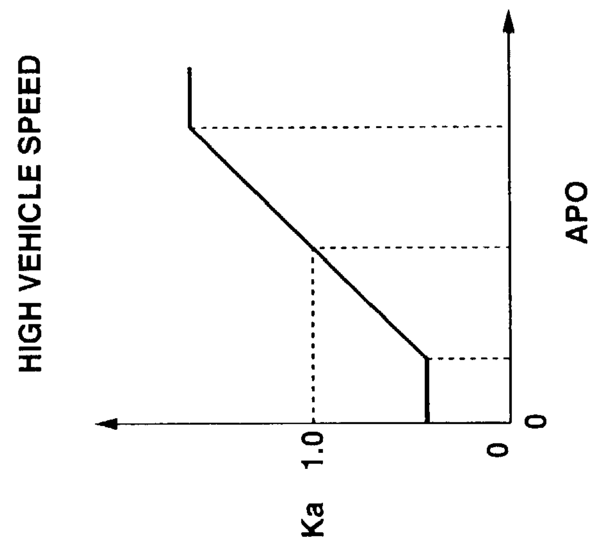

Target acceleration correction coefficient determining section 412 determines a target acceleration correction coefficient Ka from accelerator pedal depression quantity APO and actual vehicle speed aVSP by using maps shown in FIGS. 36A, 36B and 36C. In determining target acceleration correction coefficient Ka, determining section 412 uses the map of FIG. 36A when actual vehicle speed aVSP is in a low vehicle speed region, the map of FIG. 36B when actual vehicle speed aVSP is in a medium vehicle speed region, and the map of FIG. 36C when actual vehicle speed aVSP is in a high vehicle speed region. Target acceleration correction coefficient Ka is held constantly equal to one without regard to acceleration pedal depression quantity APO in the low vehicle speed region as shown in FIG. 36A. In each of the medium and high vehicle speed regions, target acceleration correction coefficient Ka is decreased below one with decrease in accelerator pedal depression quantity APO when accelerator pedal depression quantity APO is in a smaller region. When accelerator pedal depression quantity APO is in a larger region, target acceleration correction coefficient Ka is increased beyond one with increase in accelerator pedal depression quantity APO.

Acceleration calculating section 413 shown in FIG. 35 calculates target acceleration tACC in accordance with the target driving torque tTDR, and target acceleration correction coefficient Ka, by using the following equation.

$$tTDR = \frac{tTDR}{M \cdot Rt} Ka \qquad \text{MATH 10}$$

In this equation, M is vehicle mass, and Rt is dynamic tire radius. The thus-determined target acceleration tACC is used for the driving force control as in the preceding embodiments.

With the target acceleration correction coefficient Ka determined in accordance with vehicle speed aVSP and accelerator pedal depression quantity APO as shown in FIGS. 36A, 36B and 36C, the control apparatus according to this embodiment can provide the following effects.

In the low vehicle speed region, the control system allows the driver to adjust the vehicle speed minutely with accelerator pedal operation by fixing target acceleration correction coefficient Ka at 1 irrespective of accelerator pedal depression quantity APO. In the medium and high vehicle speed regions, the control system makes target acceleration correction coefficient Ka smaller than one in the smaller range of accelerator depression quantity APO, and by so doing prevents minute changes in accelerator pedal depression quantity APO from causing changes in target acceleration tACC and changes in the vehicle speed.

Figure 37A:
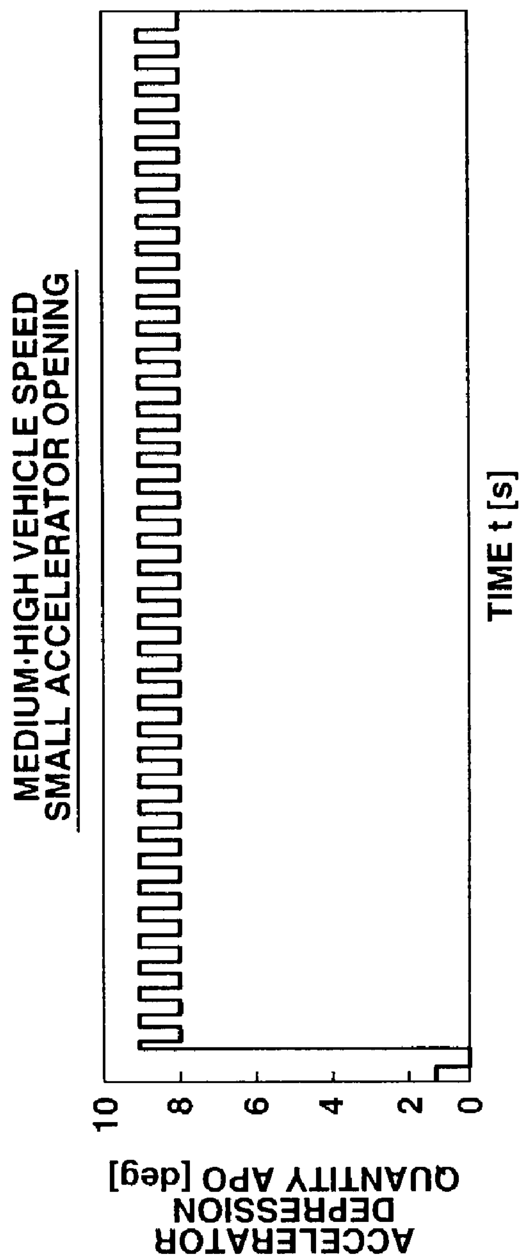
FIGS. 37A and 37B are time charts illustrating operations of the driving force control apparatus of the fifth embodiment shown in FIGS. 34 and 35, in terms of time series variation of the target acceleration in the medium or high vehicle speed region when the accelerator opening is small.
Figure 37B:
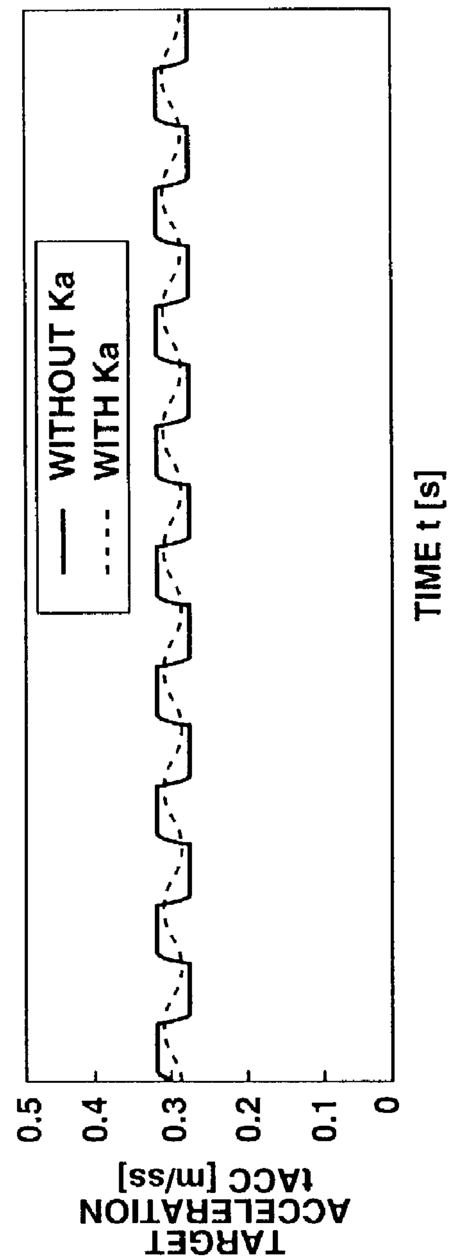
Figure 38A:
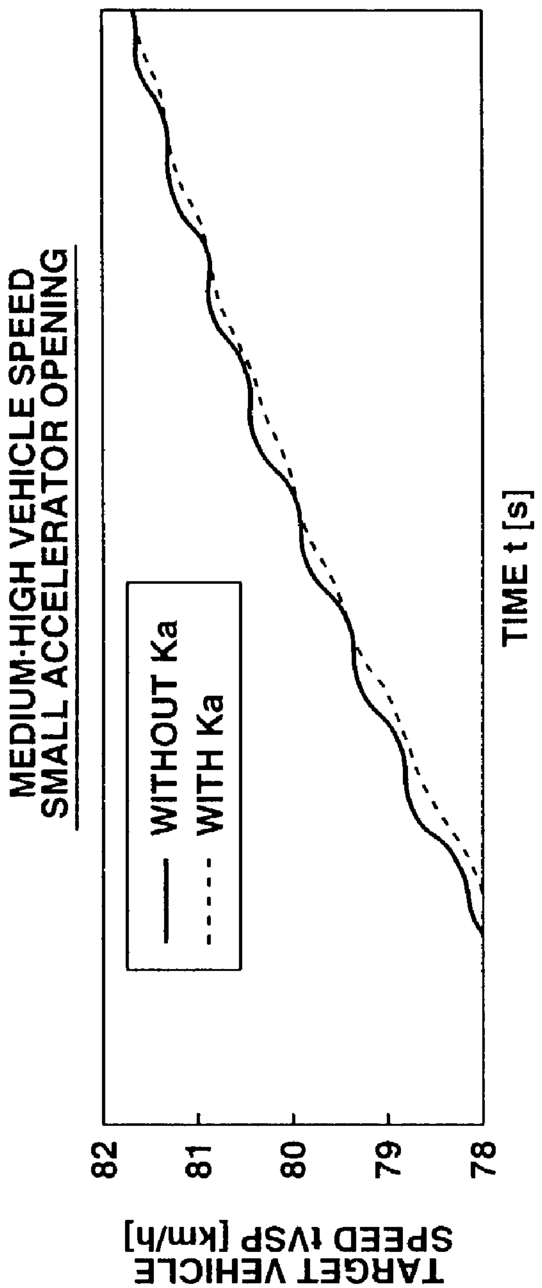
FIGS. 38A and 38B are time charts illustrating operations of the driving force control apparatus of the fifth embodiment shown in FIGS. 34 and 35, in terms of time series variation of the target vehicle speed and actual vehicle speed in the medium or high vehicle speed region when the accelerator opening is small.
Figure 38B:
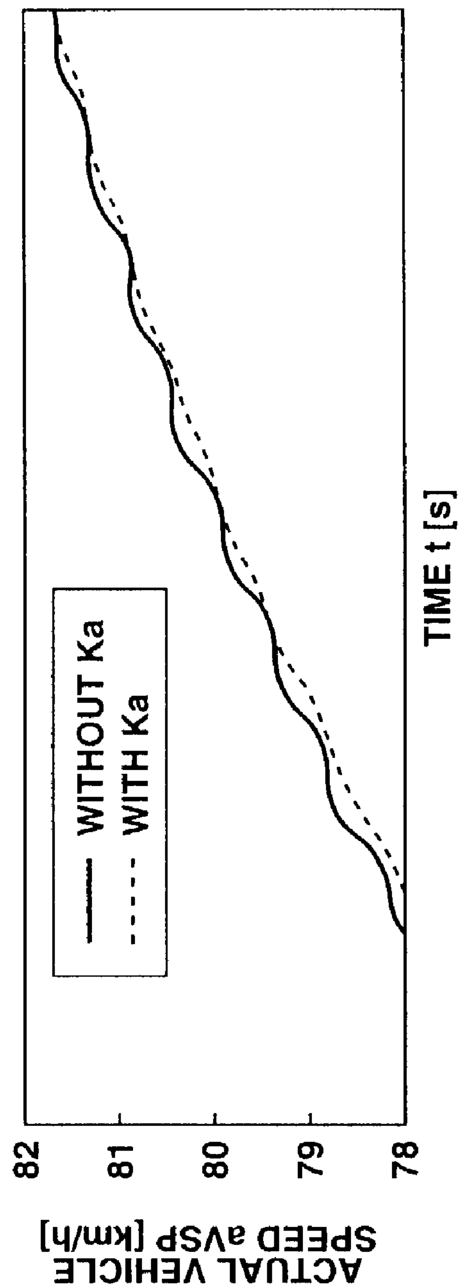

FIGS. 37A, 37B, 38A and 38B show the results of simulation. When accelerator pedal depression quantity APO is varied minutely and repeatedly in the small accelerator opening region as shown in FIG. 37A in the medium or high vehicle speed region, then target acceleration tACC would vary as shown by a solid line in FIG. 37A if Ka=1, and would cause target vehicle speed tVSP and actual vehicle speed aVSP as shown by solid lines in FIGS. 38A and 38B. However, the control system according to this embodiment makes target acceleration correction coefficient Ka smaller than one, and thereby causes target acceleration tACC smoothly as shown by a broken line in FIG. 37B. As a result, target vehicle speed tVSP and actual vehicle speed aVSP vary smoothly with time as shown by broken lines in FIGS. 38A and 38B.

Figure 39A:
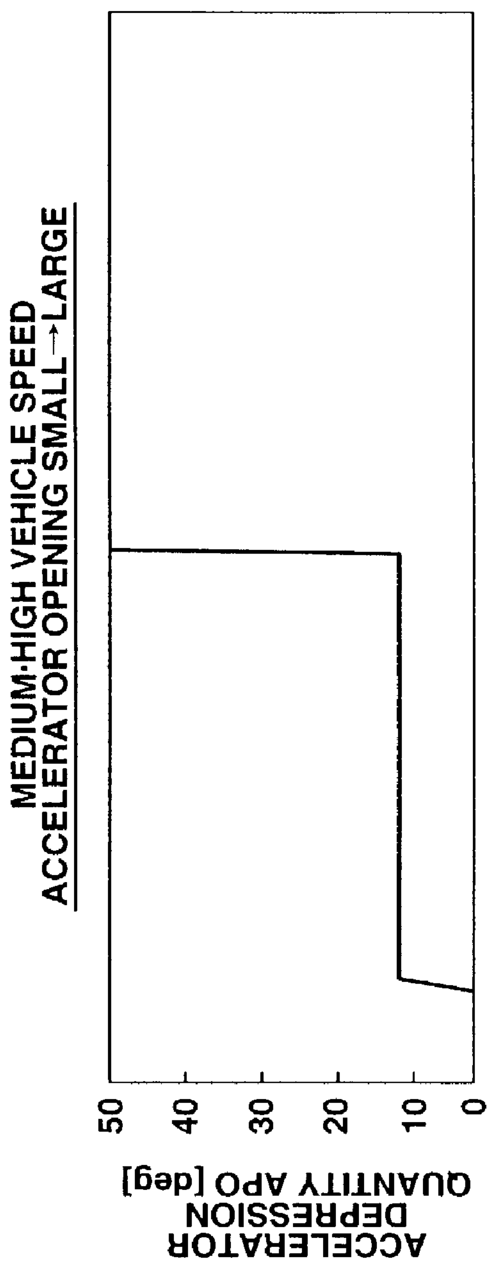
FIGS. 39A and 39B are time charts illustrating operations of the driving force control apparatus of the fifth embodiment shown in FIGS. 34 and 35, in terms of time series variation of the target acceleration in the medium or high vehicle speed region when the accelerator opening is increased from a small opening degree to a greater opening degree.
Figure 39B:
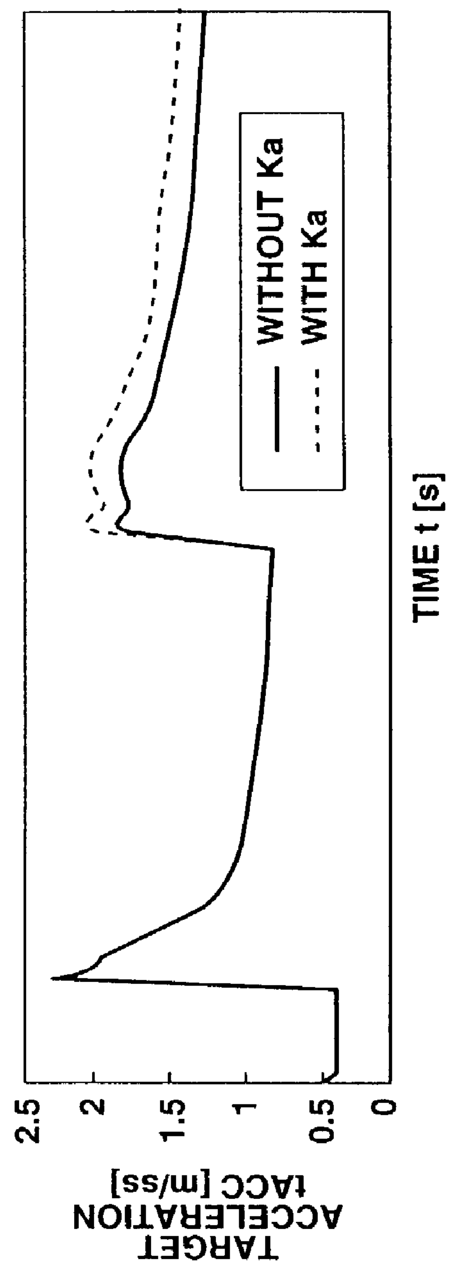
Figure 40A:
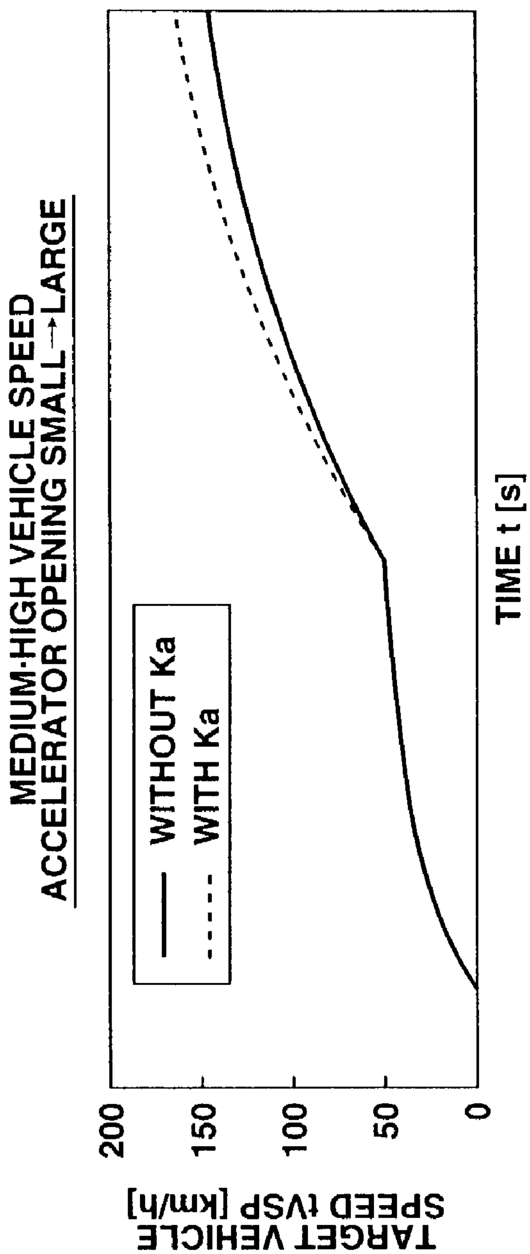
FIGS. 40A and 40B are time charts illustrating operations of the driving force control apparatus of the fifth embodiment shown in FIGS. 34 and 35, in terms of time series variation of the target vehicle speed and actual vehicle speed in the medium or high vehicle speed region when the accelerator opening is increased from the small opening degree to the greater opening degree.
Figure 40B:
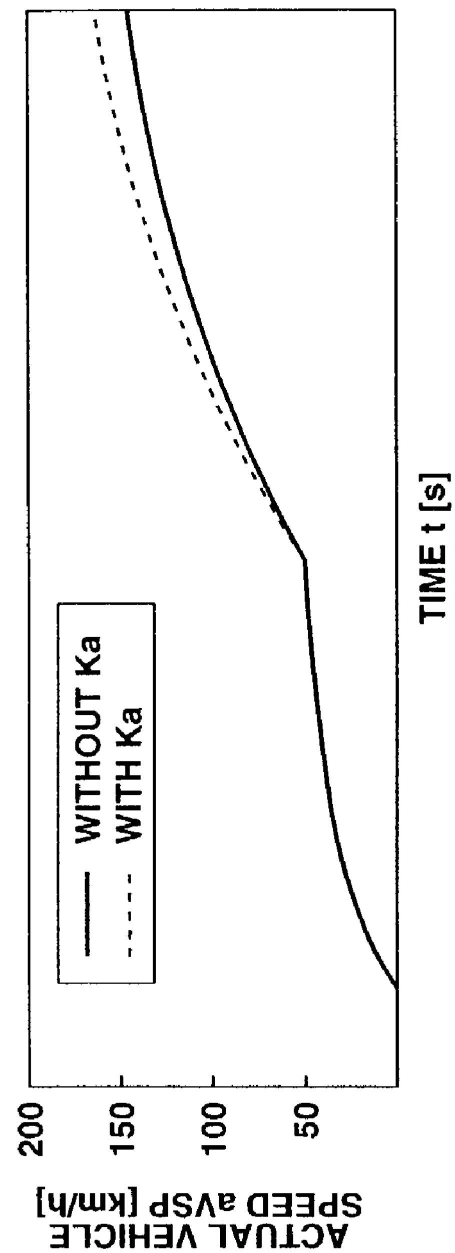

When accelerator pedal depression quantity APO is increased in the medium and high vehicle speed regions, the control apparatus increases target acceleration correction coefficient Ka greater than one, and thereby improves the feel of acceleration responsive to an increase of accelerator depression quantity APO as shown in FIG. 39A. If Ka is fixed at one, target acceleration tACC would vary as shown by a solid line in FIG. 39B, and time series variations of target vehicle speed tVSP and actual vehicle speed aVSP would be as shown by solid lines in FIGS. 40A and 40B. However, the control apparatus according to this embodiment increases target acceleration correction coefficient Ka greater than one, and thereby increase target acceleration tACC as shown by broken line in FIG. 39B as compared with the solid line characteristic. Consequently, target and actual vehicle speeds tVSP and aVSP are increased as shown in FIGS. 40A and 40B over the solid line characteristics, and the feel of acceleration is improved.

With target acceleration correction coefficient Ka set for each of the vehicle speed regions, the control apparatus according to this embodiment can meet various demands in the various vehicle speed regions. For example, the control apparatus can prevent undesired feel of frequent changes in acceleration and deceleration from being caused by small changes in accelerator pedal depression quantity APO. On the other hand, the control apparatus can enables subtle vehicle speed control with accelerator pedal.

Figure 41:
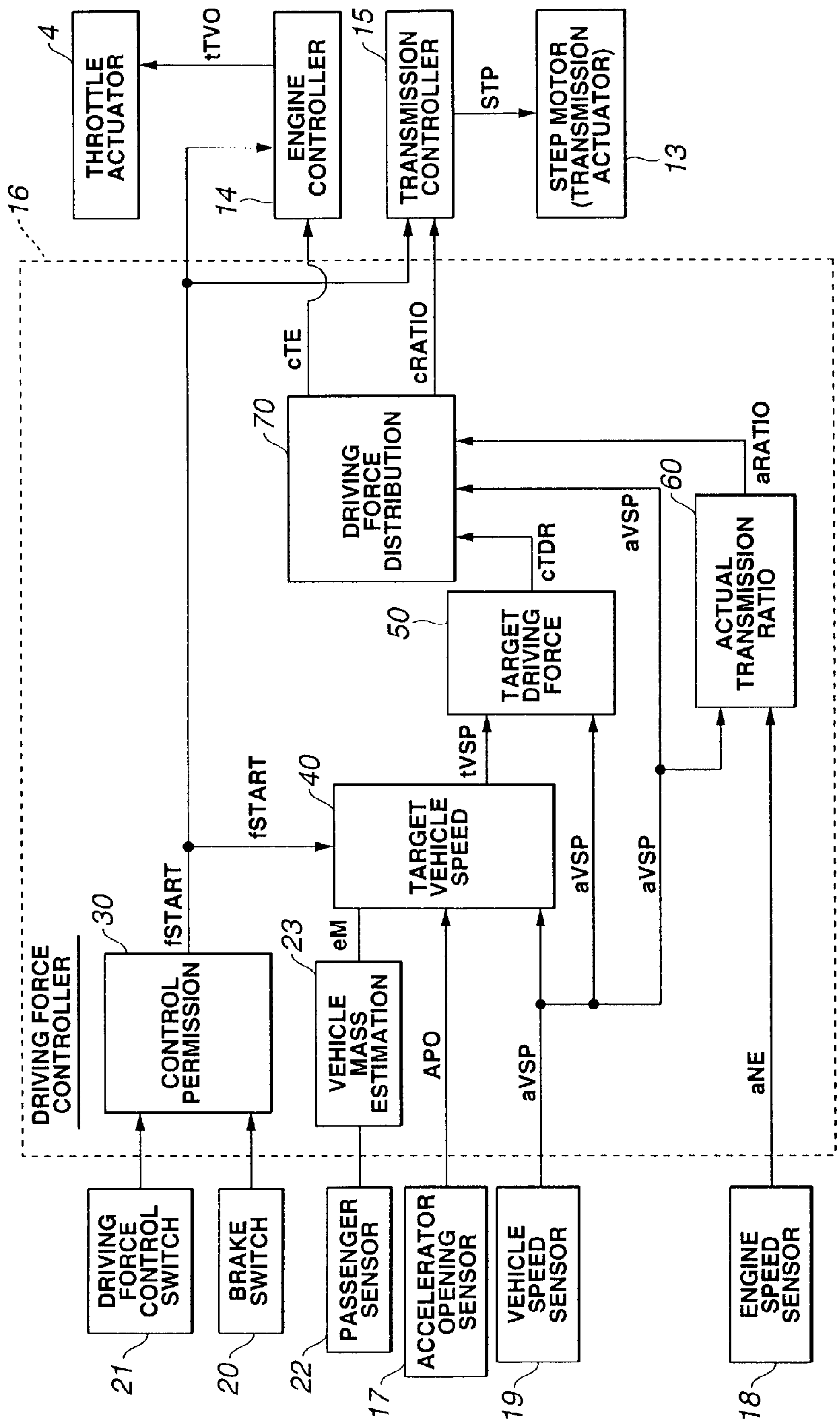
FIG. 41 is a functional block diagram showing a driving force control apparatus according to a sixth embodiment of the present invention.
Figure 42:
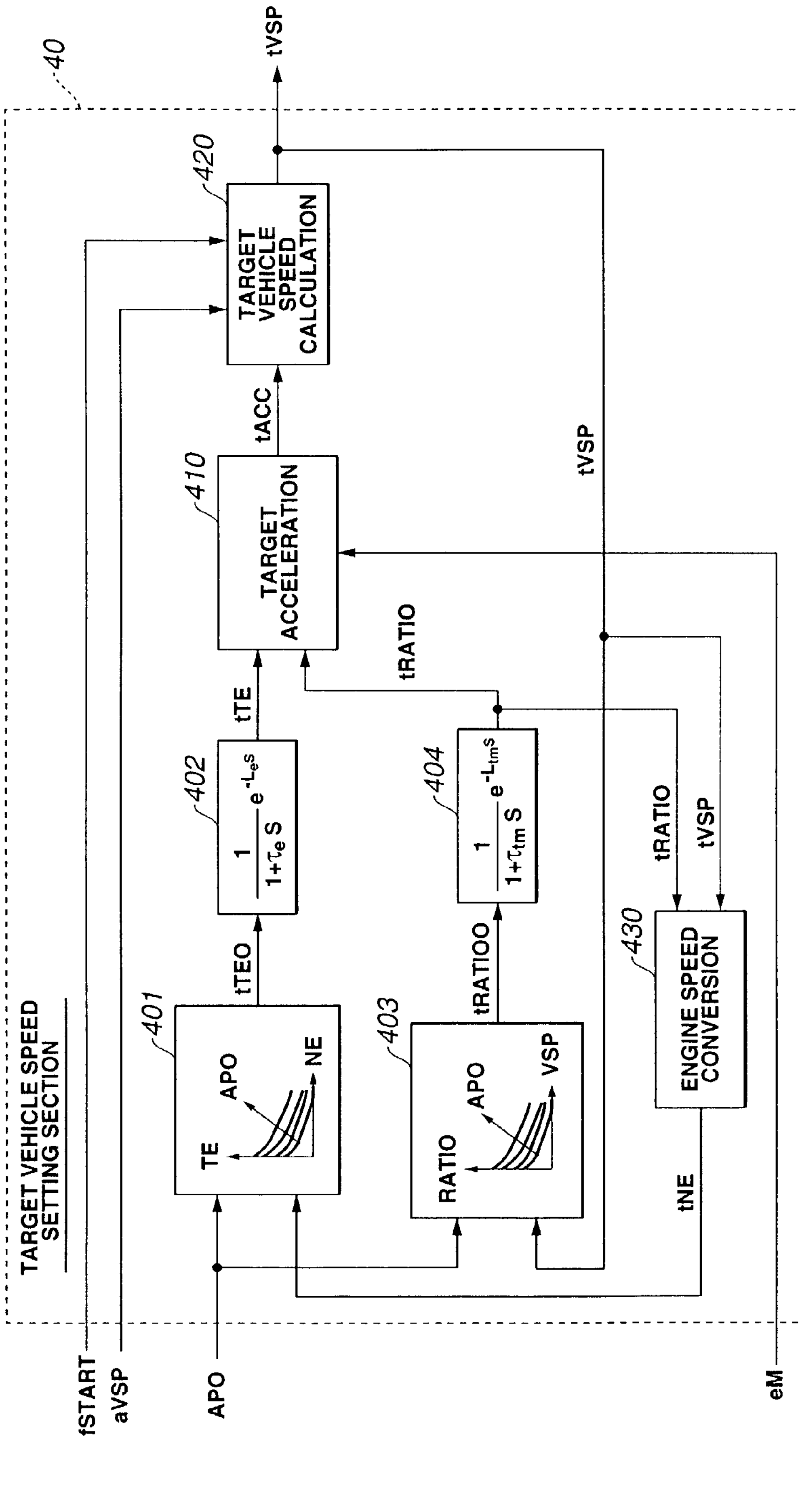
FIG. 42 is a functional block diagram showing a target vehicle speed setting section in the driving force control apparatus of FIG. 41.

FIGS. 41~44 shows a sixth embodiment of the present invention in which driving force controller 16 is changed from the form shown in FIG. 2 to the form shown in FIG. 41, and target vehicle speed setting section 40 is change from the form of FIG. 15 to the form of FIG. 42.

Figure 43:
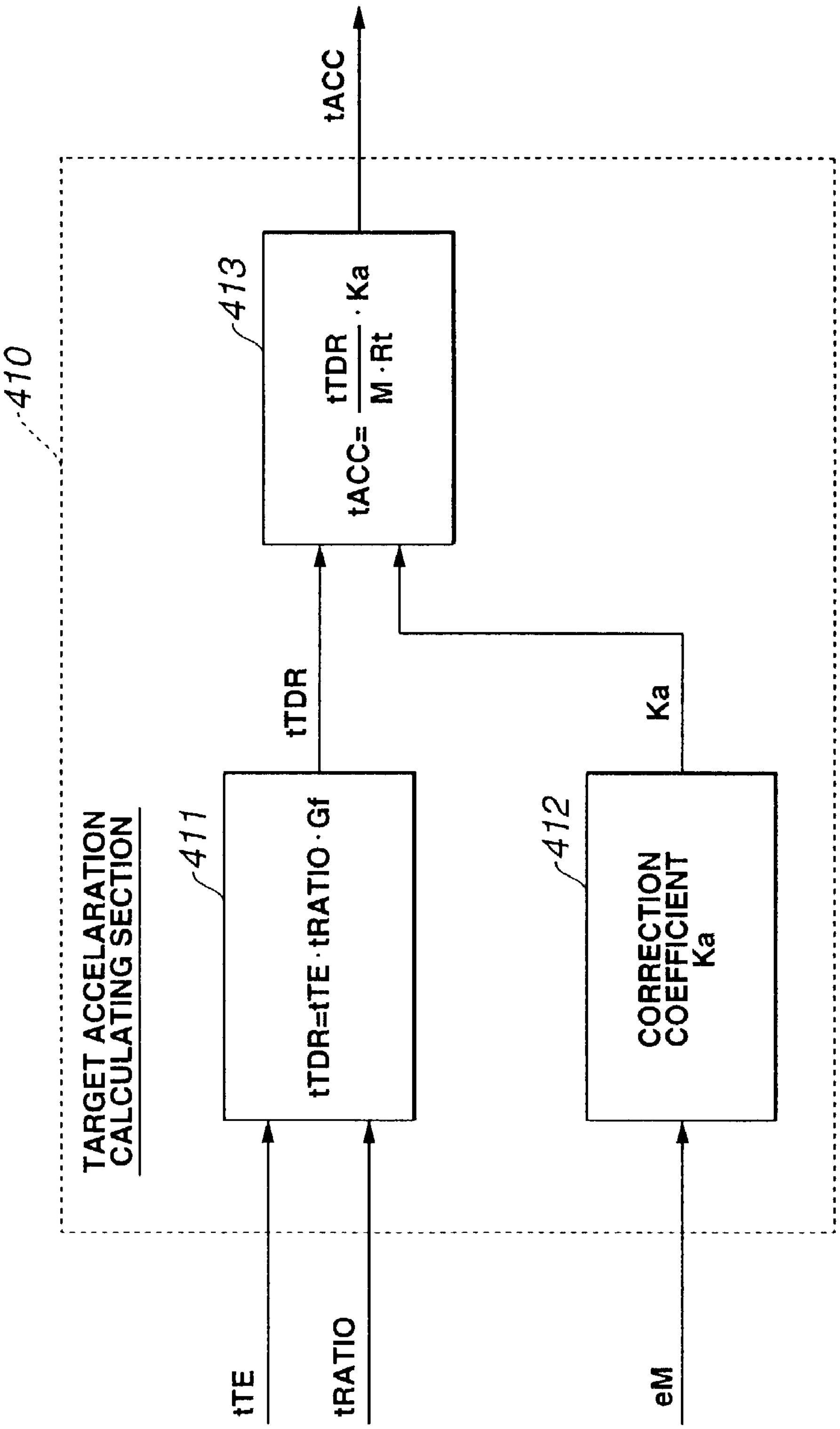
FIG. 43 is a functional block diagram showing a target acceleration calculating section in the driving force control apparatus of FIG. 41.

A vehicle mass estimating section 23 is provided in driving force controller 16, and arranged to determine an estimated vehicle mass eM in accordance with a signal supplied from a passenger sensor 22. Target vehicle speed setting section 40 is arranged to calculate target vehicle speed tVSP by using estimated vehicle mass eM supplied from vehicle mass estimating section 23. Target vehicle speed setting section 40 is constructed as shown in FIG. 42, like the construction shown in FIG. 34. Target acceleration calculating section 410 in target vehicle speed setting section 40 is constructed as shown in FIG. 43, like the construction shown in FIG. 35.

In this example, there are provided a plurality of passenger sensors 22 each provided in one of seats in the vehicle, to determine the number of persons in the vehicle. Vehicle mass estimating section 23 shown in FIG. 41 receives the signals from the passenger sensors 22 representing the number of persons currently being in the vehicle, calculates the estimated vehicle mass eM by using the following equation, and supplies the result of the calculation to target vehicle speed setting section 40.

$$eM=M+m(N-2)$$

where M is a base mass in the condition in which two persons are in the vehicle, m is a mass per person (55~65 [Kg], for example), and N is the number of persons sensed by passenger sensors 22. Instead of the above-mentioned arrangement, it is possible to estimate the vehicle mass with sensors provided, respectively, in suspension systems.

Target acceleration calculating section 410 receives the thus-determined estimated vehicle mass eM in addition to target engine torque tTE, target transmission ratio tRATIO, accelerator pedal depression quantity APO and vehicle speed aVSP. In target acceleration calculating section 410, estimated vehicle mass eM is used in the process of target acceleration correction coefficient determining section 412. By using a map shown in FIG. 44, target acceleration correction coefficient determining section 412 determines target acceleration correction coefficient Ka from a vehicle mass ratio (eM/M) expressed by a ratio of estimated vehicle mass eM to base mass M. In this example, target acceleration correction coefficient Ka is equal to one when the number of passengers is two and the vehicle mass ratio (eM/M) is equal to one. Target acceleration correction coefficient Ka is greater than one when the number of passengers is greater than or equal to 3, and the vehicle mass ratio (eM/M) is greater than one. Target acceleration correction coefficient Ka is smaller than one when the number of passenger is one and the vehicle mass ratio (eM/M) is smaller than one.

Figure 44:
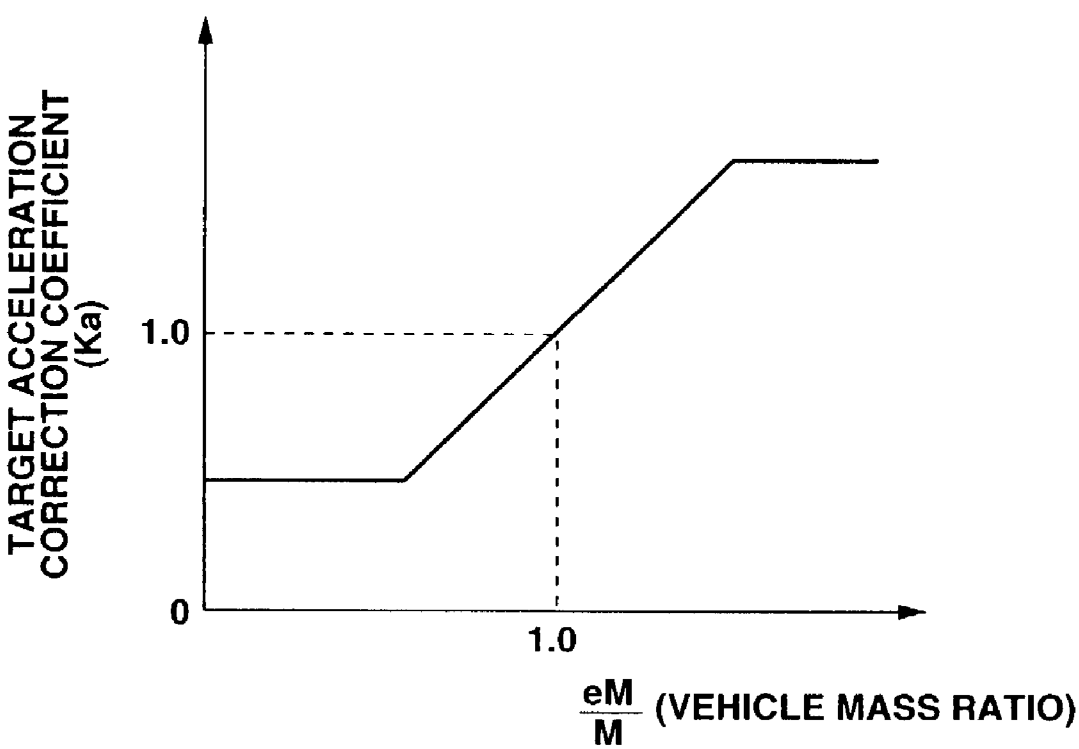
FIG. 44 is a graph showing a characteristic of target acceleration correction coefficient Ka used in the target acceleration calculating section of FIG. 43.
Figures 45A, 45B, 45C:
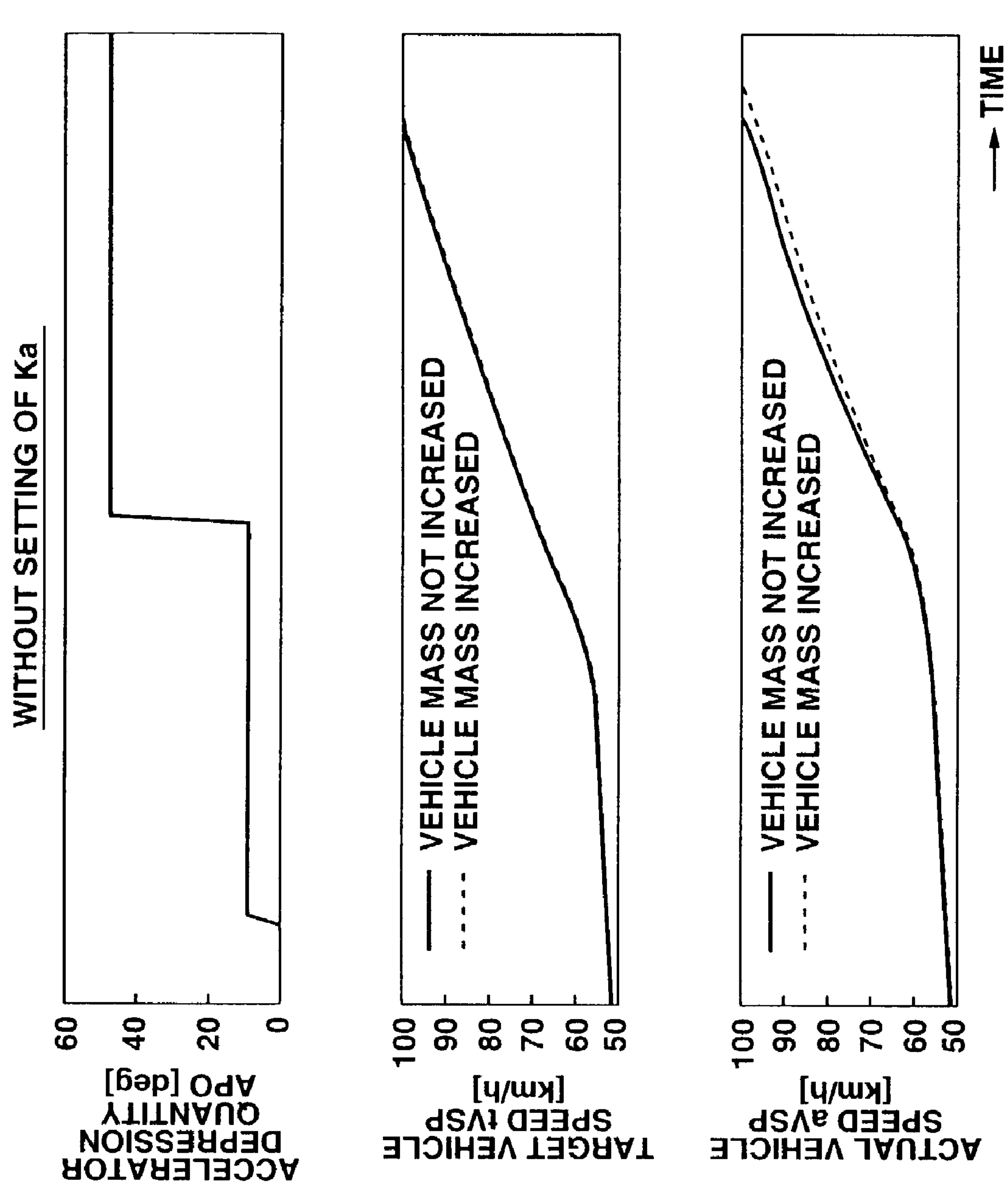
FIGS. 45A, 45B and 45C are time charts illustrating operations of the driving force control apparatus of the sixth embodiment shown in FIGS. 41~43, without the setting of target acceleration correction coefficient, in terms of time series variation of the target vehicle speed and actual vehicle speed when the accelerator opening is increased from a small degree to a large degree.
Figures 46A, 46B, 46C:
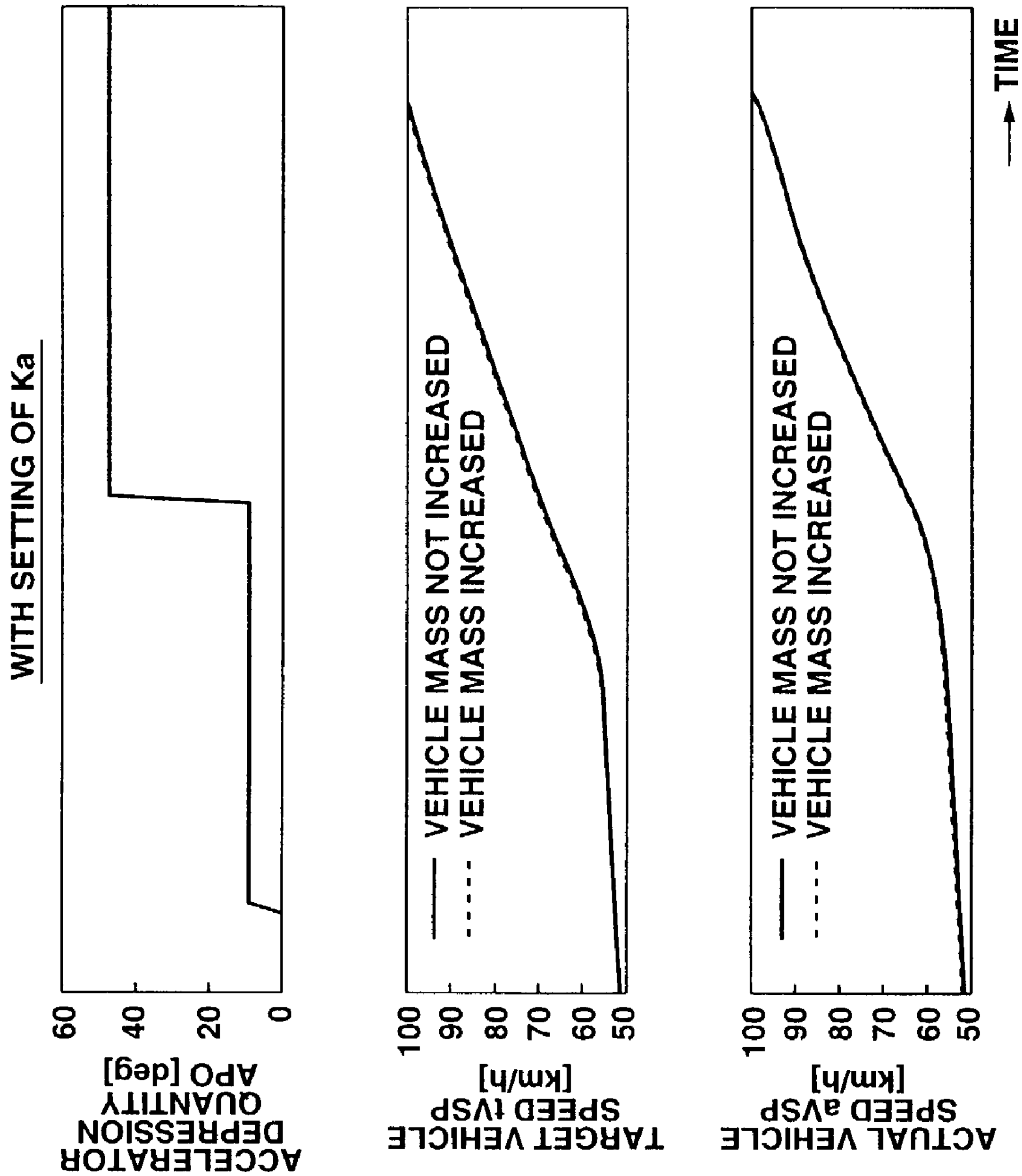
FIGS. 46A, 46B and 46C are time charts illustrating operations of the driving force control apparatus of the sixth embodiment shown in FIGS. 41~43, with the setting of the target acceleration correction coefficient, in terms of time series variation of the target vehicle speed and actual vehicle speed when the accelerator opening is increased from a small degree to a large degree.

By using the thus-determined target acceleration correction coefficient Ka, target acceleration calculating section 410 shown in FIG. 43 calculates target acceleration tACC by operation similar to that of FIG. 35, and supplies the result to target vehicle speed calculating section 420 for calculating target vehicle speed tVSP. With the target acceleration correction coefficient Ka determined as shown in FIG. 44, the control apparatus according to this embodiment can provide the following effects. When accelerator pedal depression quantity APO is increased as shown in FIG. 45A or 46B, the control system without using correction coefficient Ka responsive to vehicle mass ratio (eM/M) can increase target vehicle speed tVSP along a broken line characteristic shown in FIG. 45B, even if the vehicle mass is increased, without deviating from a solid line characteristic of FIG. 45B for the condition in which the vehicle mass is not increased. However, in this case, actual vehicle speed aVSP tends to be lower as shown by a broken line characteristic in FIG. 45C below a solid line characteristic in the case of no vehicle mass increase, so that the feel of acceleration is worse. By contrast, the control apparatus according to this embodiment uses target acceleration correction coefficient Ka which becomes greater than one with increase in the vehicle weight, and thereby prevents target vheicle speed tVSP and actual vehicle speed aVSP as shown in broken lines in FIGS. 46B and 46C from deviating, due to an increase in vehicle weight, from solid line characteristics shown in FIGS. 46B and 46C in the case of no vehicle weight increase. Thus, this embodiment can prevent the feel of acceleration from becoming worse when the vehicle weight becomes greater.

When the vehicle weight is decreased, and vehicle mass ratio (eM/M) becomes smaller than one, the control apparatus according to this embodiment renders the target acceleration correction coefficient Ka smaller than one. Therefore, the control apparatus can prevent unwanted changes in vehicle speed when the driver operates the accelerator pedal without intention of acceleration/deceleration.

Figure 47:
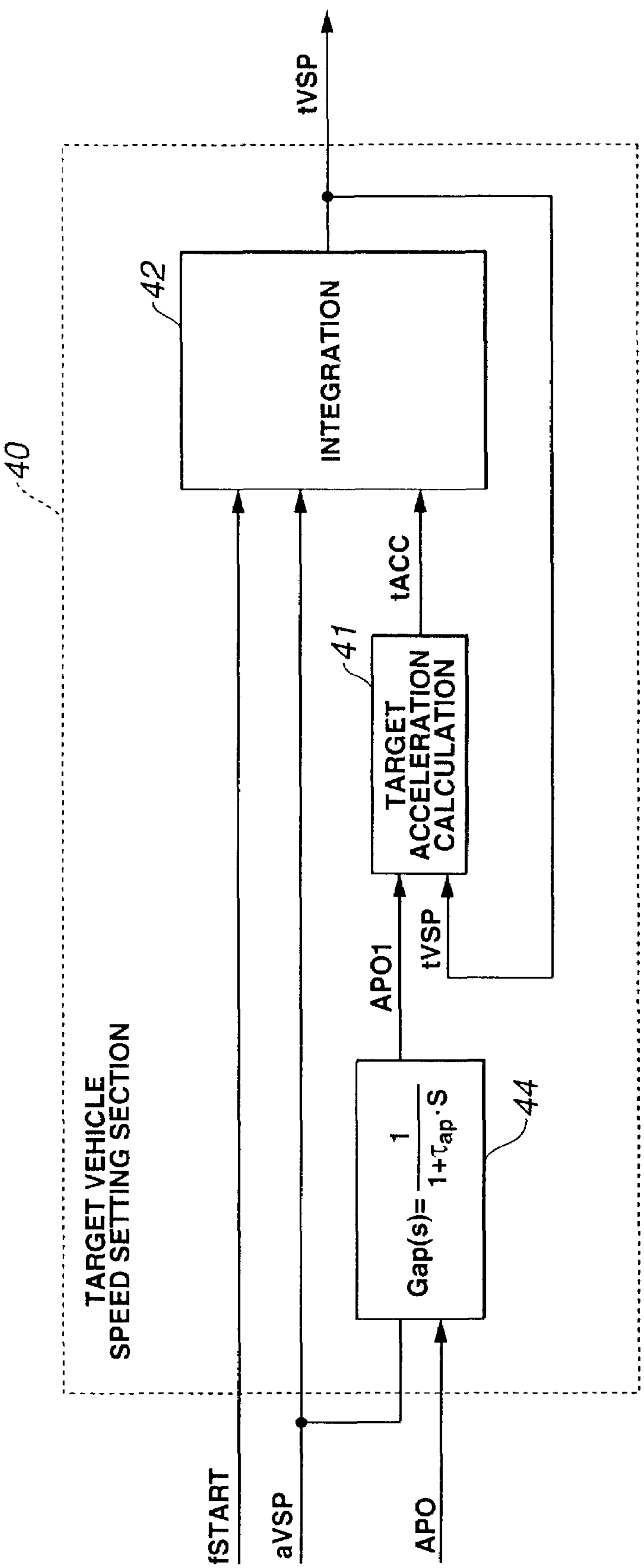
FIG. 47 is a functional block diagram showing a target vehicle speed setting section in a driving force control apparatus according to a seventh embodiment of the present invention.
Figure 48:
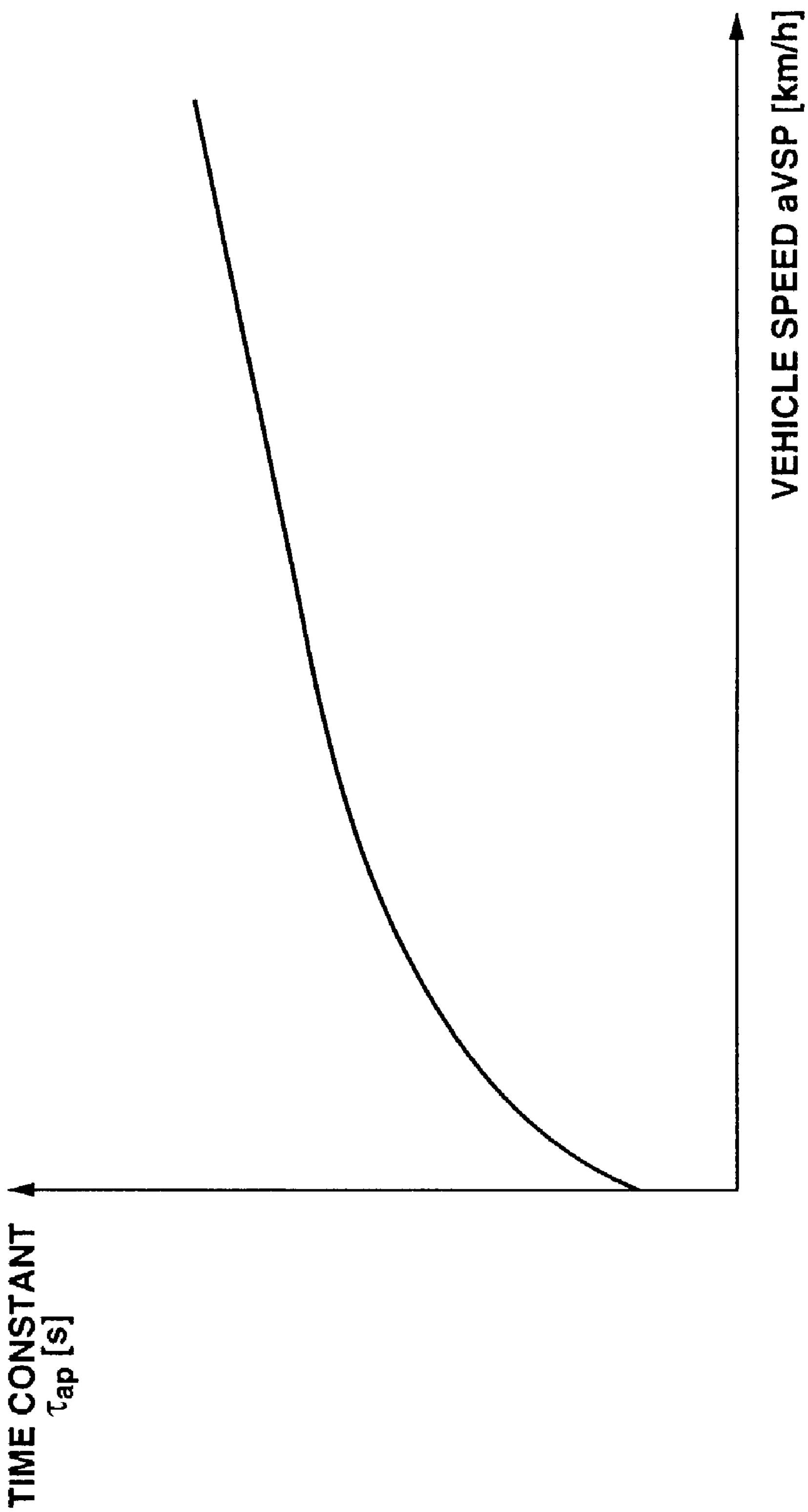
FIG. 48 is a graph showing a characteristic of time constant in a low-pass filter section of the target vehicle speed setting section shown in FIG. 47.
Figure 49:
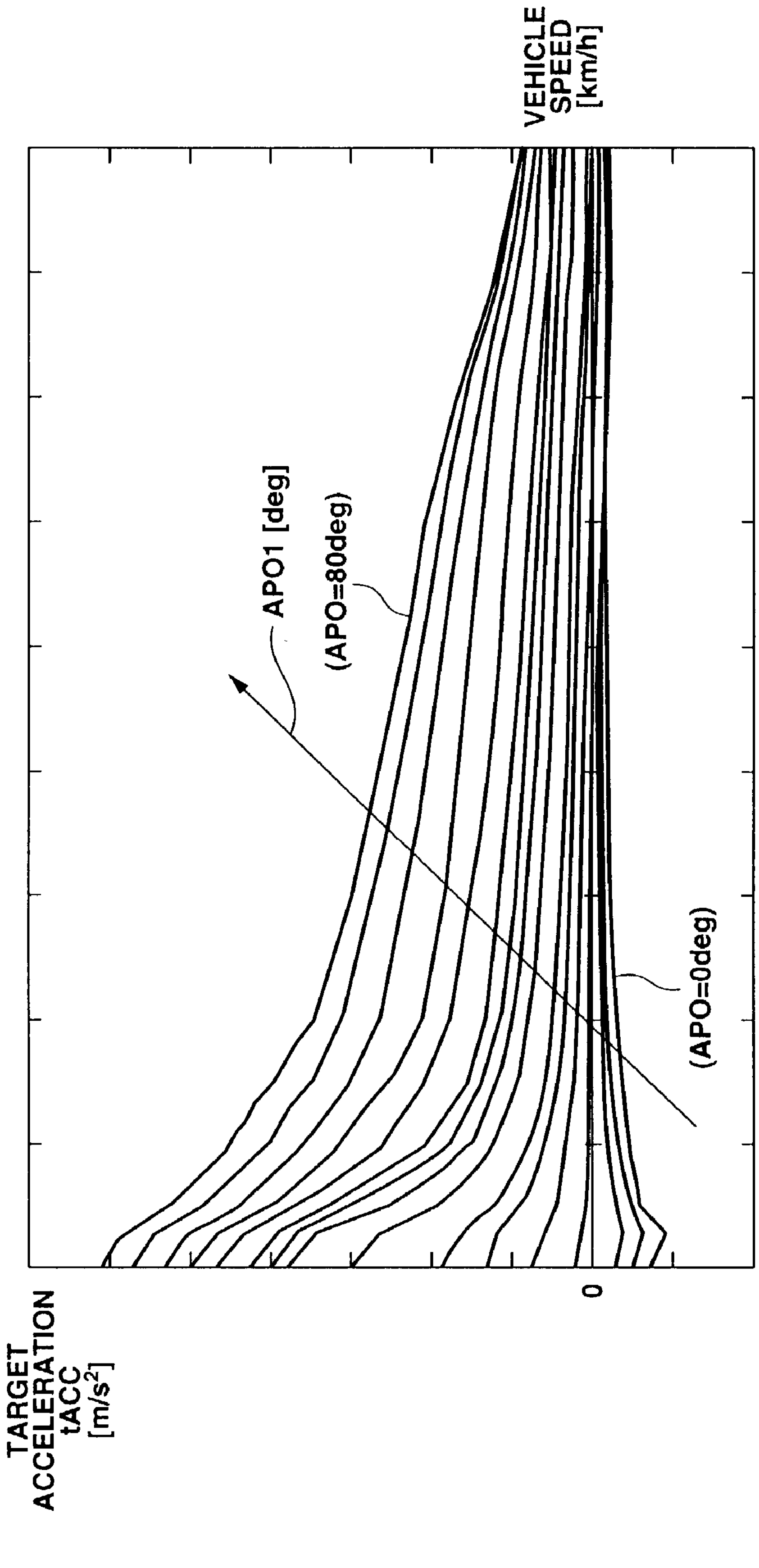
FIG. 49 is a graph showing a characteristic of acceleration used in a target acceleration determining section in the target vehicle speed setting section shown in FIG. 47.

FIGS. 47~49 shows a seventh embodiment of the present invention in which target vehicle speed setting section 40 is changed from the form shown in FIG. 4 to the form of FIG. 47. As shown in FIG. 47, a low-pass filter section 44 is disposed before target acceleration determining section 41, for filtering the accelerator pedal depression quantity APO. Instead of supplying sensed accelerator pedal depression quantity APO directly to target acceleration determining section 41 as in FIG. 4, the target vehicle speed setting section 40 of FIG. 47 determines a filtered accelerator pedal depression quantity APO1 by a filtering operation of low-pass filter section 44, and supplies the thus-determined filtered accelerator pedal depression quantity APO1 to target acceleration determining section 41.

Low-pass filter section 44 of this example is a first order low-pass filter having a time constant τap which is so set that time constant τap increases as vehicle speed aVSP increases, as shown in FIG. 48, and a transfer function Gap(s) given by $Gap(s)=1/(1+\tau ap\cdot s)$. Filtered accelerator pedal depression quantity APO1 is obtained by passing sensed accelerator pedal depression quantity APO through this low-pass filter, and supplied to target acceleration determining section 41.

Target acceleration tACC is determined in accordance with sensed accelerator pedal depression quantity APO in the case of FIG. 4. In the case of FIG. 47, by contrast, target acceleration tACC is determined from filtered accelerator pedal depression quantity APO1 in the process similar to that of FIG. 4. Accordingly, for determining target acceleration tACC, the target accelerator determining section 41 uses a map as shown in FIG. 49 in which sensed accelerator pedal depression quantity APO is replaced by filtered accelerator pedal depression quantity APO1.

Figure 50:
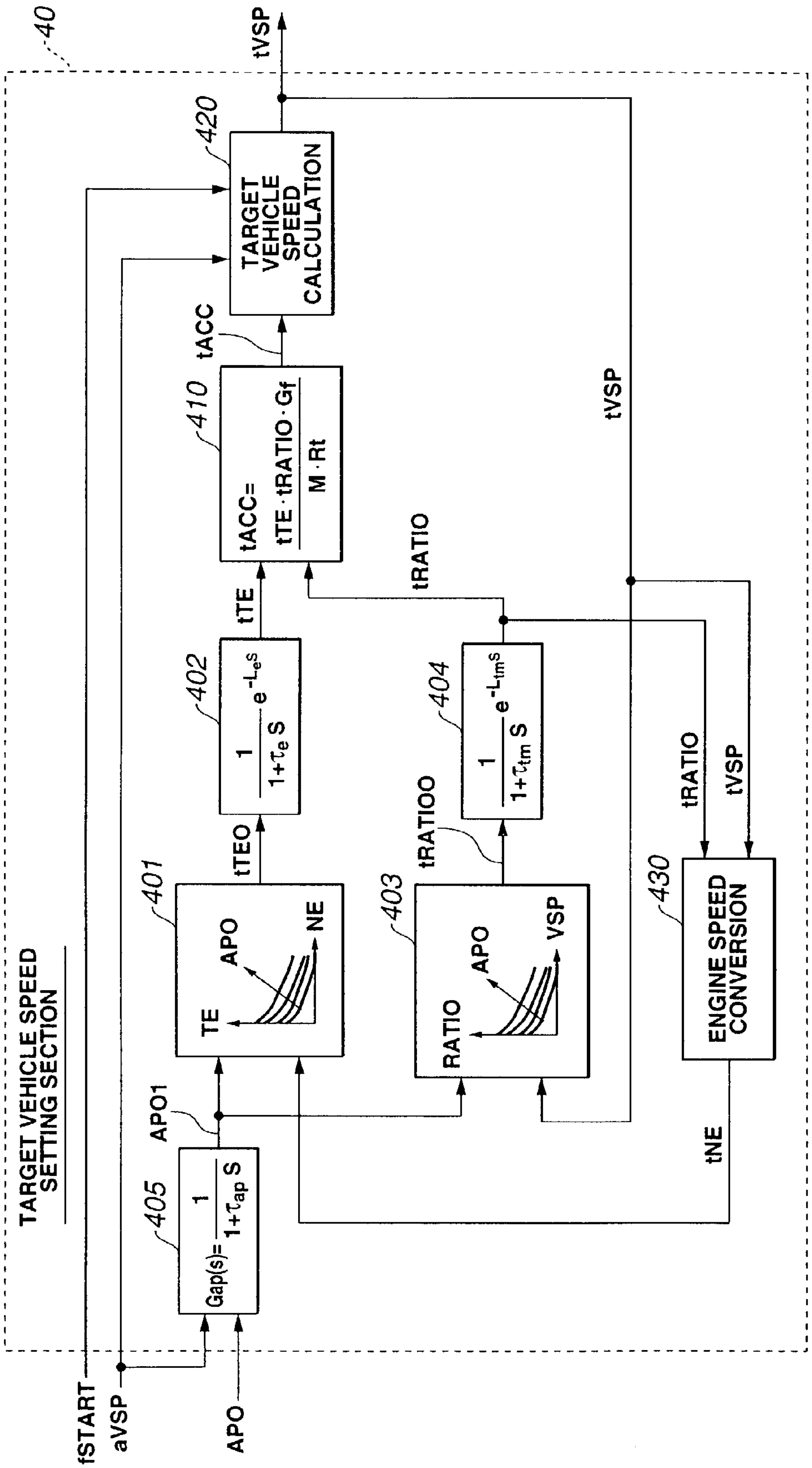
FIG. 50 is a functional block diagram showing a target vehicle speed setting section in a driving force control apparatus according to an eighth embodiment of the present invention.

FIG. 50 shows an eighth embodiment of the present invention. In the eighth embodiment, a target vehicle speed setting section 40 is arranged to perform a similar filtering operation to accelerator pedal depression quantity APO in the case in which target vehicle speed setting section 40 is constructed as shown in FIG. 15. Instead of supplying sensed accelerator pedal depression quantity APO directly to target engine torque setting section 401 and target transmission ratio setting section 403, there is provided, before these sections 401 and 403, a low-pass filter section 405, similar to low-pass filter section 44 of FIG. 47, for determining a filtered accelerator pedal depression quantity APO1, which is supplied to target engine torque setting section 401 and target transmission ratio setting section 403.

Figure 51:
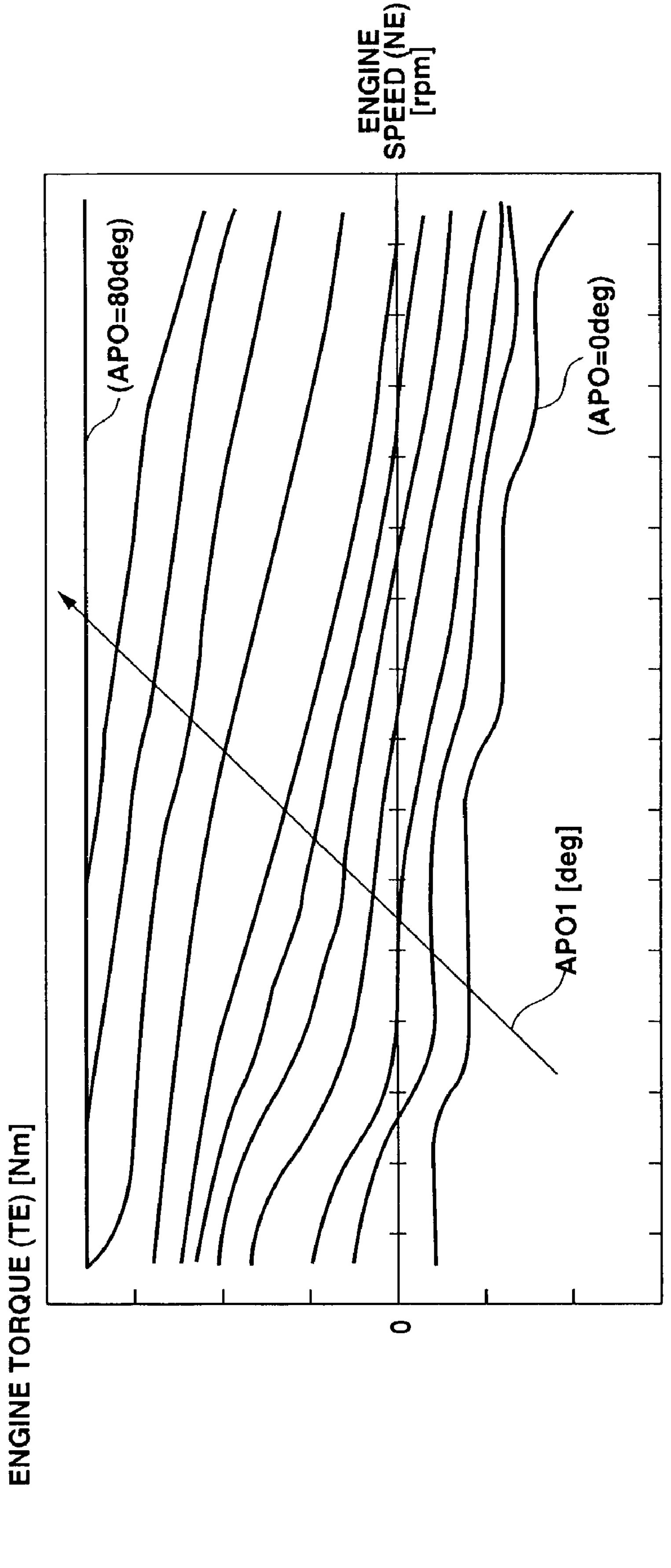
FIG. 51 is a graph showing a characteristic of engine torque used by a target engine torque setting section in the target vehicle speed setting section of FIG. 50.
Figure 52:
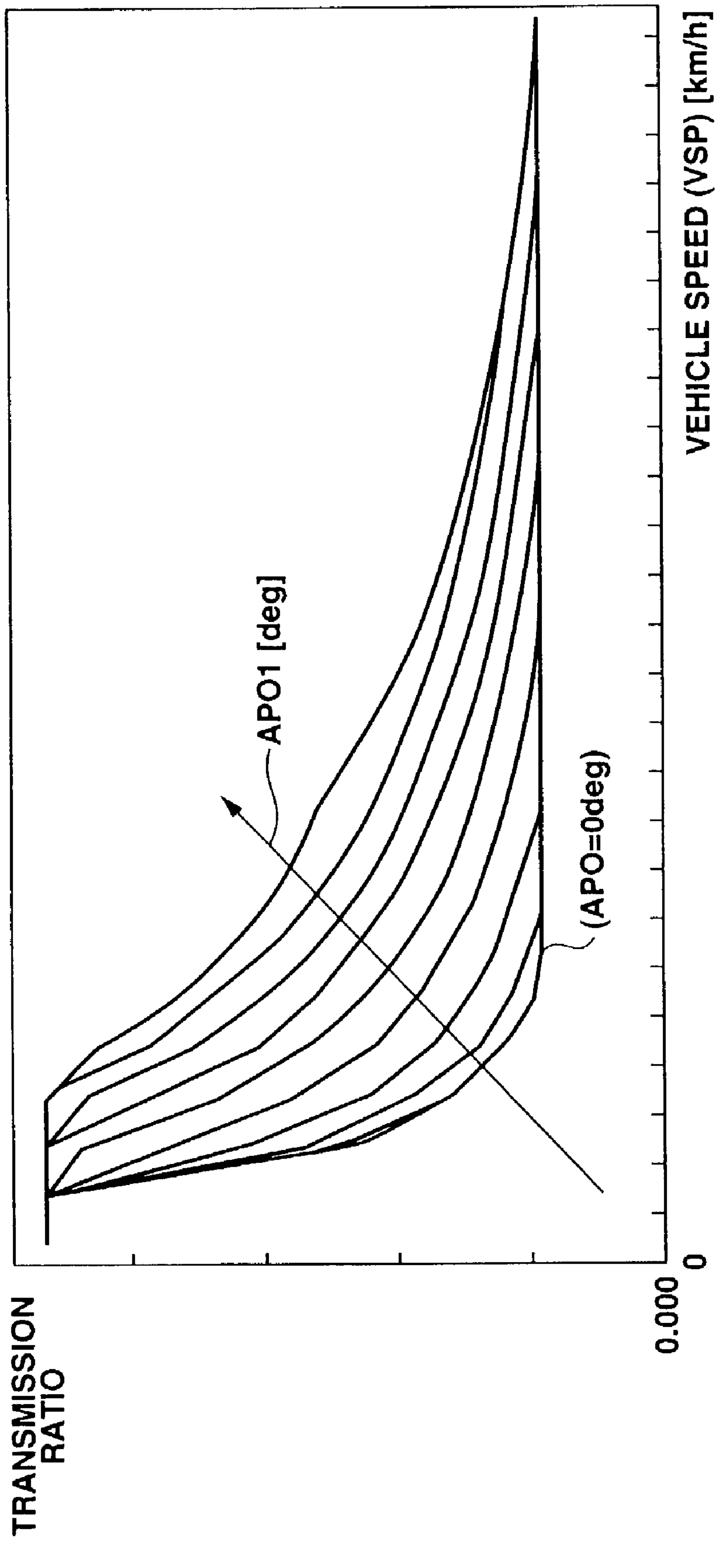
FIG. 52 is a graph showing a characteristic of transmission ratio used by a target transmission ratio setting section in the target vehicle speed setting section of FIG. 50.

Target engine torque setting section 401 and target transmission ratio setting section 403 determine the before-filter target engine torque tTEO and before-filter target transmission ratio tRATIO0 by using the filtered accelerator depression quantity APO1 instead of the sensed accelerator pedal depression quantity APO in the same manner as in the case of FIG. 15. FIGS. 51 and 52 show target engine torque map and target transmission ratio map for target engine torque setting section 401 and target transmission ratio setting section 403. In these maps, the sensed accelerator pedal depression quantity APO in FIGS. 16 and 17 is replaced by the filter processed accelerator depression quantity APO1.

Figure 53A:
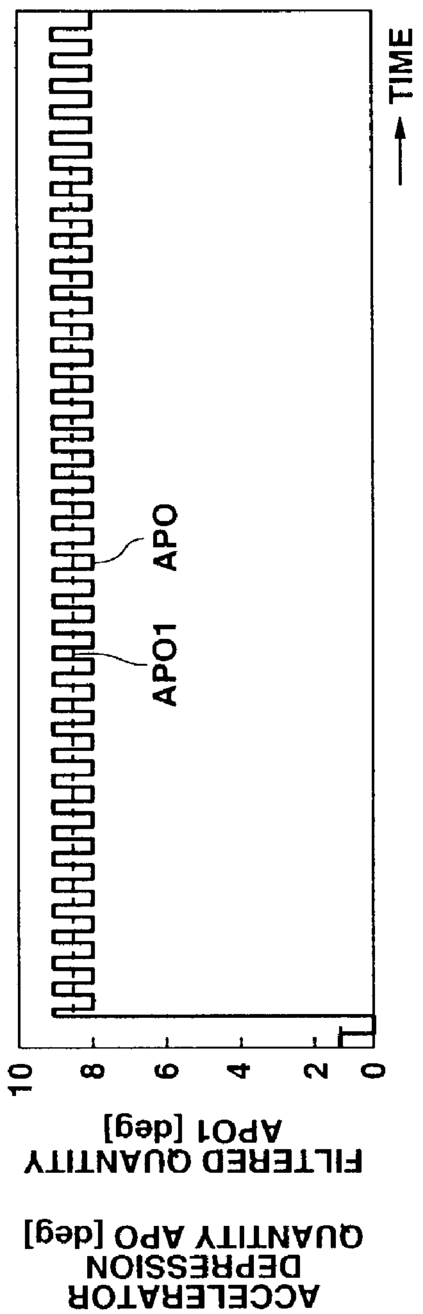
FIGS. 53A and 53B are time charts illustrating operations of the apparatus of the seventh embodiment shown in FIGS. 47~49 or the apparatus of the eighth embodiment shown in FIGS. 50~52, in terms of time series variation of a filtered accelerator pedal depression quantity together with the target acceleration.
Figure 53B:
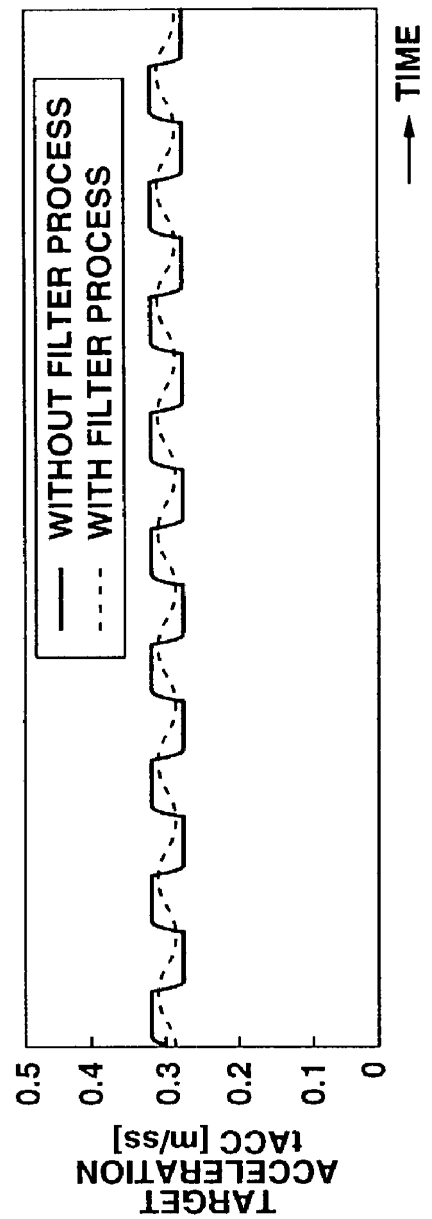
Figure 54A:
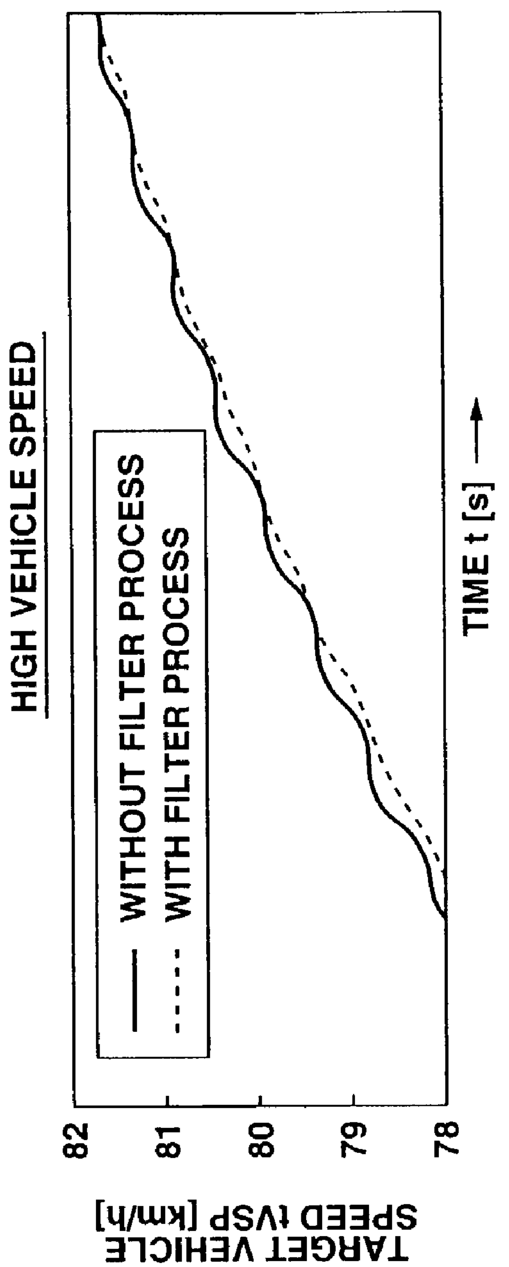
FIGS. 54A and 54B are time charts illustrating operations of he apparatus of the seventh embodiment shown in FIGS. 47~49 or the apparatus of the eighth embodiment shown in FIGS. 50~52, in terms of time series variation of the target vehicle speed and actual vehicle speed.
Figure 54B:
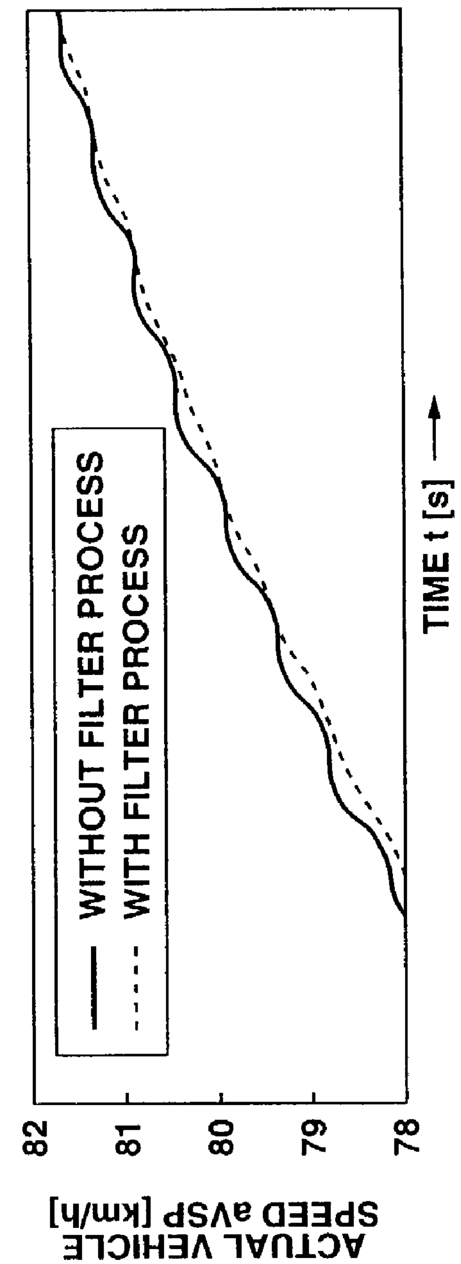

In the practical example of FIGS. 47~49 or the practical example of FIGS. 50~52, the sensed accelerator pedal depression quantity APO is replaced by the filter processed accelerator depression quantity APO1 obtained by the filtering operation of low-pass filter having a time constant τap which is increased as the vehicle speed increases. The thus-obtained filter processed accelerator depression quantity APO1 is used for the driving force control. Therefore, even when the accelerator pedal depression quantity APO is changed minutely and repeatedly as shown by solid line in FIG. 53A, the filtered accelerator pedal depression quantity APO1 varies smoothly as shown by a broken line in FIG. 53A. Accordingly, the target vehicle speed tVSP too varies smoothly, as shown by a broken line of FIG. 53B. Thus, the control system of this embodiment can prevent unwanted repetition of acceleration and deceleration, and provide smooth variation in the vehicle speed as shown by broken lines in FIGS. 54A and 54B without being affected by useless fluctuation as shown by solid lines, to the advantage of high speed vehicle operation.

As shown in FIG. 48, the time constant tap of low-pass filter section 44 or 405 shown in FIG. 47 or 50 is decreased in the low vehicle speed region. Therefore, the effect of the filtering operation is weakened in the low vehicle speed region. In this case, the response in vehicle speed with respect to accelerator input operation is made more sensitive in the low vehicle speed region, so that the driver can adjust the vehicle speed finely with the accelerator pedal.

In the illustrated embodiments, at least one of items 4, 14, 13 and 15 can serve as an actuating section to control a driving force of the vehicle so as to cause an actual vehicle speed of the vehicle to follow a target vehicle speed. At least one of items 41, 410, 401~404 can server as a target acceleration calculating section to calculate a target acceleration in accordance with an accelerator input. At least one of items 42, 420, and 421 can serve as a target vehicle speed calculating section to calculate a target vehicle speed from the target acceleration.

This application is based on prior Japanese Patent Applications No. 2001-294040 filed in Japan on Sep. 26, 2001, and No. 2001-354866 filed in Japan on Nov. 20, 2001. The entire contents of these prior Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle driving force control apparatus for a vehicle, comprising;

an actuating section to control a driving force of the vehicle so as to cause an actual vehicle speed of the vehicle to follow a target vehicle speed;

a target acceleration calculating section to calculate a target acceleration in accordance with an accelerator input; and a target vehicle speed calculating section to calculate a target vehicle speed from the target acceleration.

2. The vehicle driving force control apparatus as claimed in claim 1, wherein the target vehicle speed calculating section calculates a new value of the target vehicle speed in accordance with a previous value of the target vehicle speed calculated in a previous cycle and a new value of the target acceleration calculated in a current cycle.

3. The vehicle driving force control apparatus as claimed in claim 1, wherein the target acceleration calculating section is configured to decrease the target acceleration as the actual vehicle speed of the vehicle increases.

4. The vehicle driving force control apparatus as claimed in claim 1, wherein the target acceleration calculating section is configured to set the target acceleration negative when the accelerator input is smaller than a predetermined value.

5. The vehicle driving force control apparatus as claimed in claim 1, wherein the target acceleration calculating section comprises a target engine torque calculating section to calculate a target engine torque in accordance with the accelerator input, and a target transmission ratio calculating section to calculate a target transmission ratio in accordance with the accelerator input, and a target acceleration determining section to calculate the target acceleration in accordance with the target engine torque and the target transmission ratio.

6. The vehicle driving force control apparatus as claimed in claim 5, wherein each of the target engine torque calculating section and the target transmission ratio calculating section uses a control model involving a first order lag and a dead time.

7. The vehicle driving force control apparatus as claimed in claim 1, wherein the target acceleration calculating section comprises a process section to hold the accelerator input unchanged if a change in an accelerator pedal depression is smaller than a predetermined threshold value.

8. The vehicle driving force control apparatus as claimed in claim 7, wherein the predetermined threshold value is increased as the actual vehicle speed increases.

9. The vehicle driving force control apparatus as claimed in claim 1, wherein the target acceleration calculating section comprises a correction coefficient determining section to determine an accelerator input correction coefficient in accordance with the actual vehicle speed, and a target acceleration determining section to determine the target acceleration in accordance with the accelerator input correction coefficient.

10. The vehicle driving force control apparatus as claimed in claim 9, wherein the accelerator input correction coefficient is increased when an accelerator pedal depression quantity is increased.

11. The vehicle driving force control apparatus as claimed in claim 9, wherein the accelerator input correction coefficient is increased when a vehicle weight is increased.

12. The vehicle driving force control apparatus as claimed in claim 1, wherein the target acceleration calculating section comprises a low-pass filter section to determine a filtered accelerator pedal depression quantity by passing a sensed accelerator pedal depression quantity through a low-pass filter with a time constant which is increased as the vehicle speed increases, and a target acceleration determining section to determine the target acceleration in accordance with the filtered acceleration pedal depression quantity as the accelerator input.

13. The vehicle driving force control apparatus as claimed in claim 1, wherein the vehicle driving force control apparatus further comprises a sensing section to sense the accelerator input which is a driverts actual accelerator input quantity, and the actual vehicle speed of the vehicle; and wherein the target acceleration calculating section is connected with the sensing section and the target vehicle speed calculating section and arranged to receive the accelerator input and the target vehicle speed from the target vehicle speed calculating section, and the target vehicle speed calculating section is connected with the target acceleration calculating section, and arranged to receive the target acceleration.

14. The vehicle driving force control apparatus as claimed in claim 2, wherein the target vehicle speed calculating section calculates the new value of the target vehicle speed by adding the previous value of the target vehicle speed to the new value of the target acceleration in a driving force control enable mode, and by setting the new value of the target vehicle speed equal to the actual vehicle speed in a driving force control disable mode.

15. The vehicle driving force control apparatus as claimed in claim 1, further comprising:

a target driving force calculating section to calculate a command driving torque in accordance with the target vehicle speed; and a driving force distributing section to calculate a command engine torque and a command transmission ratio in accordance with the command driving torque;

wherein the actuating section comprises:

an engine actuating section to control an engine of the vehicle in response to the command engine torque; and a transmission actuating section to control a transmission of the vehicle in response to the command transmission ratio.

16. A vehicle driving force control process for controlling a driving force of a vehicle so as to cause an actual vehicle speed of the vehicle to follow a target vehicle speed, the vehicle driving force control process comprising:

calculating a target acceleration in accordance with an accelerator input; and calculating a target vehicle speed from the target acceleration.

17. A vehicle driving force control apparatus for a vehicle, comprising:

means for calculating a target acceleration in accordance with an accelerator pedal depression quantity; means for calculating a target vehicle speed from the target acceleration; and means for controlling a driving force of the vehicle so as to reduce a deviation of an actual vehicle speed from the target vehicle speed.

18. The vehicle driving force control apparatus as claimed in claim 1, wherein the vehicle driving force control apparatus further comprises a sensing section to sense the accelerator input which is a driver's actual accelerator input quantity.

19. A vehicle driving force control apparatus for a vehicle, comprising:

a target acceleration determining section to calculate a target acceleration in accordance with an accelerator pedal depression quantity and a feedback target vehicle speed;

a target vehicle speed calculating section to calculate a target vehicle speed in accordance with the target acceleration and an actual vehicle speed; and a device to control a driving force of the vehicle so as to reduce a deviation of the actual vehicle speed from the target vehicle speed.

20. The vehicle driving force control apparatus as claimed in claim 19, wherein the target vehicle speed calculating section further includes an integrating section to calculate a target vehicle speed in accordance with a modified target acceleration and the actual vehicle speed, and a running resistance setting section to calculate a running resistance in accordance with the feedback target vehicle speed, wherein the target vehicle speed calculating section calculates a modified acceleration based upon the target acceleration and running resistance.

* * * * *